United States Patent
Lee

(10) Patent No.: US 11,122,469 B2
(45) Date of Patent: *Sep. 14, 2021

(54) PEER TO PEER AD HOC NETWORK WITH BANDWIDTH BONDING, SEAMLESS MOBILITY, AND FLOW-BASED ROUTING

(71) Applicant: Albert Lee, Irvine, CA (US)

(72) Inventor: Albert Lee, Irvine, CA (US)

(73) Assignee: ANTEL INC., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/538,582

(22) Filed: Aug. 12, 2019

(65) Prior Publication Data

US 2019/0364459 A1 Nov. 28, 2019

Related U.S. Application Data

(63) Continuation-in-part of application No. 14/907,567, filed on Jan. 26, 2016, now Pat. No. 10,383,005.

(Continued)

(51) Int. Cl.
*H04W 28/10* (2009.01)
*H04B 7/14* (2006.01)
(Continued)

(52) U.S. Cl.
CPC ........ *H04W 28/10* (2013.01); *G06Q 30/0261* (2013.01); *H04B 7/14* (2013.01); *H04L 45/122* (2013.01); *H04L 45/38* (2013.01); *H04L 61/2007* (2013.01); *H04L 67/104* (2013.01); *H04L 69/22* (2013.01); *H04W 28/0289* (2013.01); *H04W 40/36* (2013.01); *H04W 72/04* (2013.01); *H04L 69/324* (2013.01); *H04L 69/325* (2013.01); *H04W 84/18* (2013.01)

(58) Field of Classification Search
CPC ..... H04W 28/10; H04W 28/02; H04W 40/36; H04W 72/04; H04W 84/12; H04W 84/18; H04L 12/733; H04L 29/06; H04L 12/721; H04L 29/12; H04L 45/122; H04B 7/14
See application file for complete search history.

(56) References Cited

U.S. PATENT DOCUMENTS

2008/0240026 A1* 10/2008 Shih .................. H04W 40/16
370/329
2010/0085948 A1* 4/2010 Yu .................... H04L 45/123
370/338

(Continued)

*Primary Examiner* — Chi Ho A Lee
(74) *Attorney, Agent, or Firm* — Ashkan Najafi

(57) ABSTRACT

An electronic data communication network includes source terminal nodes connected to the network; moving c-nodes; and one or more destination terminal nodes connected to the network. The source terminal nodes send IP packets over the c-nodes to the destination terminal nodes to accomplish arbitrary communications between arbitrary groups of the source terminal nodes to arbitrary groups of the destination terminal nodes. The moving node comprises a mobile communication device. The moving node comprises a starting node that sends the data, a relay node that relays the data, and an ending node that receives data. A virtual circuit is formed along a path comprising the relay nodes for data communication. The virtual circuit is identified by the path. Routing of data from the starting node to the ending node is performed with P2P routing algorithm.

35 Claims, 44 Drawing Sheets

Related U.S. Application Data

(60) Provisional application No. 62/854,954, filed on May 30, 2019, provisional application No. 62/819,401, filed on Mar. 15, 2019.

(51) Int. Cl.

| | | |
|---|---|---|
| *H04L 12/733* | (2013.01) | |
| *H04L 29/06* | (2006.01) | |
| *H04W 28/02* | (2009.01) | |
| *H04L 12/721* | (2013.01) | |
| *H04L 29/12* | (2006.01) | |
| *H04W 72/04* | (2009.01) | |
| *H04L 29/08* | (2006.01) | |
| *G06Q 30/02* | (2012.01) | |
| *H04W 40/36* | (2009.01) | |
| *H04W 84/18* | (2009.01) | |

(56) References Cited

U.S. PATENT DOCUMENTS

| | | | |
|---|---|---|---|
| 2015/0023668 A1* | 1/2015 | Spaulding | H04B 10/1129 |
| | | | 398/106 |
| 2015/0025709 A1* | 1/2015 | Spaulding | H04B 10/116 |
| | | | 701/2 |
| 2019/0313224 A1* | 10/2019 | Yu | H04L 67/12 |
| 2019/0364492 A1* | 11/2019 | Azizi | H04W 92/045 |
| 2020/0128372 A1* | 4/2020 | Zhang | H04W 4/12 |
| 2020/0236655 A1* | 7/2020 | Bharadwaj | H04W 72/02 |
| 2020/0274942 A1* | 8/2020 | Mueck | H04L 67/2842 |

\* cited by examiner

PEER TO PEER AD HOC NETWORK WITH BANDWIDTH BONDING, SEAMLESS MOBILITY, AND FLOW-BASED ROUTING

RELATED APPLICATIONS

This application is a continuation-in-part application claiming priority on U.S. Provisional Application No. 61/860,246 filed on Jul. 30, 2013, U.S. patent application Ser. No. 14/907,567 filed on Jan. 26, 2016, U.S. Provisional Application No. 62/854,954 filed on May 30, 2019 and U.S. Provisional Application No. 62/819,401 filed on Mar. 15, 2019, the disclosures of which are incorporated by reference to this Application.

The disclosures of US Patent Application Publication Nos. US2008/0253373 (System and Method for Supporting Flexible Overlays and Mobility in ip Communication and Computer Networks), US2009/0119393 (System and architecture for supporting mobility and multipath packet delivery in ip network stacks), US2008/0107124 (System and method for supporting mobility and multipath packet delivery in IP communications and computer networks across nat and firewall boxes), US2008/0107080 (System and method of fast channel scanning and ip address acquisition for fast handoff in ip networks), US 2011/0299554 (Solutions for dynamic NAT and firewall traversal) are incorporated by reference to this Application. The technology disclosed by the above publications is generically mentioned as i-Stack in this specification. The disclosure of a conference paper, "A distributed multicast multi-rate maxmin flow control protocol" December 2002 [DOI: 10.1109/GLOCOM.2002.1188443•Source: IEEE Xplore] is incorporated by reference. The disclosure of a dissertation paper, A THEORY OF LEXICOGRAPHIC OPTIMIZATION FOR COMPUTER NETWORKS by Jordi Ros Giralt, UNIVERSITY OF CALIFORNIA, IRVINE, 2003 is incorporated by reference.

FIELD OF THE INVENTION

The present invention relates generally to a system and method for flexible overlays and mobility management in IP (Internet Protocol) networks and relates more particularly to a network architecture in which assembled logical devices form an overlay network on top of IP networks to effect numerous and diverse purposes. The present invention specifically serves as well the purpose of maintaining and supporting continuous connections between mobile hosts while minimizing the cost of the overlay structure and disruption to the existing network infrastructure.

The present invention relates in general, to peer to peer ad hoc networks, mesh Wi-Fi networks, and networks formed by customer premise equipment (CPE) as an access network, and in particular, to channel assignment, routing, flow control, methods for promoting bandwidth sharing in the ad hoc networks.

The present invention also relates to i-Stack Virtual Routing Technology w/max-min explicit congestion control and i-Stack applied on HIP and IP tunneling.

BACKGROUND OF THE INVENTION

The present invention builds upon two related background fields: overlay networks and mobility management for IP networks. These two fields are not only vast in and of themselves, they also overlap in the sense that overlay networks have been widely conceived in the use of supporting host mobility in IP networks. Ever since the rapid rise of the public Internet, the quest to create overlays over public networks has never stopped. A major driving force for this quest relates to the lack of a single entity capable of controlling the entirety of the Internet; the most practical way to effect Internet-wide applications without full control is to erect an overlay network. The concept of overlay has become exceptionally popular since the introduction of P2P (Peer to Peer) networking. Today, overlay networks of all kinds are deployed in numerous forms and for diverse purposes; nearly half of the Internet traffic today is overlay/P2P related. In a general sense, the popular end-to-end infrastructure used by numerous corporations and entities is a form of overlay network. The reasons for erecting overlay networks are numerous. The main reason may be that, since IP architecture was originally designed for a purpose different from today's wide-ranging purposes, numerous attempts have been made to generalize the basic service provided by the original Internet. The most common objectives of these attempts are to provide services such as multicasting, striping, anycasting, and host mobility.

There exist two main approaches for overlay IP networks: the IP-layer approach and the application-layer approach. The application-layer approach suffers from being application specific and inefficient in operations. Most of these schemes are tied to a specific class of applications and specific functionality (and, therefore, are not scalable to all applications). As a result, many similar and largely redundant mechanisms are required to achieve a general set of goals. The problem associated with IP-layer approaches is that most were found to be unscalable to widespread deployment. The present invention distinguishes itself by consisting of an IP-layer approach while being infinitely scalable in both size and application. A representative application-layer approach is that of SIP overlay. A representative IP-layer approach is that of i3, an overlay scheme developed at the University of California Berkeley.

Most overlay schemes suffer similar drawbacks when compared to the present invention. In addition, since all application overlay schemes are restrictive in their application scope, there is no need to compare the present invention to these schemes in detail. i3 will be compared against the present invention as a representative IP-layer overlay scheme.

i3 suffers from several deficiencies not shared with the present invention. The key idea of i3 is indirection: separating sending and receiving operations in the routing of IP packets through a process referred to as rendezvous. This scheme is based on a data-centric (where the concept of flows is replaced by the concept of data) framework and is contrasted against the flow-centric framework of the present invention. In a data-centric framework, it is very difficult if not impossible to exercise flow control. Fundamentally, flow control is equivalent to packet scheduling in the IP architecture and to schedule packet forwarding properly in a network it is imperative for packets to "flow" on fixed paths. Otherwise, it is impossible to predict accurately the arrival of packets at fixed locations. On the other hand, due to the flow-centric framework, it is just as easy to exercise routing and flow control in the present invention. In addition, because of the indirect nature of rendezvous routing, i3 overlay suffers from inefficient routing while the present invention exercises direct routing at all times, which in the end proves more efficient.

Further, i3 cannot achieve morphism (defined below; basically means flexibility in the overlay network infrastructure) in its fullest meaning. For instance, i3 cannot implement an end-to-end overlay network, because it always requires a rendezvous point in the network doing the triggers. The rendezvous point cannot be implemented at the terminals; it has to be implemented at the core of the network, possibly via a server with a global IP address (so any terminal can reach it). That itself is a limitation in terms of Morphism (or flexibility). The concept of c-forwarding of the present invention enables end-to-end overlay without any core infrastructure, while i3 cannot.

There is another closely related work called virtual connectivity (VC) from a group of researcher from Microsoft Research Asia (2003). While VC shares the similar idea that a flow ID is inserted into IP packets, it lacks the routing functions performed by the over-lay network infrastructure of the present invention.

The present invention does not require IP addresses of each of the overlay infrastructure node (later called c-nodes in the application); this is a highly distinctive feature of the present invention. The present invention is a control-centric scheme; this should be contrasted with i3 and VC; each of them is a data-centric scheme wherein the data plane and control plane are not differentiated clearly.

Host mobility on the Internet is the second background field of the present invention. The Internet was originally designed according to the assumption that all hosts were to be attached to the network at fixed locations. With the advent of mobile networking, the movement of hosts violates this basic assumption. Thus, the critical questions emerges of how to maintain continuous connections when hosts change network attachment points with minimal or no modification to the applications using the connections. This problem arises because TCP/UDP connections break when one of the hosts in the connection changes its IP address and/or port number.

The mobility problem has received a tremendous amount of attention. Some studies even claims that the problem is so severe that a new Internet architecture is required. Existing solutions are broadly classified into four categories: application-layer, transport-layer, IP-layer, and new-layer. Application-layer approaches include SIP, DDNS, and MOBIKE, among others. Transport-layer approaches include TCP extensions and modifications (I-TCP, MTCP, LMDR TCP option, TCP-R, MSOCKS, etc.), M-UDP, m-SCTP, and DCCP, among others. IP-layer approaches include Mobile IPv4/IPv6 and its enhancements and LIN6, among others. New-layer approaches include HIP and MAST, among others. The present invention consists of a "new-layer" approach where the "new layer" may be inserted anywhere above the IP layer. The layer is placed between quotation marks because the present invention allows "new-layer" headers to be inserted anywhere in the packet. The present invention employs the basic idea of connection ID.

Current solutions can be classified even more broadly as solving four aspects of the mobility problem: handover management, location management, multihoming, and application transparency. While these four aspects are sufficient to classify current solutions, they fail to clarify the 8 fundamental sub-problems associated with mobility problems, which are described below.

The present invention distinguishes itself by directly addressing 8 fundamental sub-problems of the mobility problem: (A) Morphism: A problem whose solution requires the best mobility overlay network to be chosen among those characterized as end-to-end, gateway-based or mixed form, depending on the specific network conditions; (B) One-sided NAT and firewall traversal: A problem whose mobility solution allows IP packets to traverse NAT (Network Address Translation) boxes and firewall boxes when one side of the connection is located behind such boxes; (C) Double-sided NAT traversal: A problem whose mobility solution allows IP packets to traverse NAT boxes when both sides of the connection are located behind such boxes; (D) Simultaneous movement: A problem whose mobility solution maintains continuous connections while both sides of a connection are mobile; (E) Optimal versus triangular routing: A problem whose mobility solution allows optimal routes between mobile nodes when a fixed relay box is used between the two sides of the connection; (F) Topologically correct mobility: A problem in which IP packets are dropped due to the router rule stating that the source IP address of incoming packets must belong to a permitted set of IP addresses; (G) Total convergence: A problem whose solution entails that when two or more network links are simultaneously available, all the available network links are merged into a single link available at the IP-layer; and (H) Total integration: A problem whose mobility solution allows all applications to run seamlessly without any modifications.

It appears that no known mobility solution except the present invention resolves all 8 fundamental sub-problems. For example, every application-layer mobility solution suffers from the total integration problem, as the solution is application specific. The industry default solution Mobile IPv4/IPv6 suffers from the simultaneous movement problem. All existing non-IP-layer solutions suffer from the total convergence problem. The closest to a solution yet found is practiced by WiBoost Network wherein a virtual connection is created to control and utilize the separate network links when 2 or more network links are available. On the other hand, the present invention provides a single connection using all available network links. All transport-layer approaches also suffer from the total integration problem, as all of them involve modifications to the transport layer protocols (TCP/UDP), which means that applications must be modified to work with the modified transport layer protocols. On the other hand, the present invention does not require any changes to transport layer protocols.

Additionally, as a result of searching for better means of mobility management for IP networks, it has become clear that the original IP architecture is too "rigid." Despite being a tremendous success, IP protocol suites have increasingly been criticized as being too inflexible with regard to wide-ranging and rapidly evolving application requirements. For instance, by definition TCP connections (and therefore all the protocols that run on top of them, such as HTTP, FTP, TELNET, TCP-based video streaming, etc.) can only run in unicast mode and are bound to travel a fixed path constrained by the rule of "the best route given a destination IP address." Another well-known example of "Internet rigidity" concerns host mobility: The Internet was designed according to the assumption that the IP addresses of two communicating end points would not change while the connection between them was active. This assumption is massively violated in today's mobile environments. In addition, NAT and firewall boxes (which today are often referred to as middle boxes) violate the fundamental assumption that every IP address is globally unique. While they used to suffer vigorous opposition in the IETF, middle boxes today are massively deployed on a worldwide basis. Even with the rapid deployment of IPv6, it has been generally agreed upon that middle boxes are here to stay. The existence of middle boxes is a major cause for the increasing complexity of protocols such as SIP/VoIP. All these developments have exposed IP rigidity; the call for softening the IP architecture has been heard loud and clear in every corner of the technological world.

Explanation of background of the present invention starts with a VANET (vehicle ad hoc network) without roadside units. As roadside units mostly serve as gateways to the Internet, such a VANET becomes a huge intranet, which is an isolated IP (Internet Protocol) network. Such kind of VANETs will be referred to as pure VANETs in this application. The main issue of a pure VANET is its performance. First, the number of hops needed between two communicating end points can become excessively large. Second, a pure VANET can be disconnected if there are insufficient VANET vehicles on the street. To understand this problem, consider the case wherein two VANET vehicles communicate with one another, with a highways distance of 300 km separating between them. Using directional antennas, distance between transmitting and receiving vehicles over a single hop can be as high as 2-6 km. Thus, the number of hops in the round trip between these two vehicles is between 100 and 300. If per hop delay is 5 msecs, the total round trip time between the two vehicles could be as high as 1500 msecs, which is unacceptable. Therefore, for a pure VANET to be practical, it is necessary to minimize per hop delay. Further, another way to tackle the latency problem is to minimize the number of hops between two communications end points.

Yet another major technical problem with a pure VANET is lack of centralized infrastructure. In a pure VANET, the entire network is comprised of VANET devices installed in VANET vehicles. Typically a VANET device is a telematics box with limited computing and communications capacity. There are no centralized servers, switches, routers, or other heavy-duty telecommunications gears, which are often deployed by carriers. The challenge is to enable network control and management functions such as routing, connection setup/tear-down, without these gears organized in a centralized infrastructure. Therefore, a pure VANET is highly inadequate to provide telecommunication services such as mobile voice, mobile Internet, etc., which are routinely provided by carriers. Second, the background of the present invention is explained with regard to optimal routing and incentives in VANET. The wireless technology has now reached its theoretical limits (constrained by physics) that are impossible to surpass. The only way to further increase data speed is to shorten the transmission range and use smaller cells. Since the introduction of iPhones, the smartphone demand has skyrocketed. Thus, the demand for wireless mobile data bandwidth is ramping up at the time when the supply of bandwidth is hitting the ultimate bottleneck. This problem is particularly acute for vehicle mobile Internet (VMI) services. All major automakers of the world have spent a large sum of money to develop telematics services in the past decade. With the increasing popularity of wireless data services, demand for in-vehicle data services is also rising. One major issue facing VMI services is the need for high data rates.

VMI services are different from data services for small handheld devices. For smartphones, the display size is usually small (3"-6" display). However, for in-vehicle Internet services, the actual device could be multiple laptops (10"-20" display), multiple smartphones, or in-vehicle Internet devices of all kinds. Thus, the data rate required for VMI is a lot more than the data rate required for a smartphone. The data rate is especially large if multimedia and streaming applications are used in a car. For high-quality video streaming, a minimum of 10 Gbps to 20 Mbps is needed. For live stream HDTV, the data rate requirement jumps to 25 Mbps. Thus, when there are multiple laptops streaming high-quality videos in the same vehicle, the bandwidth requirement can jump to 100 Mbps, which is not sustainable in today's 4G networks. The 326 Mbps peak download speed from the LTE technology is misleading. This speed is only achievable near the cell center. If a terminal is at mid-range or a far distance from the cell center, the drop in peak data rate is large—the drop in data rate is exponential in distance. Further, as more bits are stuffed in each symbol, the rate is highly susceptible to interference from obstructing objects (glass buildings and elevators especially). Therefore, the traditional macro-cell architecture is no longer feasible if HDTV streaming is required in a car.

Therefore, the VANET architecture is almost assuredly needed even as carriers are touting 5G technologies. No matter what will happen, due to the fundamental limits imposed by physics, the only way to provide HDTV and other high-bandwidth services in a vehicle is via a small-cell short-range transmission infrastructure. Since vehicles are mobile, the infrastructure has to be ad hoc—this means the VANET architecture. The most common VANET architecture is based on the Wi-Fi technology. Currently, IEEE is in the process of standardizing the 802.11p (WAVE) technology based on this architecture. In a VANET, there are two kinds of communication: vehicle-to-vehicle (V2V) and vehicle-to-roadside (V2R). The two major technical issues for VANET are: (a) high MAC (media access control) layer overheads in the ad hoc communication, and (2) inefficient routing.

In the current VANET technology, vehicles communicate with one another by tuning to the same channel. Since Wi-Fi is based on CSMA C/A (carrier sense multiple access collision avoidance) control scheme, a transmitter is allowed to send if it senses that the channel is unused. This can result in packet collisions. Such issues are called the hidden node problem, which includes two sub-problems: the hidden terminal problem and the hidden transmitter problem. There are two approaches to this problem: (1) explicit reservation, (2) and implicit reservation. In the explicit reservation approach, a common method is to use RTS (request-to-send) and CTS (clear-to-send) signaling to reserve a packet/frame slot. Such a scheme may incur too much delay and is not suitable for real-time applications. Other explicit reservation schemes use a TDMA (time division multiplexing) method. One example is called STDMA (self-organizing TDMA) which is used in a commercial system called AIS (automatic identification system) for communications between ships. In the implicit reservation approach, priority queuing is used. This is the approach adopted by IEEE 802.11p. The problem with such a scheme is that delay is unbounded. No matter which scheme is used, excessive amount of time is wasted in control signaling. For most data applications, any RTT (round trip time) greater than 300 ms (milliseconds) is barely tolerable. For real-time applications such as voice conversations, RTT greater than 250 ms is impossible. Now, MAC layer control can add as much as 20-30 ms per hop in a VANET. If the a packet has to traverse 10 hops in a VANET, the delay incurred in the VANET is already 200-300 ms, making the VANET unsuitable as a high-quality internet medium. To minimize the number of hops inside a VANET, it is necessary to allow more transmitters to send to the same receiver. This may cause packet collisions at the receiver if no reservation is made. Two issues arise from this approach. How to choose a proper receiver from a group of VANET nodes, and how to minimize packet collisions?

Another major technical issue for a VANET is that routing is inefficient and unreliable. The conventional shortest path routing does a poor job in an ad hoc network where the network topology can change rapidly. Often the computation to find the best path takes too much time, and the paths found remain problematic (having a long latency, for example). In addition, a single or multiple faults can disconnect a node easily. A major business issue in VANET deployment is getting a critical mass of roadside access points. The present invention will also provide a method for incentivizing roadside merchants and residents to share their broadband bandwidth via access points. For the easy reference, a VANET that is constructed in accordance with the present invention will be referred to as VINET (vehicle internetwork).

Third, the background of the invention is explained with regard to P2P mobile virtual network operator model and routing. In a VANET, free Wi-Fi bandwidths are available to for both V2V (vehicle to vehicle) and V2R (vehicle to roadside) data communications. A major application of VANET is VMI (vehicle mobile Internet), in which a user in the car connect to the Internet through a gateway which serves as the backhaul access point to the Internet. The VANET operator pays for the backhaul bandwidth, and the VANET vehicle owners pay for the Wi-Fi bandwidth within the VANET. In this case, the vehicle owners share the V2V bandwidth, and the vehicle owners and the VANET operator share the V2R bandwidth. The carriers have on contribution to the bandwidth in this setup. However, when the number of VANET vehicles on the street is too low, for example, at night or during the holidays, a VANET operator will enable a VANET vehicle to connect directly to a cellular carrier. At the writing of the present invention, no commercial VANET is operational, and often a carrier will offer VMI service to vehicle owners.

Fourth, the background of the invention is explained with respect to business scheme that can be realized with the present invention. Free-Air business model has numerous ways of monetizing the free services, among them, the primary and native is LBMA. LBMA has been touted as the Holy Grail of advertising because of geo-targeting. These ads are given at a time when a consumer actually needs merchants' information or at a location where he welcomes the convenience of piggybacking on his intended trip. The CTR (click through rate) for LBMA is about 10 times better than non-targeted ads. In a recent month-long trial by Chili's using Navteq's LocationPoint platform, the advertisers posted a click-through rate high of 2.49 percent—more than 13 times the 0.19 average of online banner ads, according to Forrester Research.

The Navteq trial found that of those consumers who clicked on location intelligent ads, 39 percent clicked through for additional details, including turn-by-turn or step-by-step directions to the advertised merchant's retail location. In Europe similar trials show 7 percent CTR and a 39 percent conversion to "click to map." Navteq adds: "The power of location-based advertising is creating a virtual storefront." LBMA actually extends retailers' storefront a couple-mile radius around the location, essentially inviting the ad receiver to come in and transact.

SUMMARY OF THE INVENTION

It is, therefore, an object of the present invention to supply a system and method for providing a simple yet flexible overlay network on top of any other IP network to enable diverse network applications where much of IP protocol suite rigidity is eliminated without any modifications to the applications. Another object of the present invention is to supply a system and method for providing simple and flexible IP overlay networks to solve the general IP mobility problem, defined specifically below. It is another object of the present invention to supply a system and method for providing simple and flexible IP overlay networks in order to enable unicast connections between two end points to utilize multiple paths and multiple network links which may originate from distinct network media and technologies. It is another object of the present invention to supply a system and method for providing simple and flexible IP overlay networks to enable multicast, anycast, and any other conceivable connection between a group of sending end points and a group of receiving end points under the current IP architectures while avoiding any indirection in routing such as occurs in the i3 overlay architecture. It is another object of the present invention to supply a system and method for providing simple and flexible IP overlay networks to enable any arbitrary but feasible scheduling of IP packet forwarding over the overlay. It is another object of the present invention to provide a system and method for creating overlay networks within overlay networks over any underlying IP networks; wherein paths within paths and connections within connections constitute components of the overlay network.

In accordance with one aspect of the present invention, there is provided a method for associating a connection identifier (connection ID) with an individual connection between two groups of end points; wherein the connection ID is locally unique at any point inside the overlay network. In accordance with one aspect of the present invention, there is provided a method for setting up logical devices of primitive kind to accomplish the full functionality of the overlay network. In accordance with one aspect of the present invention, there is provided a method for IP packets with identical connection ID to traverse paths set up by the overlay network infrastructure. In accordance with one embodiment of the present invention, there is provided a system comprising: a plurality of c-nodes; one or more source terminal nodes connected to an IP network; and one or more destination terminal nodes connected to the IP network, wherein the source terminal nodes send IP packets over the plurality of c-nodes to the destination terminal nodes to accomplish arbitrary communications between arbitrary groups of the source terminal nodes to arbitrary groups of the destination terminal nodes. In accordance with one embodiment of the present invention, each of the IP packets is an ordinary IP packet or a c-packet, wherein the c-packet is an IP packet including an MTEG header, wherein the MTEG header contains a tetrad field and a CID field, wherein the tetrad field contains at least a source IP address, a source transport layer port number, a destination IP address and a destination transport layer port number, in an ordered format. In accordance with one embodiment of the present invention, the MTEG header of the c-packet resides anywhere in the packet. In accordance with one embodiment of the present invention, each of the c-nodes performs the operations of: receiving an input packet, wherein the input packet is an ordinary IP packet or a c-packet; producing a plurality of output packets, wherein each of the output packets is an ordinary IP packet or a c-packet; and forwarding the output packets to their respective destinations as ordinary IP packets. In accordance with one embodiment of the present invention, each of the c-nodes is coupled with a status table, wherein each entry of the status table includes a tetrad list and a CID, wherein the tetrad list is a list of tetrads in an ordered format.

In accordance with one embodiment of the present invention, each of the c-nodes is coupled with a routing function unit, wherein in the operation of producing the output packets from the input packet, the routing function unit uses contents of the status table coupled with the c-node and the MTEG header of the input packet to produce the output packets. In accordance with one embodiment of the present invention, at least one of the c-nodes performs the operation of: when the input packet is an ordinary input IP packet, inserting an MTEG header into the input packet to thereby produce a c-packet as the output packet. In accordance with one embodiment of the present invention, at least one of the c-nodes performs the operation of: when the input packet is a c-packet, removing an MTEG header from the input c-packet to produce an ordinary IP packet as the output packet. In accordance with one embodiment of the present invention, at least one of the c-nodes performs the operations of: when the input packet is a c-packet, determining a new MTEG header by the routing function unit; and swapping the MTEG header of the input c-packet with the new MTEG header; to thereby produce a modified c-packet as the output packet. In accordance with one embodiment of the present invention, at least one of the c-nodes performs the operations of: when the input packet is a c-packet, duplicating a plurality of copies of the input c-packet, wherein the number of the copies is determined by the routing function unit; and determining a new tetrad for each copy of the input c-packet by the routing function unit; and modifying each copy of the input c-packet with the respectively determined new tetrad in the MTEG header, to thereby produce a plurality of modified c-packets as the output packets. In accordance with one embodiment of the present invention, at least one of the c-nodes performs the operation of: when the input packet is a c-packet, receiving a sequence of input c-packets, wherein the number of the input c-packets is determined by the routing function unit; determining a new tetrad for each of the input c-packets by the routing function unit; and modifying each of the input c-packets with the respectively determined new tetrad in the MTEG header, to thereby produce modified c-packets as output packets.

In accordance with one embodiment of the present invention, the routing function unit guarantees that the c-packets related with a first source-destination terminal pair include a CID associated with the source-destination terminal pair, wherein the CID is different from CIDs of c-packets related with other active and distinct source-destination pairs at each of the c-nodes during an active communication life of the first source-destination terminal pair. In accordance with one embodiment of the present invention, the CID associated with the first source-destination terminal pair remains unchanged during the active communication life of the first sources-destination terminal pair. In accordance with one embodiment of the present invention, the status table is updated in response to an update signal from at least one of the source terminal, the destination terminal and another c-node. In accordance with one embodiment of the present invention, the CID and the tetrad are recursively defined and stored in a vectored format. In accordance with one embodiment of the present invention, there is provided a method employing the system, the method comprising: creating a plurality of unicast IP connections, wherein IP packets associated with the same unicast IP connection are delivered over a multi-path, multi-network mechanism.

It is an object of the present invention to provide a virtual circuit routing technology that minimizes per-hop delay in a pure VANET. It is another object of the present invention to utilize a DHT (distributed hash table) based distributed algorithm in assigning IP addresses in a pure VANET. It is yet another object of the present invention to utilize a DHT-based distributed algorithm for storing and retrieving IP addresses for nodes in a pure VANET. It is yet another object of the present invention to provide a distributed algorithm to modify routing tables in a pure VANET, wherein the routing tables enable virtual circuit routing of IP packets. It is yet another object of the present invention to enable data frame transmissions from a secondary relay node if a primary relay node fails to forward a block of data frames within a set time limit. It is yet another object of the present invention to provide a channel assignment algorithm that will minimize the number of hops a packet has to traverse in a VINET. It is yet another object of the present invention to use a TDMA (time division multiple access) scheme as an option for packet reservations so as to minimize packet collisions in a VINET. It is yet another object of the present invention to provide a scheme to select relay nodes from a group of potential VINET nodes. It is yet another object of the present invention to provide a routing algorithm which is based on the principle of paralleling packet flows with traffic flows. It is yet another object of the present invention to provide incentives for roadside merchants and residents to share their broadband bandwidths in a VINET social network. It is yet another object of the present invention to provide a framework to unlock the economic value of the Wi-Fi bandwidths of a home owner who pays for the broadband Internet connection through a P2P MVNO business model. It is yet another object of the present invention to provide a framework to unlock the economic value of V2V and V2R Wi-Fi bandwidths of a VANET operator and the individual vehicle owners who participate in the VANET through a P2P MVNO business model. It is yet another object of the present invention to provide a general framework to unlock the economic value individual owner of a piece of customer premise equipment (CPE), such as a smartphone, a laptop, a tablet PC, a MID (mobile Internet device), a PDA, or any handheld device that is connectable to the Internet through a wireless interface through a P2P MVNO business model. It is yet another object of the present invention to assign orthogonal radio channels for all simultaneous V2V and V2R transmissions that arrive at the same location. It is yet another object of the present invention to set up virtual circuits in a VANET in accordance with location coordinates. It is yet another object of the present invention to enable multipath packet from a single source to single destination, wherein part of the paths reside within a VANET or a composite Wi-Fi mesh network.

In order to achieve the objects, the present invention provides an electronic data communication network comprising a plurality of moving nodes and a plurality of stationary nodes. The moving node comprises a vehicle communication device installed in a human-controlled vehicle. The human-controlled vehicle moves along predetermined paths. The moving node comprises a starting node that sends the data, a relay node that relays the data, and an ending node that receives data. A virtual circuit is formed along a path comprising the relay nodes for data communication. The virtual circuit is identified by the path; wherein routing of data from the starting node to the ending node is performed with P2P routing algorithm. The stationary node comprises a fixed communication device installed in a fixed communication structure. The stationary node is connected to the Internet.

The predetermined paths comprise a plurality of roads for vehicles and the stationary nodes comprise a plurality of road side units installed along the roads. The stationary node further comprises a plurality of commercial units. Merchant of the commercial unit is notified with information for moving nodes approaching to the commercial unit. The merchant provides time and location dependent advertisements to users of the moving nodes. The advertisements are filtered by the users of the moving nodes. The positions of moving nodes relative to the stationary nodes form a map for the moving nodes. The merchants are provided user's preference together with the position of the user within the map. The road comprises a plurality of zones. The virtual circuit is tied to the zones. The virtual circuit operates at layer 2 as a service to layer 3. Data frame is identified a virtual circuit ID at layer 2. The node looks up the virtual circuit ID, retrieves the identifier of the next channel to transmit the frame from a virtual circuit routing table using the virtual circuit ID, whereby the processing delay is comprised of the virtual circuit ID lookup time and the time to retrieve the next channel identifier. The relay node is chosen utilizing broadcast so that the distance between a transmitting node and a receiving node is increased up to a threshold value that provides minimum effective bandwidth, whereby the number of hops between two end points is minimized.

A routing table comprises records. The record comprises VCID, node_status field, and next_channel ID. The node keeps track of the location by the subzone ID and the number of virtual circuits for which the node carries traffic. The P2P routing algorithm performs updating the current subzone position for each node, detection of a node in a virtual circuit has left the network, selection of a new node in the virtual circuit that has change in its nodes, determination of the channel number for each node in each virtual circuit, updating the routing table according to the changes in the nodes, and setting up and tearing down virtual circuit, whereby moving of the vehicles relative to the roads is reflected. The GPS coordinate of a subzone is mapped to the IP address of a node in the subzone, whereby the IP address of the node approximately reflects the GPS coordinates of the node. Each node maintains a table of active IP addresses in the subzone in which it is located. The table is updated using a distributed hash table algorithm, whereby IP address conflicts are avoided. The predetermined path for the vehicles comprise a relative topology in which all moving nodes moving on the same road have zero relative velocity. The subset of all moving nodes on the same road form a relative topology that does not change in time. Packets from and to the nodes inside a subset of the relative topology are restricted to restricted to be routed through the nodes in the subset of moving nodes and bordering nodes, whereby the routing in the network is decomposed into routings associated with individual relative topologies.

Routing is performed so that the packet flows from the Internet to moving nodes are in the anti-parallel direction of the traffic flow, and the packet flows from the moving nodes to the Internet are in the parallel direction of the traffic flow, whereby need for forced handovers is reduced. All moving nodes on the same road are organized into disjoint subsets. Each disjoint subset is assigned a discrete color. Packets are forwarded from one colored subset to the next colored subset. Data frames are reserved in blocks. Each block is assigned a block ID. A number of relay moving nodes are specified as backup relay node. If timeout occurs, then backup relay node making the detection retransmits the block. The block ID is unique in all the transmissions from a source moving node to a destination stationary node. A control plane maintains topology tables and IP address tables to enable moving nodes and stationary nodes to find each other in terms of IP addresses; assigns channels; and calculates potential trajectory of each moving node to start an anticipative handover. Packets are transmitted within the same TCP connection using multiple bandwidths whereby bandwidth bonding increases throughput. The user of the vehicle communication device is provided with a stationary communication device that is adapted to be used at a fixed location, is included as part of the network, and is authenticated for the same user.

In accordance with one aspect of the present invention, the P2P MVNO offer free in-network services as incentives to get new subscribers (also called members or peers) to join the MVNO. Free in-network services may include free VoIP, video conferencing, and location-based services. In accordance with one aspect of the present invention, taxies on the streets are targeted as the initial customers in the P2P MVNO, wherein each participating taxi will get services from the P2P MVNO such as call-center service, mVoIP (mobile voice over IP), VMI service, and LBSs (location-based services). In accordance with another aspect of the present invention, a composite Wi-Fi mesh network on the street is formed by connecting CPE devices on the street, roadside APs (access points), femtocells APs, and picocells APs, using both the ad hoc mode and the infrastructure mode. In accordance with another aspect of the present invention, bandwidth bonding, vertical handover, and multi-path packet delivery mechanisms are employed to increase the total bandwidths and reliability of the composite Wi-Fi mesh network. In accordance with one aspect of the present invention, a distributed algorithm is used to store the IP addresses of the nodes in the composite Wi-Fi mesh network in a distributed database. This algorithm is based on DHTs (distributed hash tables). In accordance with another aspect of the present invention, the composite Wi-Fi mesh network perform self-scaling, self-healing, and self-organization, based on a distributed algorithm using DHTs.

Free-Air is a virtual infrastructure (VI) service in that it organizes vast amounts of free resources around the globe into a useful distributed facility to provide three free services: (a) free Wi-Fi access to the Internet on the street/commercial areas, (b) mobility support for data, and (c) mobility support for streaming applications such as voice over IP (VoIP). The free resources are mobile terminals (smartphones, laptops, tablets, and mobile Internet devices), Wi-Fi access points (APs), and desktop PCs and servers owned by individuals or merchants. These resources are willingly shared by the owners because of strong incentives provided by the Free-Air business model. Owners of mobile terminals are strongly motivated to get free Wi-Fi bandwidths in public areas (streets, plazas, hallways in shopping malls) and on the commercial premises (shops). Today, many will simply go to Starbucks or any stores that provide free Wi-Fi just to get connected. Merchants are often happy to provide free Wi-Fi bandwidths as they tend to increase sales. In the Free-Air model, the primary monetization is called Ad-Flow. This is a location-based mobile advertising (LBMA) scheme. Merchants will be able to offer e-coupons and special deals through mobile ads using a Free-Air application running on Free-Air enabled mobile terminals. The Free-Air virtual infrastructure will match handsets with merchants according to a prescribed set of conditions. Mobility support is an important enhancement for Wi-Fi users. On busy streets or shopping plazas, there will be many free Wi-Fi APs. It will be a nuisance to experience stop-n-reconnect Web access. With seamless mobility between Wi-Fi cells, users will not sense a handover has occurred. Commercial-grade VoIP services like Skype will enjoy seamless handover between two Wi-Fi cells. As these VoIP services are either free or extremely low priced, incentives for handset owners to go to a Free-Air Wi-Fi zone is very strong. In order to get full benefits, both individuals and merchants have to become a member of the Free-Air community. Membership will be provided for free. In exchange for the benefits, a handset owner must consent to run a Free-Air application on their terminals once they are within a Free-Air zone. Similarly, merchants must run a Free-Air application that allows them to send mobile ads to the matched handsets. All equipment of the members (handsets, APs, and PCs) must allow insertion of lightweight Free-Air software that enables the functionalities of the Free-Air services. As all parties (individuals and merchants) will only benefit tremendously by joining the Free-Air membership, a large customer base will be acquired within a short period of time. In the second phase of the Free-Air business model, a commercial VANET (vehicle ad hoc network) will be constructed. In this VANET, a telematics box with multiple antennas will be installed on VANET vehicles. In addition, multiple-antenna Wi-Fi APs using 802.11a channels on the roadside will also be installed. The initial VANET will be set up in collaboration with the local government of a major city or metropolitan area. The local government will be happy to engage such a project as the VANET will provide two important civil services: (a) telematics services for intelligent transportation systems, (b) vehicle mobile internet (VMI) service for the government and the general public. Initially, the only VANET vehicles will be buses and government vehicles. Later, taxis and private vehicles will be added. In its final form, the Free-Air business model will become a new breed of MVNO (mobile virtual network operator). In the traditional MVNO model, the operator offers voice and data services. In the Free-Air model, only wireless data bandwidth (both free and fee-based) will be provided. Free-Air will be able to offer to its members numerous and highly diverse applications such as VoIP, IPTV, VMI, headline news, e-commerce, e-entertainment, etc. through 3rd party vendors. The types of services and applications offered through Free-Air will be unlimited as long as they can be enabled through a mobile terminal. In this sense, a Free-Air operator is a diversified communications provider. At home or corporate sites, Free-Air provides Wi-Fi bandwidths that piggyback on the broadband connections subscribed by home owners and corporations, similar to femtocell services provided by carriers. On the street and commercial premises, Free-Air provides free Wi-Fi bandwidths shared by merchants. Inside a vehicle, Free-Air provides fee-based VMI using a VANET. Only in the country side or non-Free-Air zones, Free-Air provides fee-based bandwidths through a 3rd party carrier infrastructure.

BRIEF DESCRIPTION OF THE DRAWINGS

The above and other objects and features in accordance with the present invention will become apparent from the following descriptions of preferred embodiments in conjunction with their accompanying drawings, in which:
in FIG. 10A, the template of a regular IP packet with an MTEG header (the label);
in FIG. 10B, a specific example of a c-labeled packet in which the IP tetrad resides in the IP header and the CID resides in the MTEG header.

DETAILED DESCRIPTION OF THE PRESENT INVENTION

The first key idea of the present invention is to provide 5 logical IP processing devices that can be interconnected to enable overlay network routing at the IP-layer. Expanding the basic IP forwarding function into the logical functions enables the concept of C-morphism (defined below), which solves the IP rigidity problem. The second key idea is to expand the overlay-networking IP routing to include the concept of flows. Two advantages are immediate: (1) seamless handoffs in the mobile environment are enabled, and (2) flow control through packet scheduling is enabled. This is accomplished by utilizing the concepts of tetrad and flow ID, described below. The third key idea is to solve the mobility management problem by formulating a generalized IP mobility problem whereby all the fundamental issues are clearly delineated. These fundamental issues are summarized in the form of 8 fundamental sub-problems. The fourth key idea is, through solutions enabled by overlay networks, to solve the individual sub-problems in the generalized IP mobility problem through specific embodiments of the present invention.

To organize the description of the present invention, the following structure will be followed: (1) Basic definitions, (2) Generalized IP mobility problem, (3) Overlay network infrastructure, and (4) Specific embodiments.

Basic Definitions

In the present invention, the following definitions will be used:

IP node: A logical device with an IP address and the capability to process IP packets.

Terminal: An IP node that can be used by a human to interface with an IP network (e.g., a host computer, a mobile phone with GPRS connectivity, etc.).

MT (Mobile Terminal): A terminal that can move from one network location to another while one or more of its connections (e.g., TCP or UDP connections) are active.

CT (Corresponding Terminal): A terminal that is communicating with an MT at the other end-point of the connection.

MG (Mobile Gateway): A non-terminal IP node that performs specific operations to enhance mobility management.

An IP connection (or simply a connection) will be understood as a set of packets traveling from one terminal (TR1) to a second terminal (TR2), all carrying the same IP tetrad. An IP tetrad (or simply a tetrad) consists of: (1) TR1's IP address (ipa_tr1), (2) TR1's TCP or UDP port number (prt_tr1), (3) TR2's IP address (ipa_tr2) and (4) TR2's TCP or UDP port number (prt_tr2). The tetrad is organized into an ordered structure, as in [ipa_tr1, prt_tr1, ipa_tr2, prt_tr2] wherein symbols such as T, T1 or T2 indicate particular instances of tetrads; for example, T=[ipa_tr1, prt_tr1, ipa_tr2, prt_tr2].

Since IP tetrads are ordered vectors, packets traveling from TR1 to TR2 belong to a different connection than those traveling from TR2 to TR1. The most common examples of IP connections are TCP or UDP connections.

Figure 1:
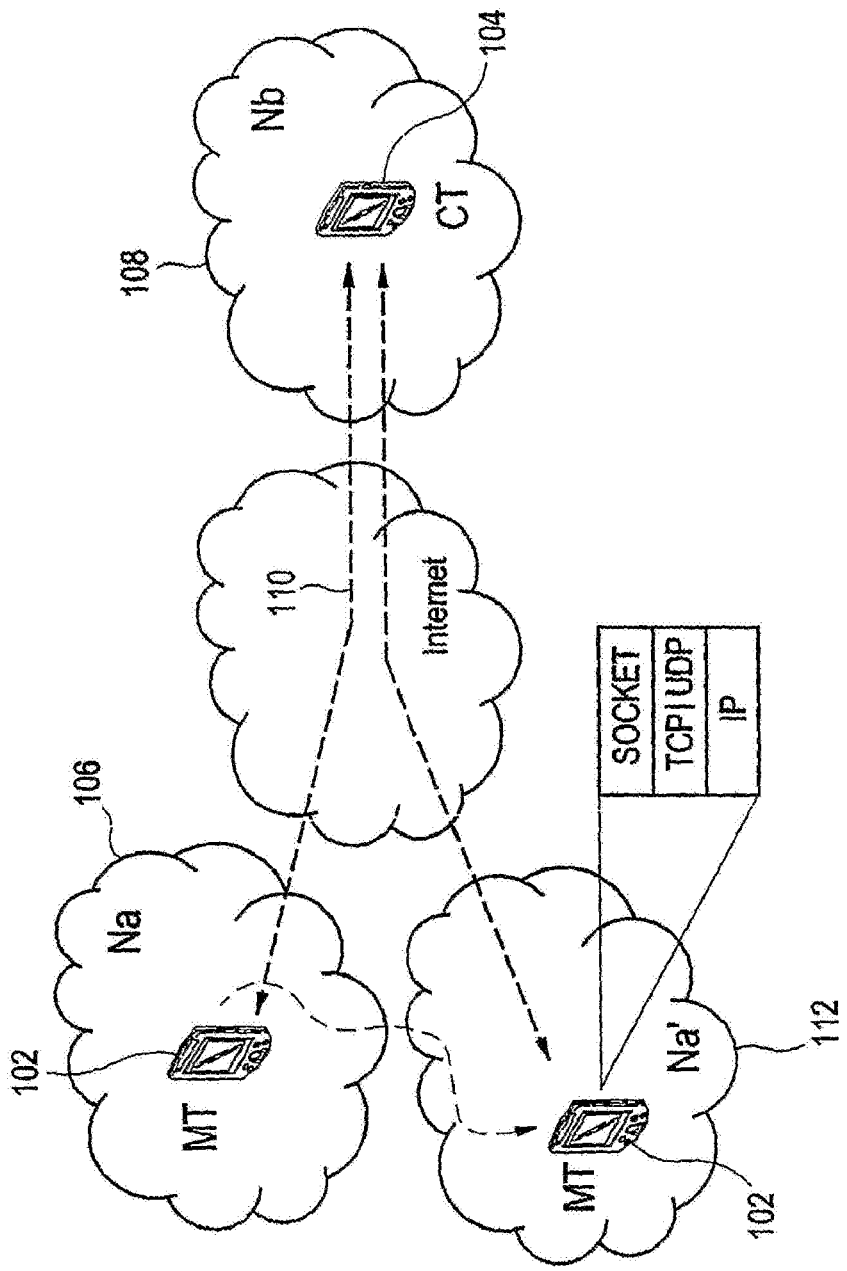
FIG. 1 defines the IP host mobility problem.

Generalized IP Mobility Problem: The generalized IP mobility problem will be understood as follows. Let MT 102 and CT 104 be two terminals attached to an IP network via networks Na 106 and Nb 108, respectively (FIG. 1). Suppose that MT 102 and CT 104 are exchanging data (bi-directionally) via an IP connection (e.g., a TCP or a UDP connection) 110. For the sake of descriptive simplicity, the connection 110 is assumed to entail both directions (from MT 102 to CT 104 and from CT 104 to MT 102). Suppose now that MT 102 moves from network Na 106 to another network Na' 112 in such a manner that at the new network 112, MT 102 is assigned a new source IP address and source TCP or UDP port number (ipa_mt' and prt_mt', respectively). The generalized IP mobility problem focuses on protocol correctness and is described below.

The generalized IP mobility problem: How can connection 110 be maintained after MT 102 moves to the new network 112? This question can be broken down further into two sub-problems: (1) How can packets in connection 110 traveling from CT 104 to MT 102 be correctly routed after MT 102 moves to the new network 112? (2) How can packets in connection 110 traveling from MT 102 to CT 104 be correctly routed after MT 102 moves to the new network 112?

Figure 2A:
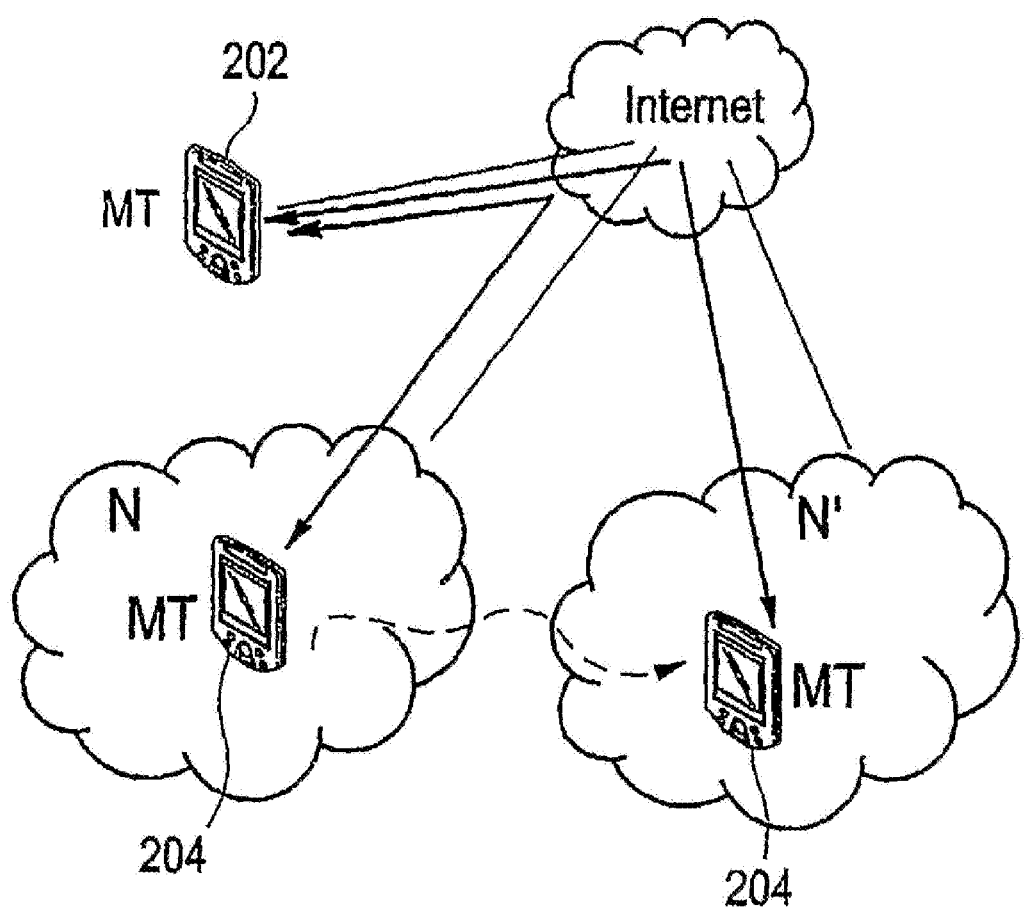
FIGS. 2A and 2B set forth a morphism example: end-to-end (FIG. 2A) versus gateway based (FIG. 2B)
Figure 2B:
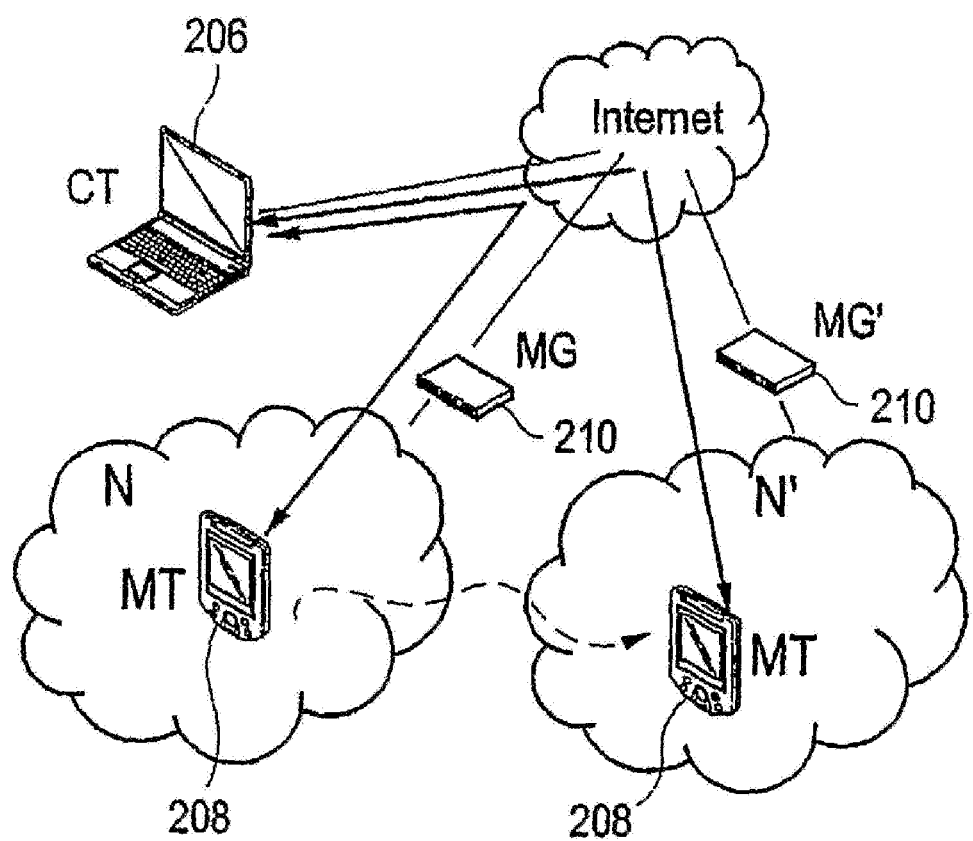

(A) Morphism: Because the Internet was not originally designed for mobile terminals, one of the challenges in developing IP mobility concerns the interoperability of legacy devices. In general, a solution should be inserted at certain points in the network to enable mobility while minimizing disruption. Depending on the requirements of specific network scenarios, certain locations will be more appropriate than others for insertion of the technology. The capability of a mobility solution to adapt itself to multiple networking scenarios will be understood in the present invention as morphism. A common instance of morphism concerns the case of end-to-end versus gateway-based solutions, as shown in FIGS. 2A and 2B, respectively. In the end-to-end scenario, mobility technology is inserted only at end terminals 202 and 204. The advantage of this solution consists of the elimination of infrastructure at the core of the network, rendering the solution most scalable. In the gateway-based solution, the technology is inserted only at one of the terminals 206 and 208 and a certain amount of gateways are introduced at the core of the network. The advantage of this solution consists of allowing mobile terminal 208 to communicate with legacy non-mobile terminal 206.

Figure 3:
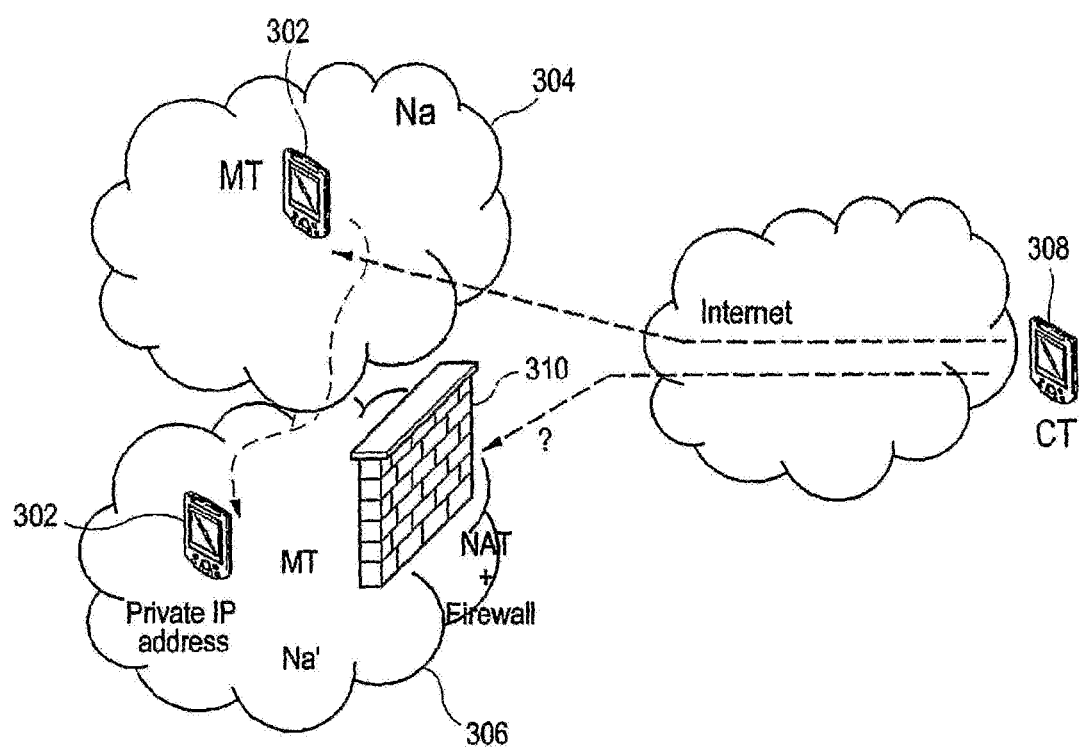
FIG. 3 illustrates the one-sided NAT traversal problem.

(B) One-Sided NAT and Firewall Traversal: Today NAT boxes are massively deployed all across IP networks, making NAT traversal a necessity for most TCP-UDP/IP connections. Consider FIG. 3, wherein terminal MT 302 moves from network Na 304 to network Na' 306. The scenario at hand assumes that network Na' 306 is connected to the Internet through a NAT box. Therefore, upon moving to the new network Na' 306, MT 302 will acquire not a public but a private IP address. Now the question arises: how can CT 308 send data to MT 302 if MT 302 acquires a private (and, therefore, a non-globally addressable) IP address? Firewalls also tend to aggravate the problem of IP mobility, as shown in FIG. 3. (Most commercial NAT boxes are integrated with firewalls, as indicated by the reference numeral 310 in FIG. 3). In general, the existence of a firewall box in the communication path indirectly increases the complexity of the mobility problem since the mobility protocol needs to generate certain control packets (e.g., control packets exchanged between MTs, CTs, and MGs) that may not survive the traversing of the firewall, inducing a sort of "bootstrapping problem." This problem will be referred to as the firewall-bootstrapping dilemma, or FBD. An illustrative example of FBD appears in IETF document RFC 3519. This standard consists mainly of an amendment of RFC 2002 in providing a solution to the otherwise unresolved NAT traversal problem of Mobile IP. However, a solution requires the opening of UDP port 434 on all firewalls traversed along the communication path. Therefore, the technique employed to resolve the FBD is disruptive and introduces a potential security glitch. Solving the FBD without provoking such potentially destructive side effects is yet another benefit of the present invention.

Figure 4:
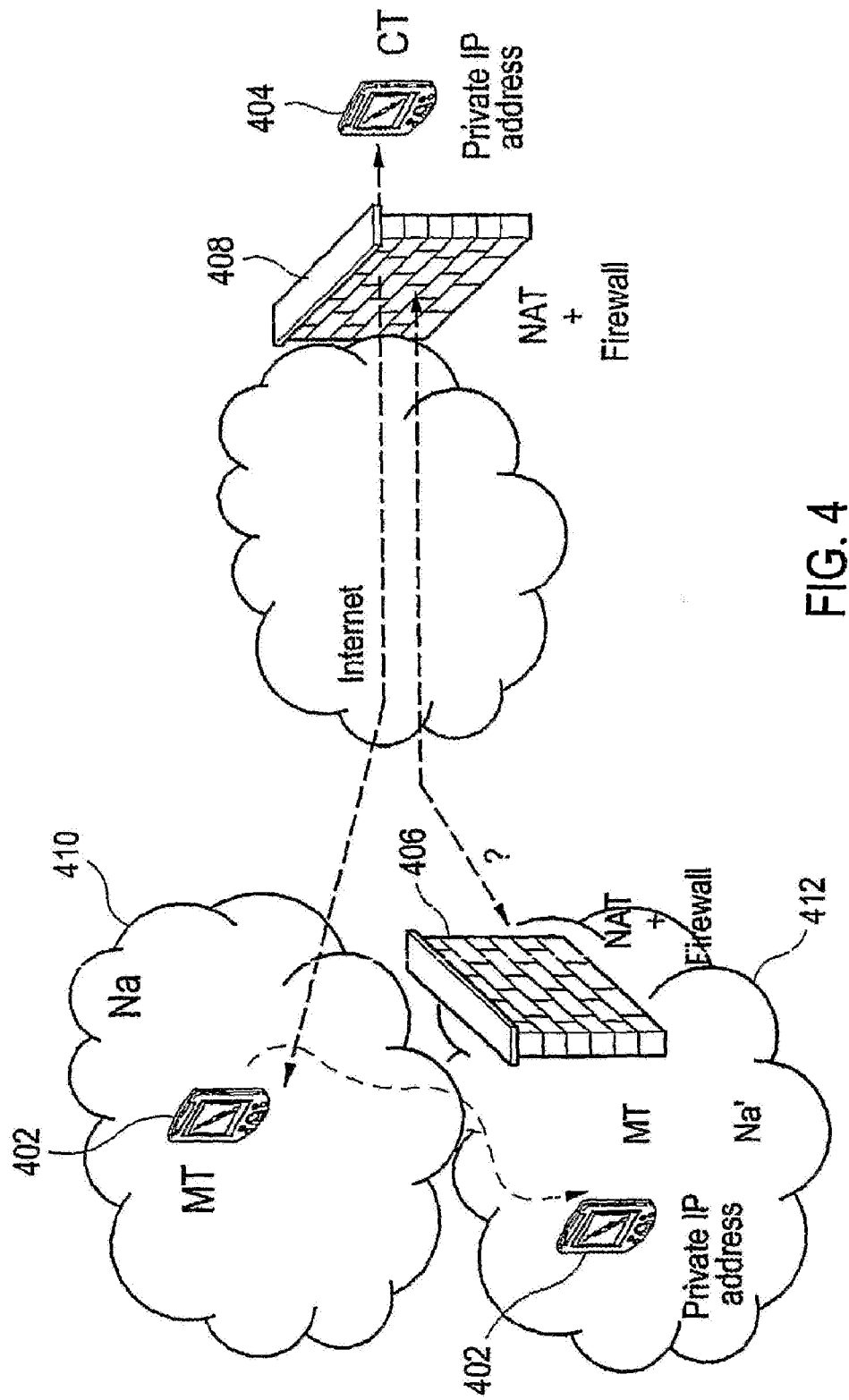
FIG. 4 illustrates the double-sided NAT traversal problem.

(C) Double-Sided NAT Traversal: The double-sided NAT traversal problem arises from the scenario in which both MT 402 and CT 404 connect to the global Internet via NAT boxes 406 and 408 (FIG. 4). While the cause of the problem is the same as in the case of single-sided NAT traversal, the present invention identifies this scenario as a different class of problem since its solution requires a different type of technology, for unlike the single-sided case, the double-sided NAT traversal problem induces a deadlock situation: Upon moving from network Na 410 to network Na' 412, MT 402 cannot communicate to CT 404 since is the latter is positioned behind NAT 408 in which no hole has been punched for the new connection tetrad {ipa_mt', prt_mt', ipa_ct, prt_ct}. However, for CT 404 to punch a hole in its own NAT 408 to allow MT 402 communicate with CT 404, CT 404 must be aware of this action [ipa_mt', prt_mt'], leading to a deadlock situation. It can be proven that a solution to the double-sided NAT traversal problem requires a third element or box to act as a relay in the network. In the present invention, a relay box may be inserted to solve the deadlock problem easily.

Figure 5:
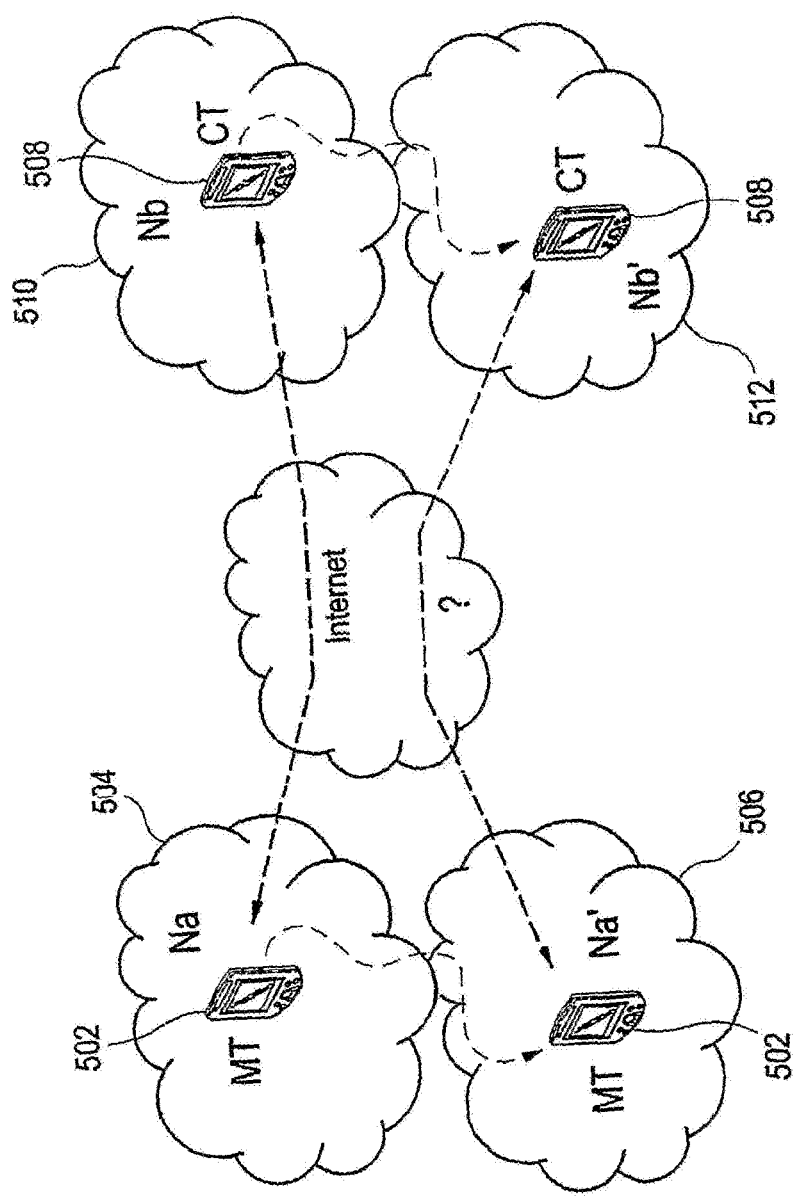
FIG. 5 illustrates the simultaneous movement problem.

(D) Simultaneous Movement: Consider FIG. 5 and suppose that MT 502 moves from Na 504 to Na' 506. Likewise, suppose that CT 508 initiates a handoff from network Nb 510 to Nb' 512. If CT 508 leaves network Nb 510 before MT 502 has concluded its transition to network Na' 506, MT 502 and CT 508 are said to have simultaneously moved (the same applies to the case where the terms MT 502 and CT 508 are exchanged). Notice that while the root cause of the simultaneous movement problem differs from that of the double-sided NAT traversal problem, both situations suffer the same consequences: both terminals lose contact with each other and are unable to exchange enough control information to finalize a handoff. Just as in the double-sided NAT case, a third element in the form of a relay box will be needed to resolve any simultaneous movement situation.

Figure 6:
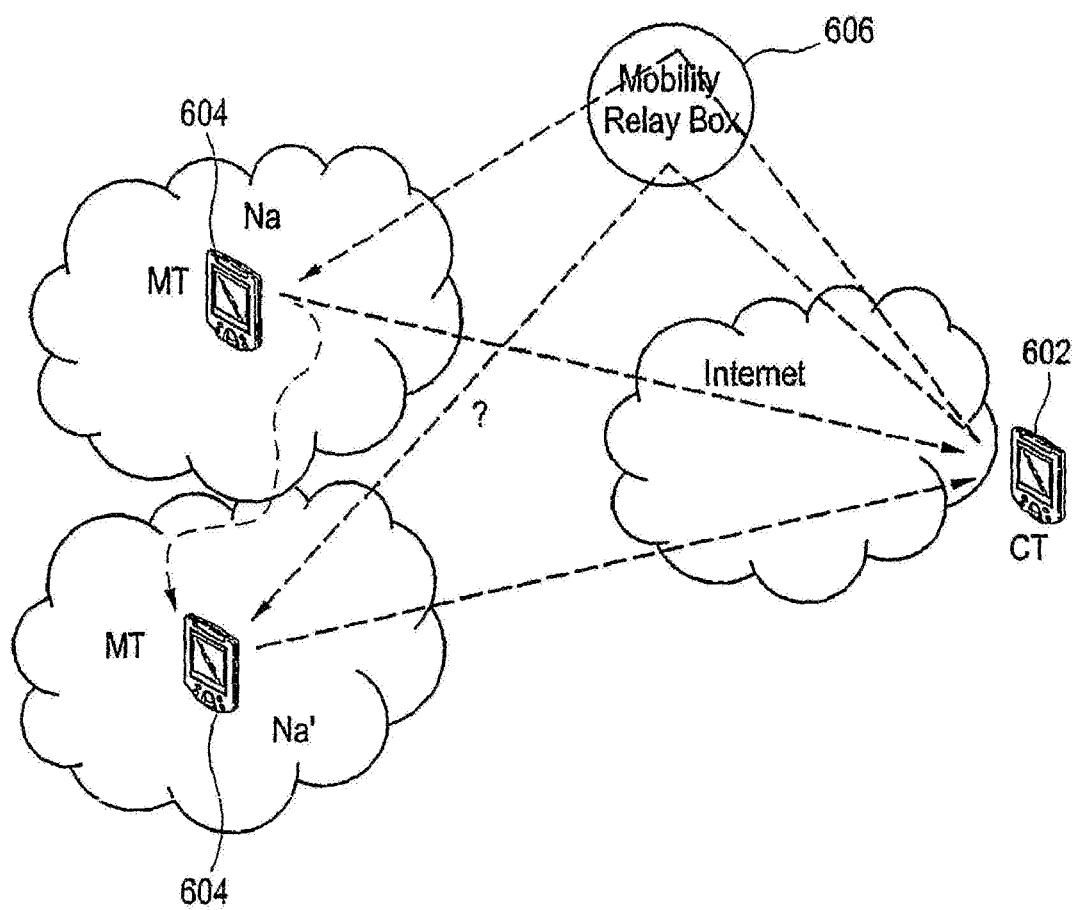
FIG. 6 illustrates the triangular routing problem.

(E) Optimal Versus Triangular Routing: Triangular routing is a situation that arises due to mobility solutions that use fixed relay boxes. An example is presented in FIG. 6. If CT 602 is a static terminal, communication from CT 602 to MT 604 is always effected via mobility relay box 606, whereas communication between MT 604 and CT 602 can be accomplished directly. The advantage of using relay box 606 is that it allows the decoupling of the mobility problem from CT 602. From the standpoint of CT 602, MT 604 is just a fixed device with the IP address of relay box 606. This solution has an important drawback, namely that routing between CT 602 and MT 604 is not optimal. Triangular routing is routinely generated by the industry standard Mobile IPv4.

Figure 7:
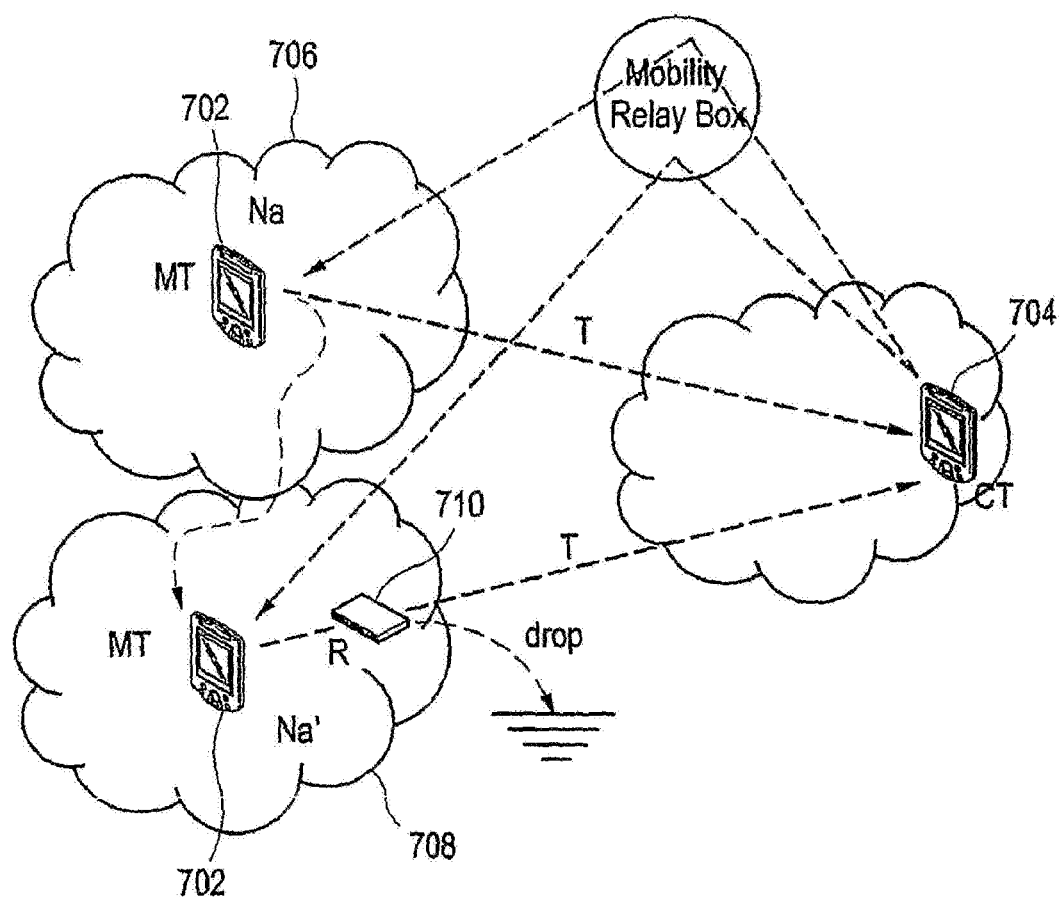
FIG. 7 illustrates the problem of topologically incorrect protocol.

(F) Topologically Correct Mobility: Consider router R which drops incoming packets based on the following topological rule: if ip_src is not in the set S the incoming packet is dropped, where ip_src is the source IP address of the incoming packet and S is the set of IP addresses belonging to the subnet in which R resides. An IP packet transmitted via the Internet is said to be topologically incorrect if it is dropped by a router due to this topological rule. This kind of packet dropping is also referred to as ingress filtering. Now consider as an example the scenario presented in FIG. 7. Suppose that MT 702 is communicating with CT 704 using tetrad T=[ipa_mt, prt_mt, ipa_ct, prt_ct] and that MT 702 moves from network Na 706 to network Na' 708. Since the mobility protocol uses triangular routing outgoing packets from MT 702 will go straight to CT 704 without traversing any relay box. If CT 704 is to accept packets from MT 702 after the latter has moved to Na' 708, MT 702 must generate packets using the original tetrad T. Otherwise, packets arriving at CT 704 would not be delivered to the correct communication endpoint (in most IP stacks, this corresponds to the socket at CT 704's networking stack associated with tetrad T). But IP packets using tetrad T are topologically incorrect in network Na' 708 and therefore are subject to being dropped by router R 710 within the same network (FIG. 7). In this case, the mobility protocol is said to be topologically incorrect.

(G) Total Convergence: In the present invention, the term total convergence is defined as the ability of a solution to enable mobility across different IP networks (regardless of their physical and data link layers) in a seamless manner. For example, consider the situation shown in FIG. 8 wherein MT 802 has moved to the point of intersection between networks Na 804 and Na' 806. Suppose that without dropping its connectivity 808 with network Na 804, the mobility protocol enables MT 802 to open communication path 810 through network Na' 806. Now assume that MT 802 remains in the intersection area while maintaining connectivity to both networks Na 804 and Na' 806. Therefore, through proper design, it is possible to enable simultaneous connectivity to services via multiple networks. More specifically, a totally convergent protocol is one that merges multiple network links (at the data link layer) to be made available to the IP-layer as a single link. A direct consequence of such a protocol is that a unicast connection will be able to effect multi-path delivery.

Figure 9:
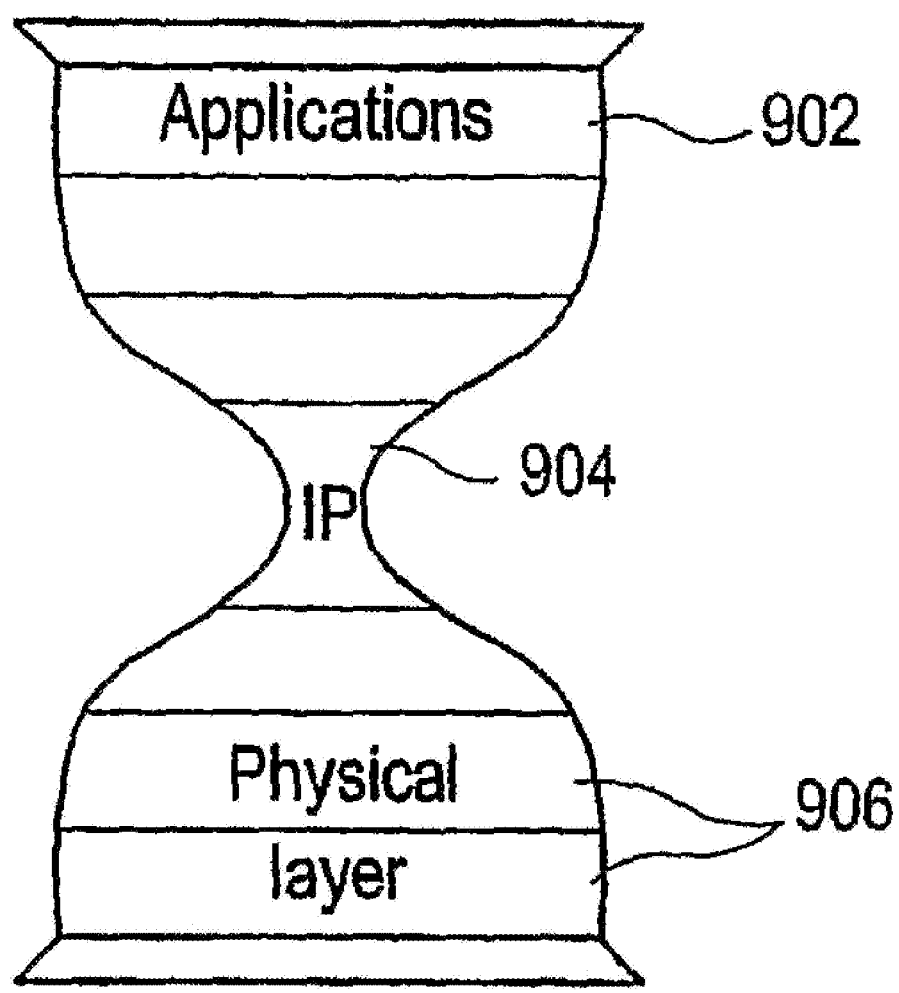
FIG. 9 illustrates the IP layer solution that enables total integration.

(H) Total Integration: In the present invention, total integration is defined as the highest level of interoperability across both upper application-layer and lower physical-layer protocols. While some solutions to the mobility problem work only for specific applications and others operate only on top of specific physical-layer protocols (e.g., UMA), the present invention will be universal (enabling total integration) in the sense that mobility will be enabled for all applications and all physical-layer protocols. This is possible because the present invention is implemented purely at the IP layer. The universality of the present invention follows from the so-called sand clock principle of the Internet, according to which all application-layer protocols 902 run on IP 904 and all physical-layer protocols 906 run under IP 904 (FIG. 9).

Overlay Network Infrastructure

Figure 10A:
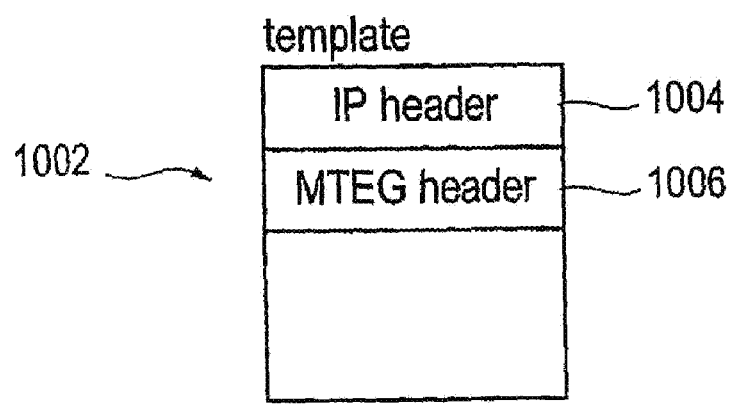
FIGS. 10A and 10B illustrate a c-labeled packet.
Figure 10B:
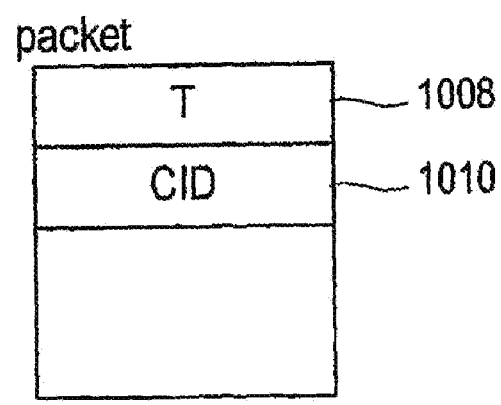

In accordance with one embodiment of the present invention, overlay networking is accomplished by inserting at least a subset of 5 kinds of IP nodes (called c-nodes). Each c-node is attached an overlay-routing table called the status table (ST), whereby IP packets are routed according to tetrads and flow IDs. The first kind of c-node performs c-forwarding, which is a simple but powerful operation whose primary objective is to make the Internet more flexible. This operation builds on IP networks and does not disrupt existing IP functionality. C-forwarding, for example, is completely compatible with IP forwarding. A packet is said to be c-labeled if it carries a CID (connection identifier or convergence identifier), which may constitute a flow ID. The two requirements for a CID system are as follows: (1) All packets of the same connection share the same CID; and (2) The CIDs of any two packets of two arbitrary connections going through a common router differ one from the other. Given an IP node (e.g., an IP router), these two requirements allow the network to differentiate packets from two arbitrary connections going through this IP node. FIGS. 10A and 10B present a possible implementation of c-labeled packets. FIG. 10A represents possible template format 1002. All IP packets possess the IP header 1004 and c-labeled packets are labeled additionally with the header 1006, referred to in the present invention as the MTEG header. Notice that MTEG header 1006 can be located anywhere in the packet. FIG. 10B is an actual instance of general template 1002, showing that among all the fields in the packets headers, IP tetrads 1008 and CIDs 1010 comprise the main object of concern. Following the same line of argument, given an IP connection (TCP or UDP connection), its c-path is defined as the set of IP nodes traversed by c-labeled packets from that connection.

Figure 11:
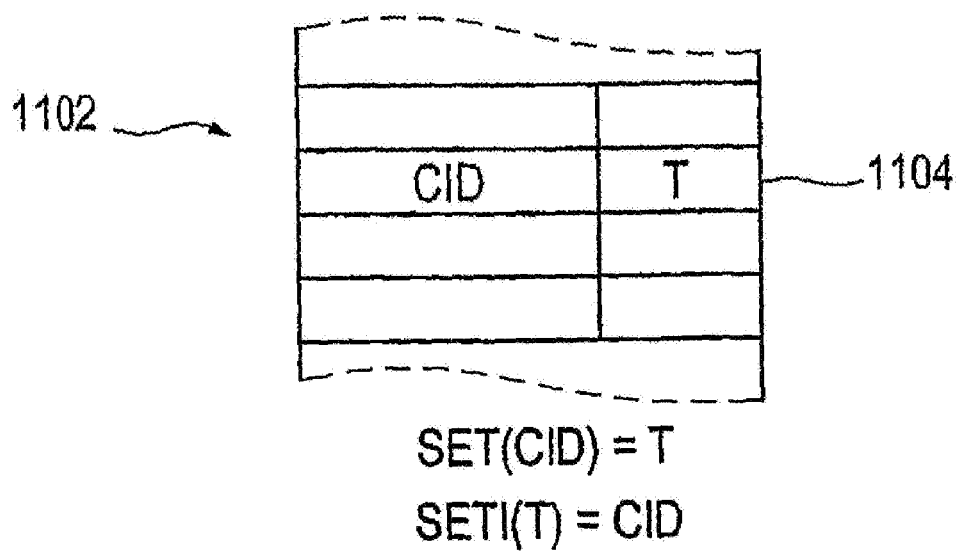
FIG. 11 illustrates the status table with one STE.

Now an IP node is said to be capable of c-forwarding if (1) it has status table 1102 (ST) in which each element 1104, referred to as STE or status table entry, maps a CID with an IP tetrad (FIG. 11), and (2) it performs c-forwarding operations. Given status table ST 1102, STE(CID) is used to denote the IP tetrad T associated with CID in ST 1102. Similarly, STEI(T) denotes the CID which has T as its associated IP tetrad in ST 1102 (where STEI stands for the inverse of STE). Suppose that a c-labeled packet arrives at an IP node capable of c-forwarding. The c-forwarding operation at this IP node performs the following tasks: (1) Finding the STE in status table 1102 that matches the CID in the packet; (2) Changing the IP tetrad of the packet to that of the found STE 1104, i.e., STE(CID); (3) Based on the new IP tetrad, forwarding the packet using the normal forwarding procedures of the IP node (e.g., in the case of an IP router, IP forwarding is based on the new IP tetrad STE(CID) assigned to the packet). Notice that if the tetrad found in STE 1104 is the same as the IP tetrad carried by the packet, c-forwarding becomes a NULL operation (i.e., having no effect). In fact, c-forwarding can be understood as a technique that generalizes any current IP forwarding scheme and, therefore, coexists and interoperates with all IP networks.

Figure 12A:
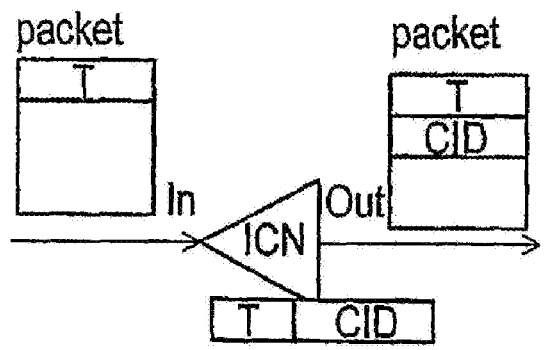
FIGS. 12A to 12E illustrate a list of c-nodes.
Figure 12B:
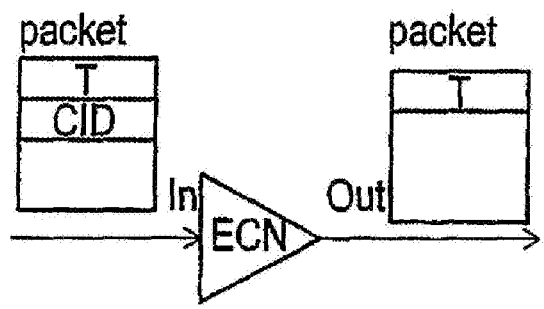
Figure 12C:
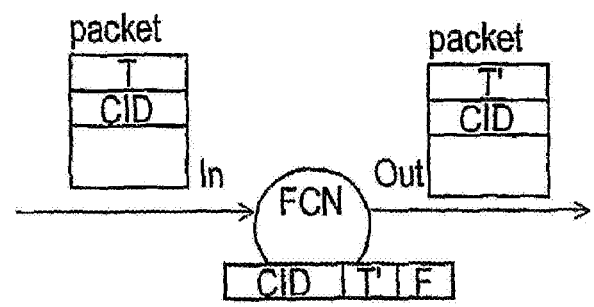
Figure 12D:
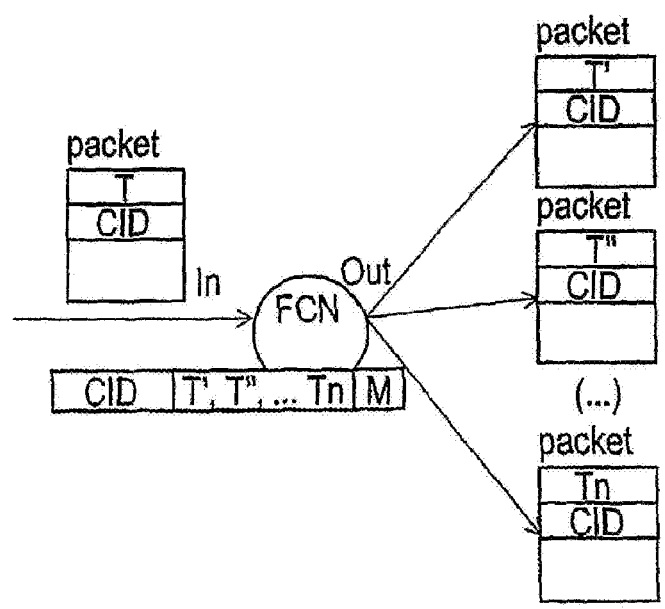
Figure 12E:
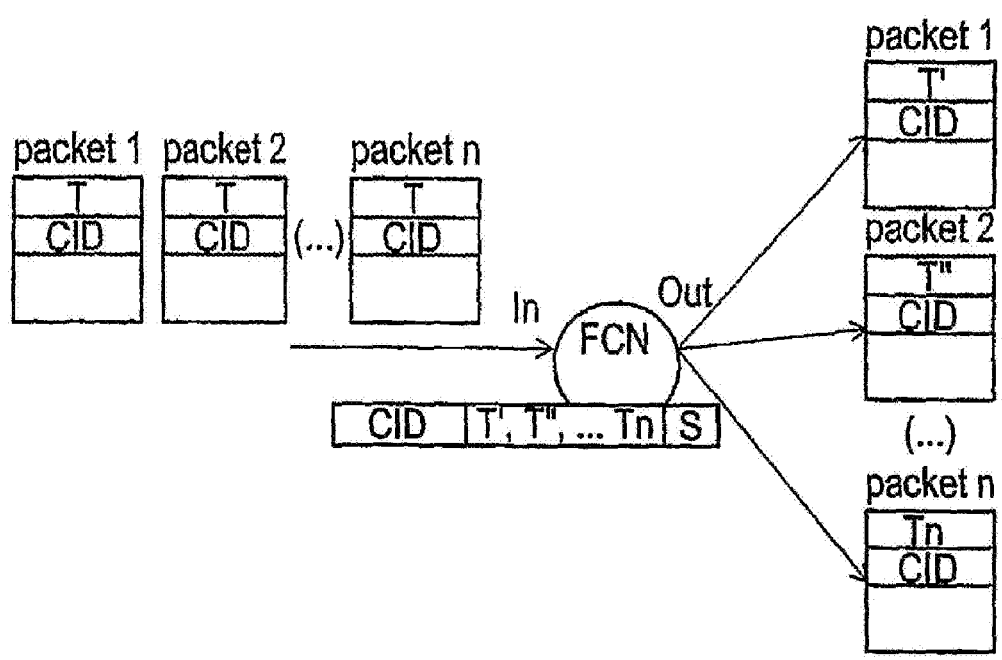

While c-forwarding defines the most natural atomic operation, there exists a set of logical nodes that can be defined and will be necessary to provide a complete framework. These nodes will be referred to as c-nodes. FIGS. 12A to 12E provide a graphical representation of some possible c-nodes: ICN (ingress c-node; FIG. 12A): ICN performs the task of c-labeling packets and therefore defines the beginning of a c-path. ECN (egress c-node; FIG. 12B): ECN performs the task of removing a c-label from a packet and therefore defines the end of a c-path. FCN-F (forwarding c-node; FIG. 12C), a forwarding operation: FCN-F is a forwarding c-node that performs the basic c-forwarding operations as defined earlier. FCN-M (forwarding c-node; FIG. 12D), a multicast operation: FCN-M is a forwarding c-node that performs multicasting. In this case, the found STE in the status table has n IP tetrads (n>1) where each incoming packet is duplicated n times and is updated with each of these tetrads before being forwarded by the underlying forwarding scheme. FCN-S (forwarding c-node; FIG. 12E), a splitting operation: FCN-S is a forwarding c-node that performs splitting. The found STE in the status table has n IP tetrads (n>1) where each incoming packet uses one and only one of the tetrads (e.g., tetrads can be used on a round robin basis). Because c-nodes define a mechanism to generalize the capabilities of IP protocols, they can be used in many different ways. One powerful application of c-nodes that will constitute the focus of the present invention concerns IP mobility. From the above description, it will be apparent to one skilled in the relevant art that the overlay-network architecture in the present invention enables multicasting and splitting. Also from the above description, it will be apparent to one skilled in the relevant art that the overlay-network architecture in the present invention enables anycasting by modifying the status tables by some proper means. Furthermore, from the above description, it will be apparent to one skilled in the relevant art that the overlay-network architecture in the present invention enables packet scheduling, thus enabling flow control functionality in the overlay-network. In addition, from the above description, it will be apparent to one skilled in the relevant art that the overlay-network architecture in the present invention enables paths within paths and connections within connections (as in ATM networks wherein a virtual path is equivalent to a group of virtual connections) by using a vectored form of the connection ID and status table.

EMBODIMENTS

Figure 13A:
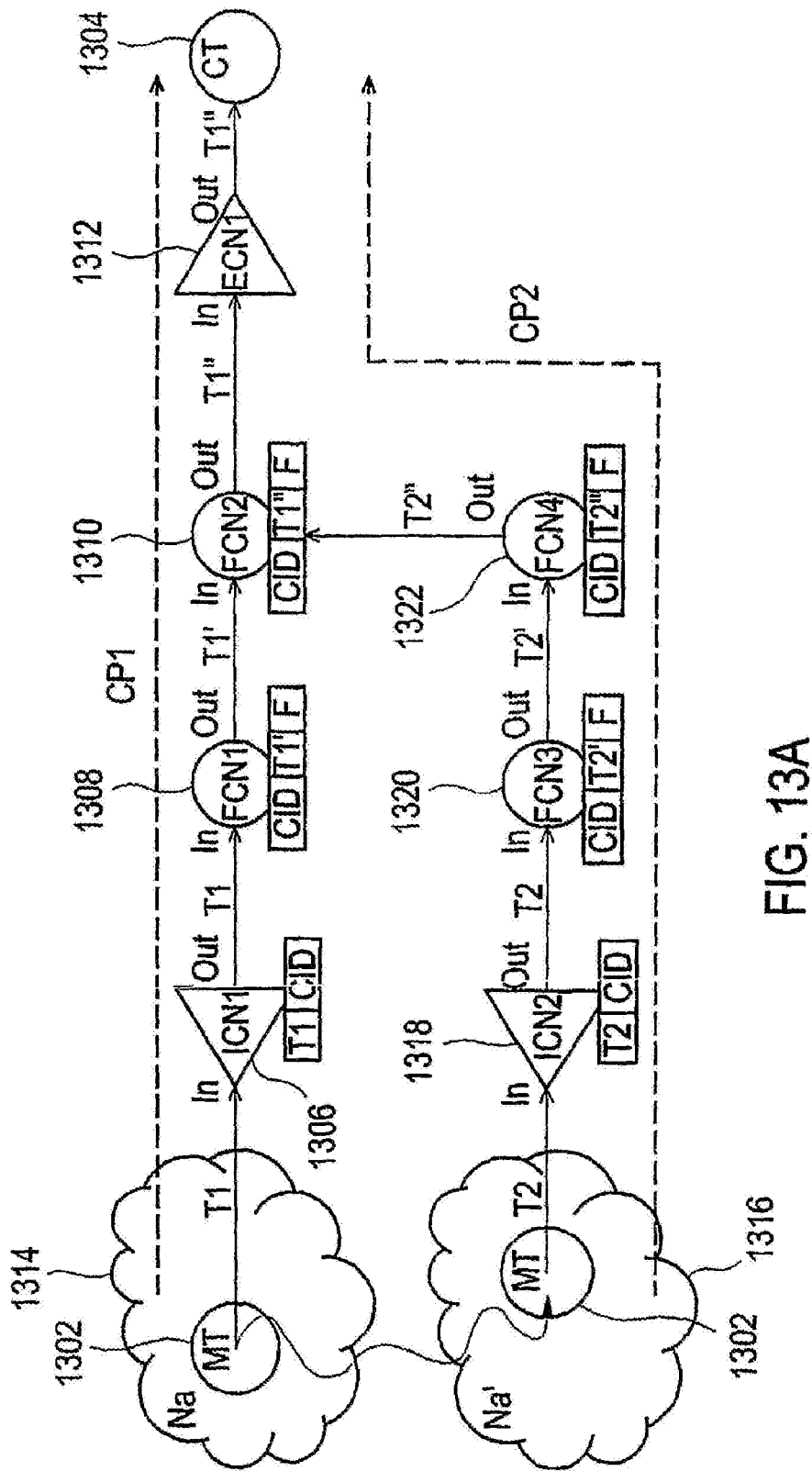
FIGS. 13A and 13B set forth the generic setup for outbound mobility (FIG. 13A) and inbound mobility (FIG. 13B)
Figure 13B:
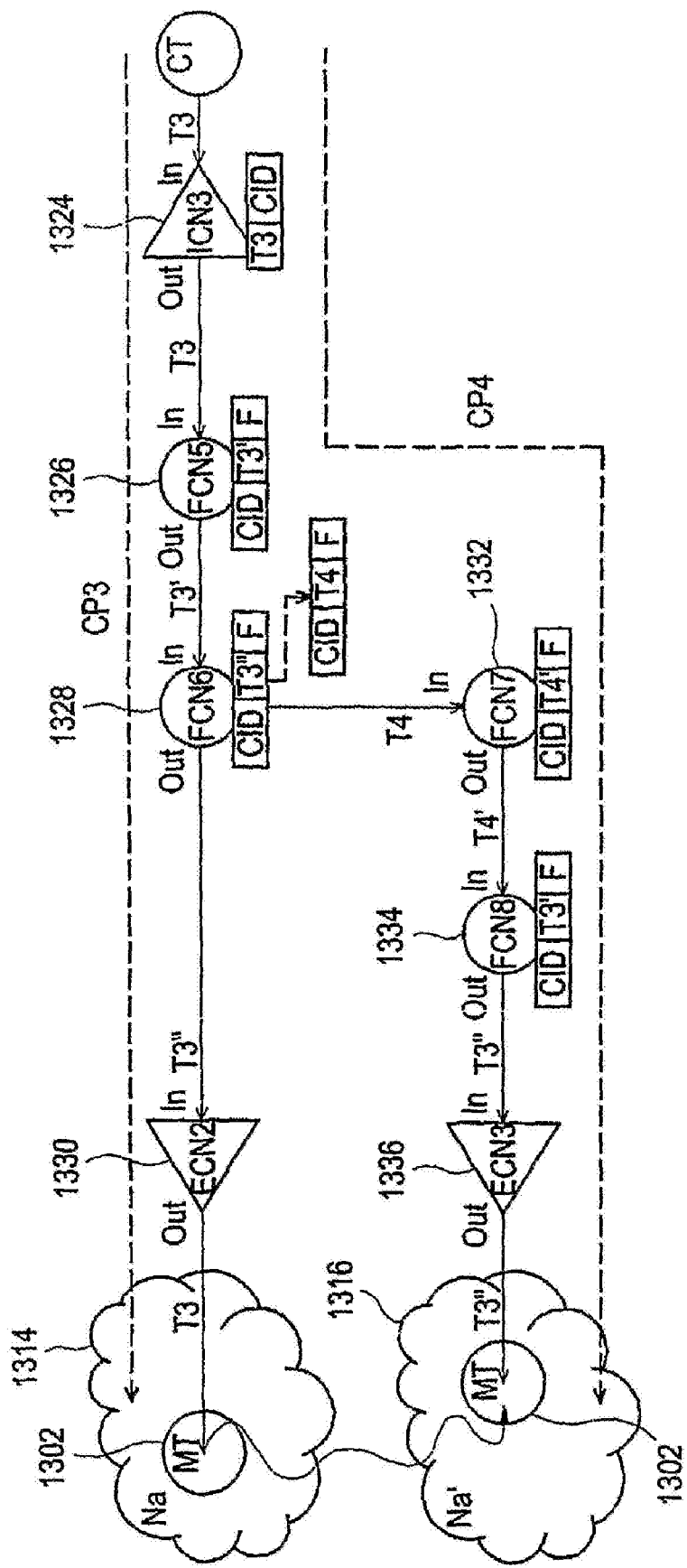

In accordance with one embodiment of the present invention, a generic setup with c-nodes for IP mobility is provided in FIGS. 13A and 13B. The mobility problem is broken down into two cases: an outbound case (FIG. 13A), in which data flows from MT 1302 to CT 1304, and an inbound case (FIG. 13B), in which data flows from CT 1304 to MT 1302. C-forwarding provides a generalization of current IP forwarding schemes and is completely interoperable with IP networks. Through the concept of c-nodes, functionalities can be added at certain strategic locations to resolve problems such as mobility and total convergence while coping with the constraints of a specific networking setup (e.g., end-to-end or gateway-based requirements).

Consider the case of outbound mobility. Packets going out from MT 1302 are intercepted by one ICN1 1306, which adds onto the packet a c-label. This defines the beginning of c-path CP1, which in the figure is terminated by MGs 1308 and 1310 and ECN 1312. Notice that this setup can be generalized in many different ways. Instead of 2 FCNs 1308 and 1310, for instance, the c-path could include any number of FCNs, defining an overlay network on top of the IP nodes. Upon moving from network Na 1314 to the new network Na' 1316, MT 1302 starts generating packets with a different tuple, T2. Packets are intercepted by ICN2 1318 which defines the beginning of a new c-path, CP2. Notice that c-path CP2 is terminated by the same ECN as in the original c-path, CP1. CP2 could also be generalized to have an arbitrary number of FCNs. In the scenario at hand, CP2 has three FCNs, 1320, 1322, and 1310, the last one (FCN2 1310) being part of CP1, which allows packets to be correctly routed to CT 1304. With a similar configuration the inbound mobility case is resolved. Outgoing packets from CT 1304 are intercepted by ICN3 1324, which defines the beginning of c-path CP3. This c-path is made up of 2 FCNs, 1326 and 1328, and one terminating ECN, 1330. After MT 1302 moves to Na' 1316, a new c-path, CP4, is configured. FCN6 1328 is modified to map its STE entry associated with CID to a new IP tetrad T3", i.e., STE(CID)=T3", which allows inbound packets to be forwarded to FCN7 1332 and guarantees their correct routing to the new location. The generality of the solution presented above will be demonstrated by transforming the configuration in FIG. 13 into new scenarios capable of resolving the requirements of specific networking scenarios. Each of these transformations will be referred to as a c-morphism.

In accordance with one embodiment of the present invention, an end-to-end C-morphism is accomplished as follows. This end-to-end configuration is achieved by applying the following transformation to FIG. 13:

(1) ICN1 1306 and ICN2 1318 are integrated into MT 1302 and become ICN1 1402;
(2) ECN1 1312 is integrated into CT 1304;
(3) ICN3 1324 is integrated into CT 1304 and becomes ICN2 1404;
(4) ECN2 1330 and ECN3 1338 are integrated into MT 1302 and become ECN2 1406;

(5) FCN1 1308, FCN2 1310, FCN3 1320, and FCN4 1322 are integrated into CT 1304 and become FCN1 1408;

(6) FCN5 1326 and FCN6 1328 are integrated into CT 1304 and become FCN2 1410; and (7) FCN7 1332 and FCN8 are integrated into MT 1302 and become FCN3 1412.

Figure 14A:
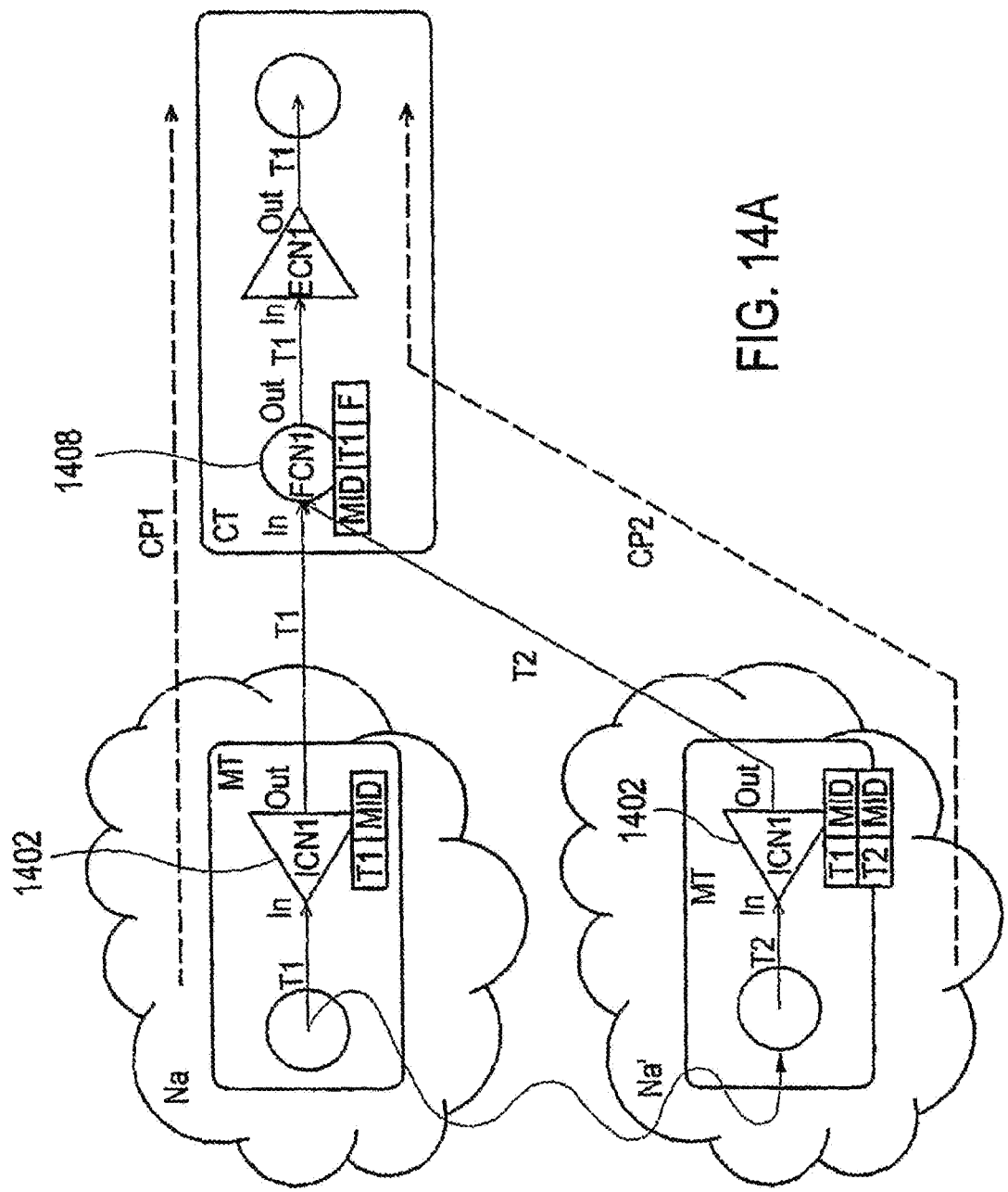
FIGS. 14A and 14B illustrate C-morphism: end-to-end solution.
Figure 14B:
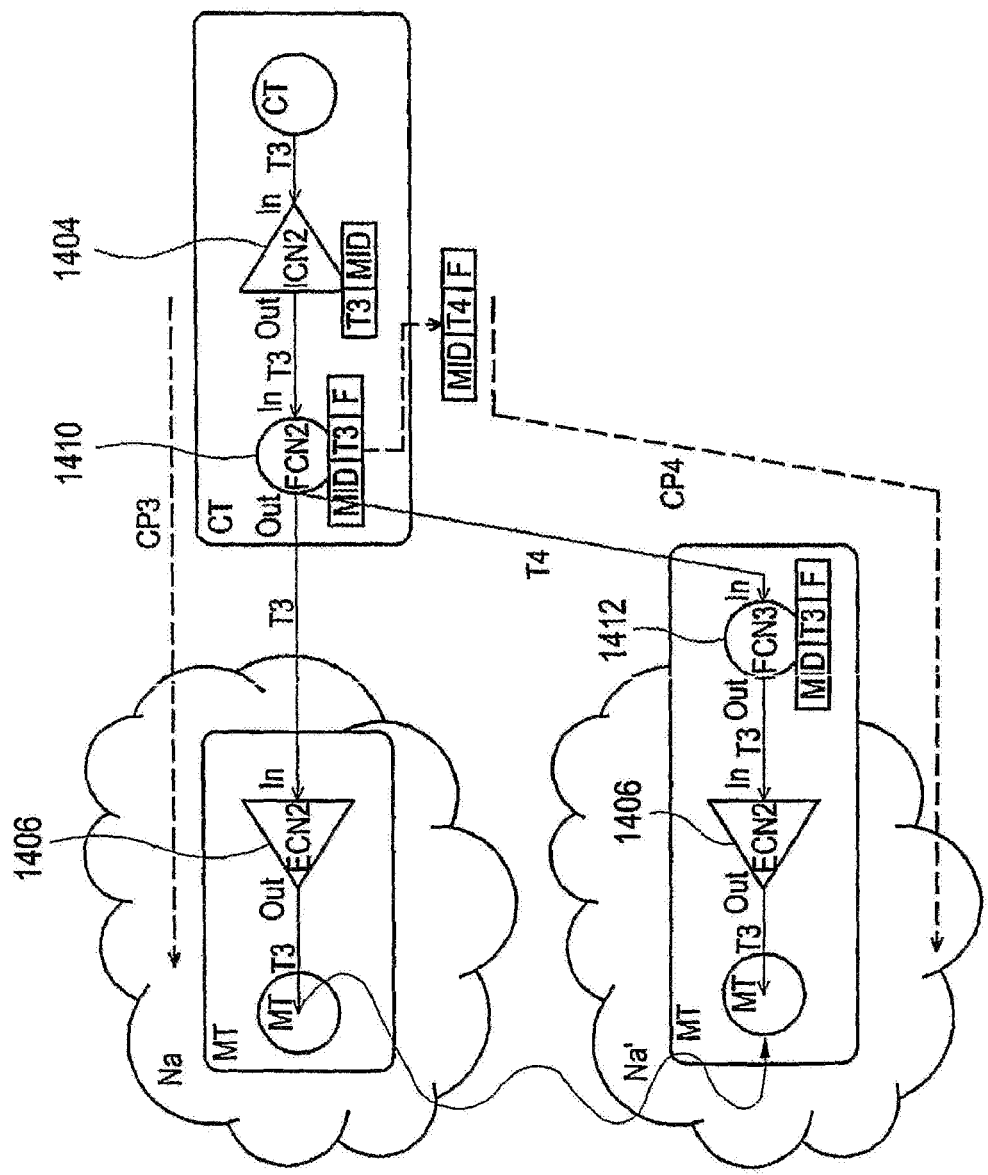

FIG. 14 illustrates this transformation. Notice that the morphism maintains all mobility capabilities while relocating the functionality of all the c-nodes to the terminals, leaving the core network untouched.

In accordance with one embodiment of the present invention, a gateway-based c-morphism is accomplished as follows. In this case, it is assumed that CT 1304 cannot be modified, i.e., that no c-node can be implemented inside the CT 1304. This is achieved by applying the following transformation to FIG. 13:

(1) ICN1 1306 and ICN2 1318 are integrated into MT 1302 and become ICN1 1502;

(2) ECN1 1312 is integrated into MG1 1504;

(3) ICN3 1324 is integrated into MG1 1504 and becomes ICN2 1506;

(4) ECN2 1330 and ECN3 1338 are integrated into MT 1302 and become ECN2 1508;

(5) FCN1 1308 and FCN2 1310 are integrated into MG1 1504 and become FCN1 1510;

(6) FCN3 1320 and FCN4 1322 are integrated into MG2 1512 and become FCN2 1514;

(7) FCN5 1326 and FCN6 1328 are integrated into MG1 1504 and become FCN3 1516;

(8) FCN7 1332 is integrated into MG2 1512 and becomes FCN4 1518; and (9) FCN8 is integrated into MT 1302 and becomes FCN5 1520.

Figure 15A:
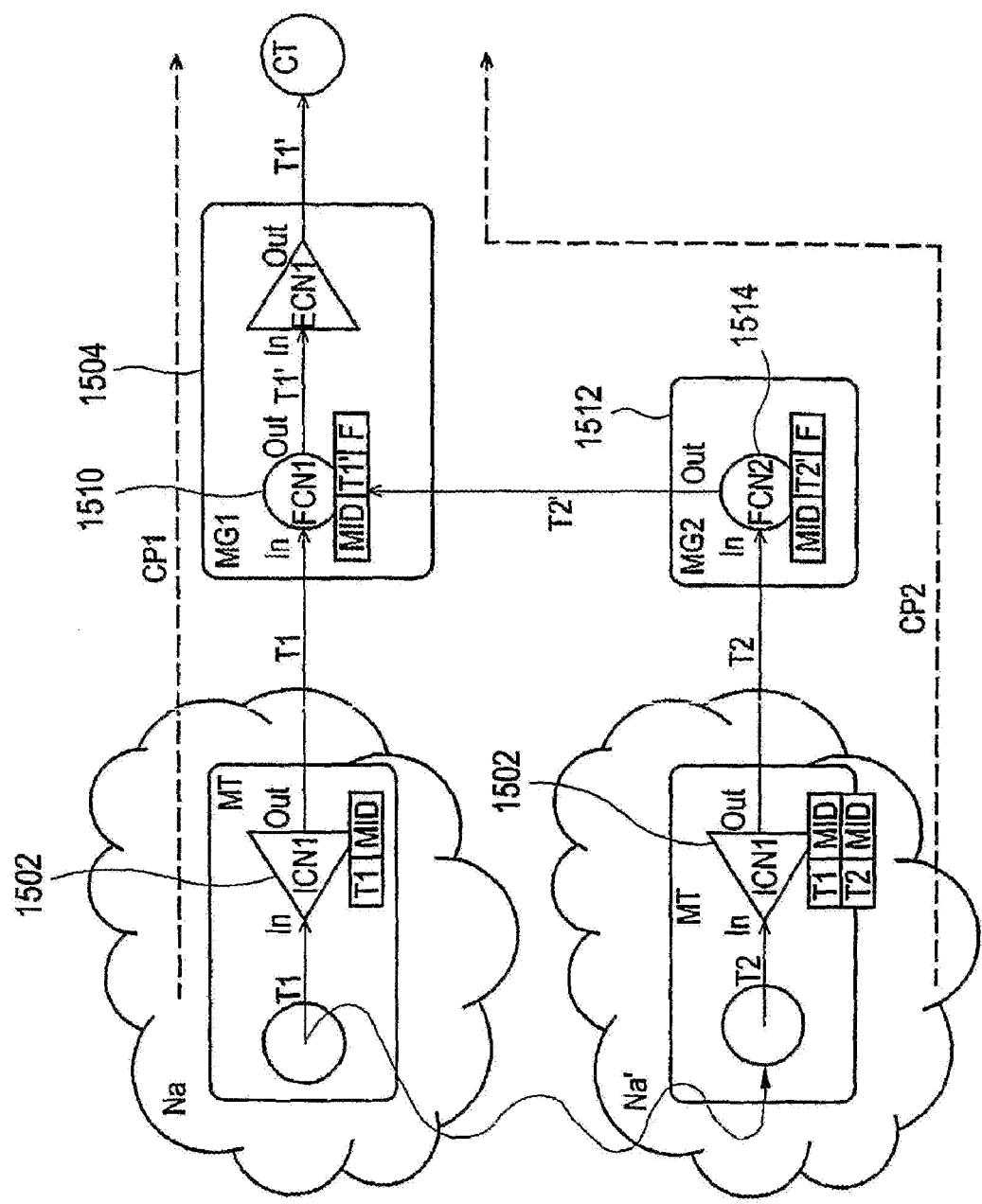
FIGS. 15A and 15B illustrate C-morphism: gateway-based solution.
Figure 15B:
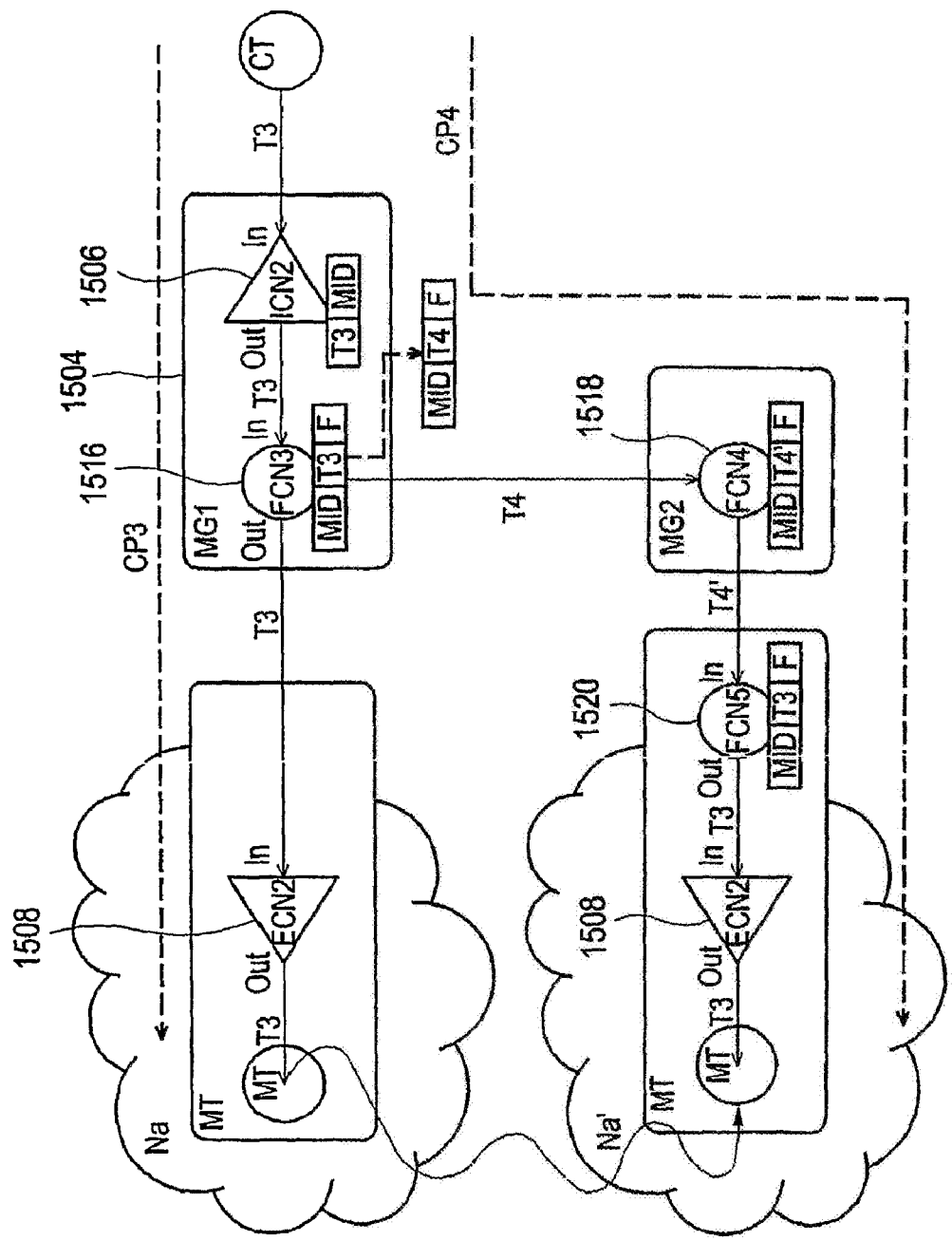

FIG. 15 presents the outcome of this transformation. Notice that this gateway-based c-morphism maintains all mobility capabilities while avoiding the insertion of any mobility technology inside CT 1304.

In accordance with one embodiment of the present invention, c-morphism of a relay box is accomplished through the following transformation:

(1) ICN1 1306 and ICN2 1318 are integrated into MT 1302 and become ICN1 1602;

(2) ECN1 1312 is integrated into CT 1304;

(3) ICN3 1324 is integrated into CT 1304 and becomes ICN2 1604;

(4) ECN2 1330 and ECN3 1338 are integrated into MT 1302 and become ECN2 1606;

(5) FCN1 1308, FCN3 1320, and FCN4 1322 are integrated into MT 1302 and become FCN1 1608;

(6) FCN2 1310 is integrated into MG 1610;

(7) FCN5 1326 is integrated into CT 1304 and becomes FCN3 1320 1612;

(8) FCN6 1328 is integrated into MG 1610 and becomes FCN4 1614; and (9) FCN7 1332 and FCN8 are integrated into MT 1302 and become FCN5 1616.

Figure 16A:
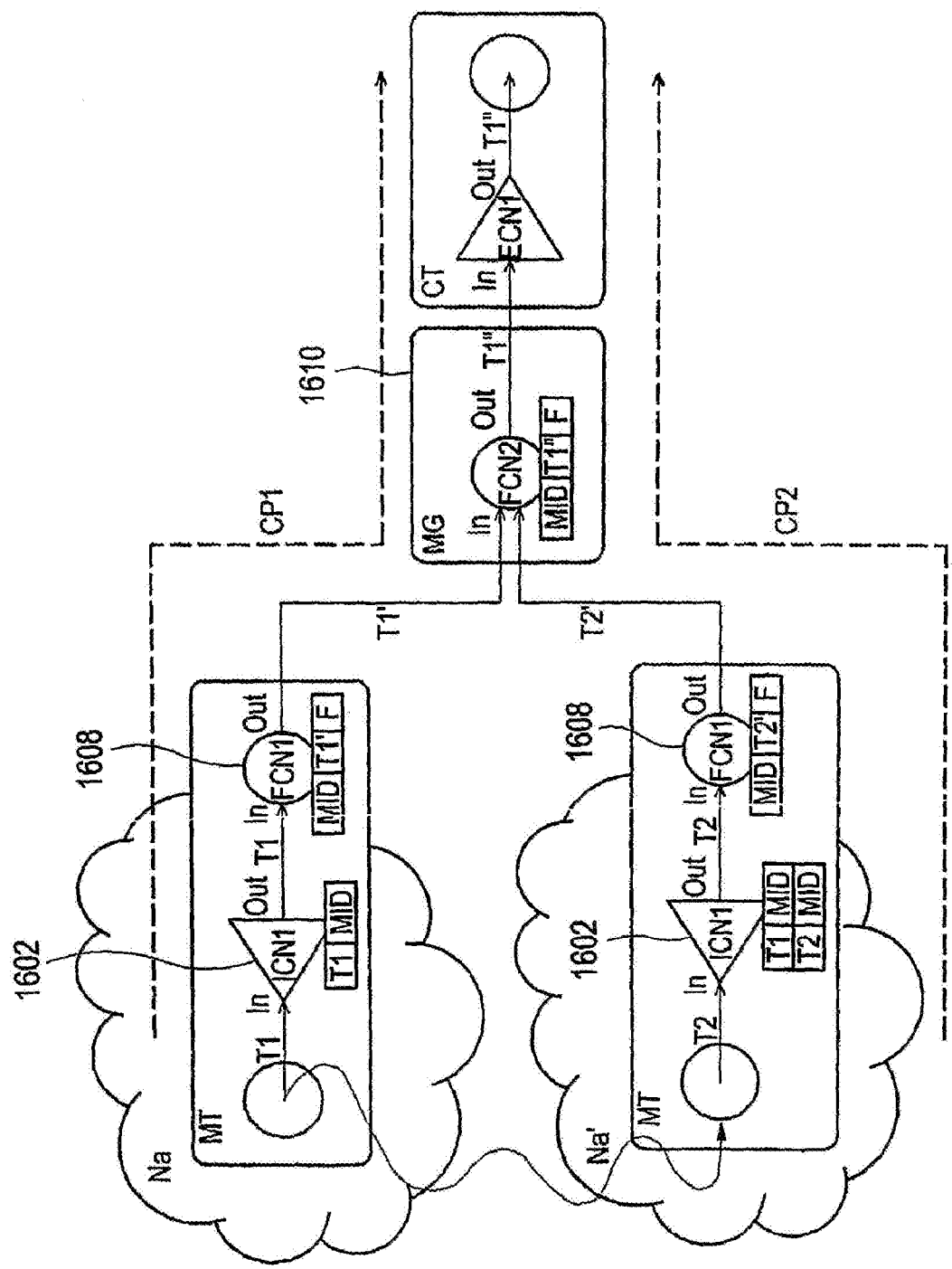
FIGS. 16A and 16B illustrate C-morphism: relay solution.
Figure 16B:
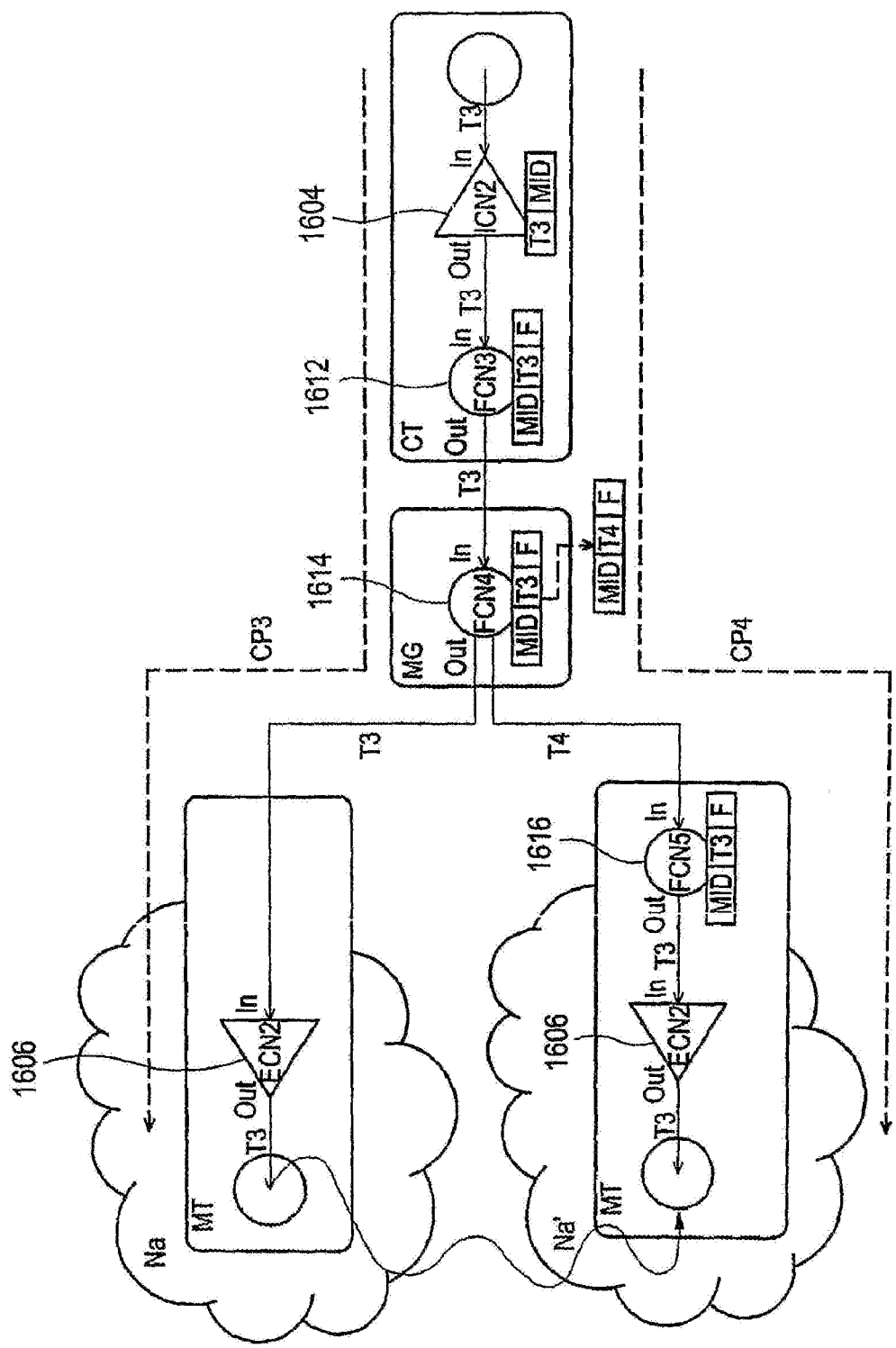

FIG. 16 illustrates the results of this morphism.

Figure 8:
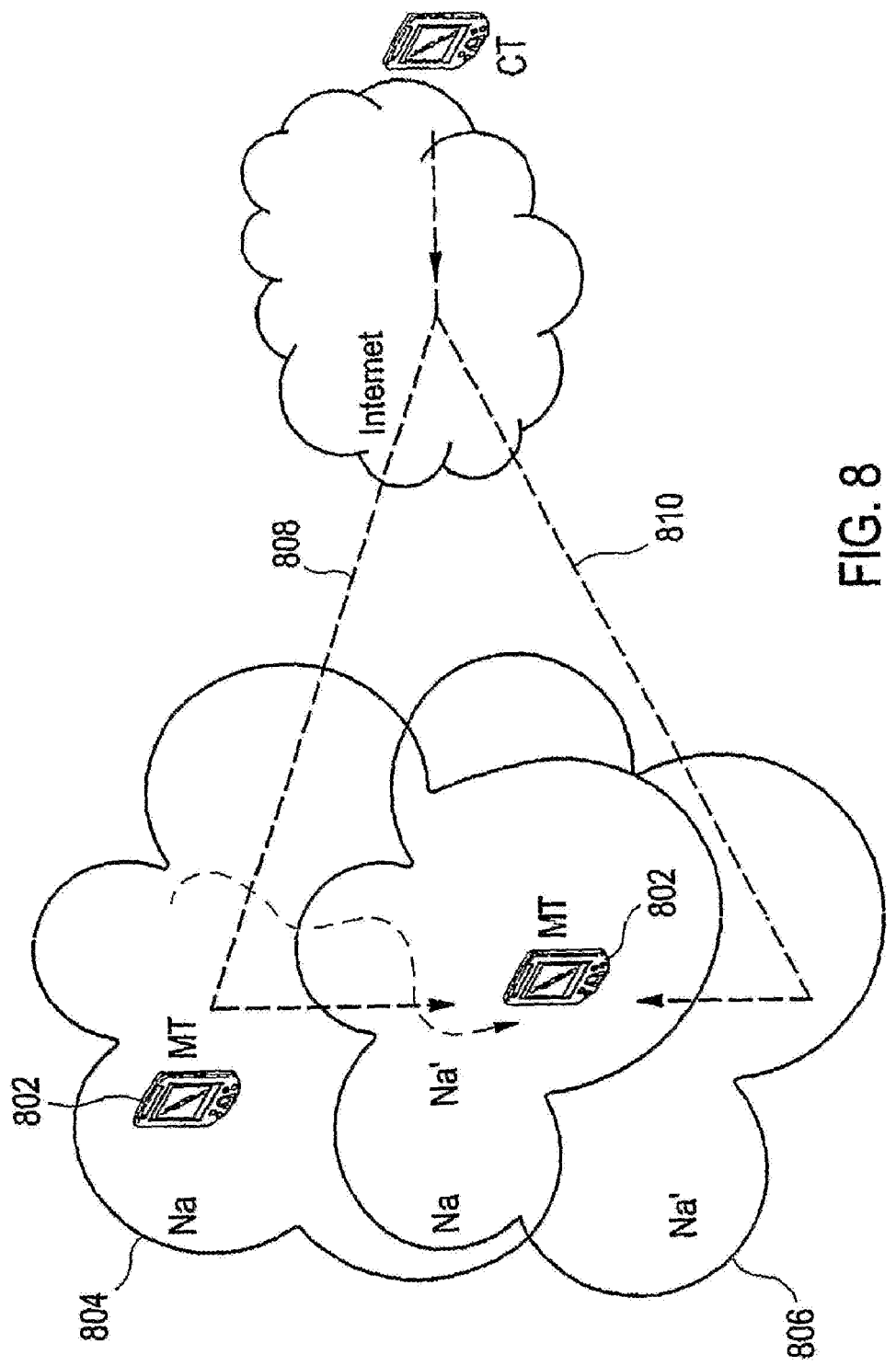
FIG. 8 illustrates the problem of total convergence.
Figure 17A:
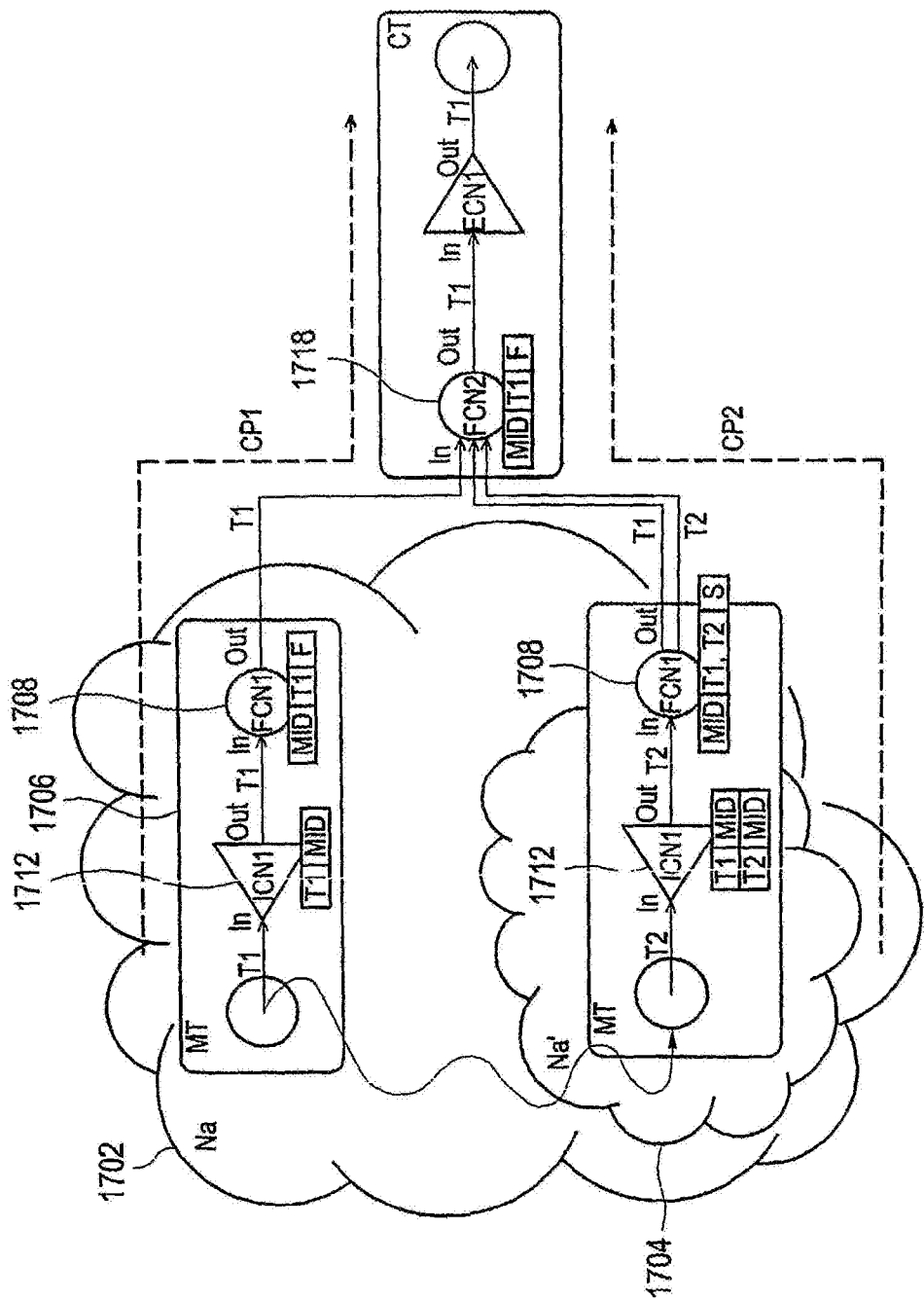
FIGS. 17A and 17B illustrate C-morphism: total convergence.
Figure 17B:
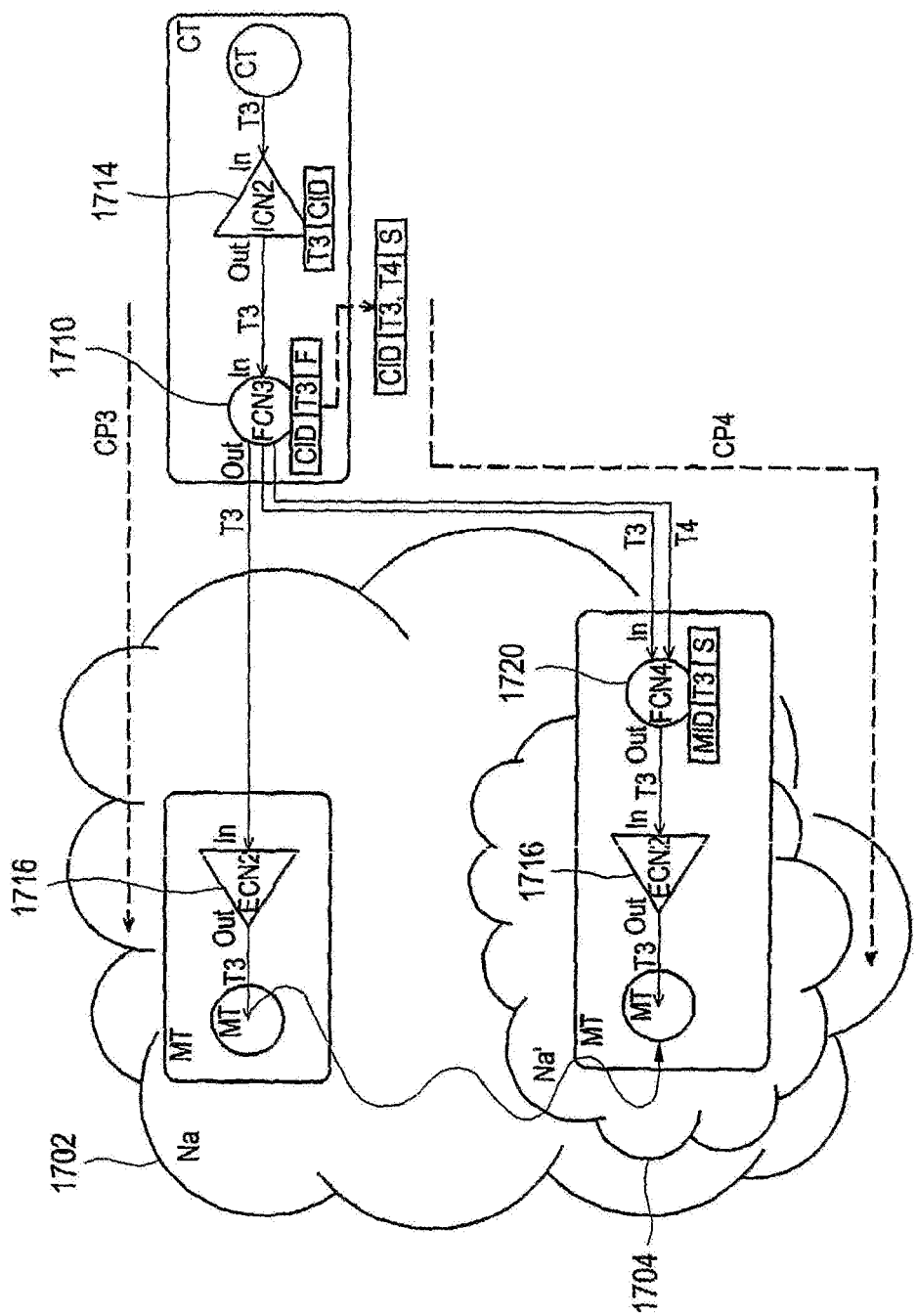

In accordance with one embodiment of the present invention, a total convergence c-morphism is accomplished as follows. By using a forwarding c-node in splitting mode, a transformation is initiated that will enable total convergence (as illustrated in FIG. 8). In the following morphism, the embodiment will enable multi-path communication on a connection that by standard IP protocols is unicast (e.g., a TCP or UDP connection). Notice, though, that even if the unicast IP connection is converted to enable multi-path connectivity, IP semantics (such as IP forwarding) are not disrupted by the c-morphism. Furthermore, an important consequence of the total convergence morphism is that it enables the logical aggregation of multiple networks into one (hence the term total convergence). For instance, with this morphism a single TCP connection is established using multiple paths concurrently, with each path routed on networks as diverse as WIFI, GPRS, CDMA EVDO, WIBRO, WIMAX, etc. To provide an example, assume a scenario in which network Na 1702 includes network Na' 1704 so that when MT 1706 moves to Na' 1704 it still maintains connectivity with Na 1702. Notice that in this example an end-to-end configuration is used to demonstrate the concept of total convergence. Similar scenarios could be presented for other network configurations such as gateway-based or relay solutions. Finally, from FIG. 17 notice that once MT 1706 moves to Na' 1704, FCN1 1708 and FCN3 1710 change the mode of operation of their STEs associated with MID from forwarding mode (F) to splitting mode (S). The transformation transpires as follows:

(1) ICN1 1306 and ICN2 1318 are integrated into MT 1706 and become ICN1 1712;

(2) ECN1 1312 is integrated into CT 1304;

(3) ICN3 1324 is integrated into CT 1304 and becomes ICN2 1714;

(4) ECN2 1330 and ECN3 1338 are integrated into MT 1706 and become ECN2 1716;

(5) FCN1 1308, FCN3 1320, and FCN4 1322 are integrated into MT 1706 and become FCN1 1708;

(6) FCN2 1310 is integrated into CT 1304 and becomes FCN2 1718;

(7) FCN5 1326 and FCN6 1328 are integrated into CT 1304 and become FCN3 1710; and (8) FCN7 1332 and FCN8 are integrated into MT 1706 and become FCN4 1720.

I. Pure VANET: The present invention solves three problems of a pure VANET: long per-hop delay, large number of hops in a round trip, control and management without centralized infrastructure. The key concept is virtual circuit (VC) routing and distributed DHT-based algorithm. In the rest of this section, a VANET node will be used interchangeably with a VANET vehicle. To simplify the description, a VANET node will also be referred to as a node.

Definition of Virtual Circuit: There is a fundamental difference between a virtual circuit in a fixed network and a virtual circuit in a pure VANET. In the classical ATM (asynchronous transfer mode) technology, a virtual circuit (VC) is a fixed path between a source and a destination node. This path is fixed and is never changed starting at the time of set up until the time of tear down. Further, a VC is tied to its source and destination end points. Thus, a VC is identified by both the path and the two end points. In the IP world, however, a connection is only identified by the two end points, and there is no dependence on the path. In accordance with one aspect of the present invention, a VC is only identified by its path, but not the end points. This makes sense as a VC now serves only as a path identifier, but not a connection identifier. To identify a connection, one has to go to layer 3 and layer 4—in the IP world, a connection is identified by the source IP address, source port number, the destination IP address, and the destination port number. Therefore, it is important to realize that a VC is strictly a path concept. It is also important to realize that in a VANET, a connection's packets will travel in different paths at different times. The reason is simple: all nodes are mobile—as nodes move paths will change. Therefore, it is critical to differentiate between a path and a connection. In this invention, a VC is strictly a path concept. In accordance with one aspect of the present invention, a VC is conceptually equivalent to a travel path of packets. A design principle of the present invention is that packet flows and traffic flow are parallel (or anti-parallel). Thus, a VC will be tied to geographical locations, called zones. Therefore, a VC is a packet path between two zones. Further, a complete packet path between two end points can be broken into multiple sub-paths. Therefore, a complete packet path between a source and a destination may be comprised of a sequence of VCs (packet sub-paths).

Figure 18:
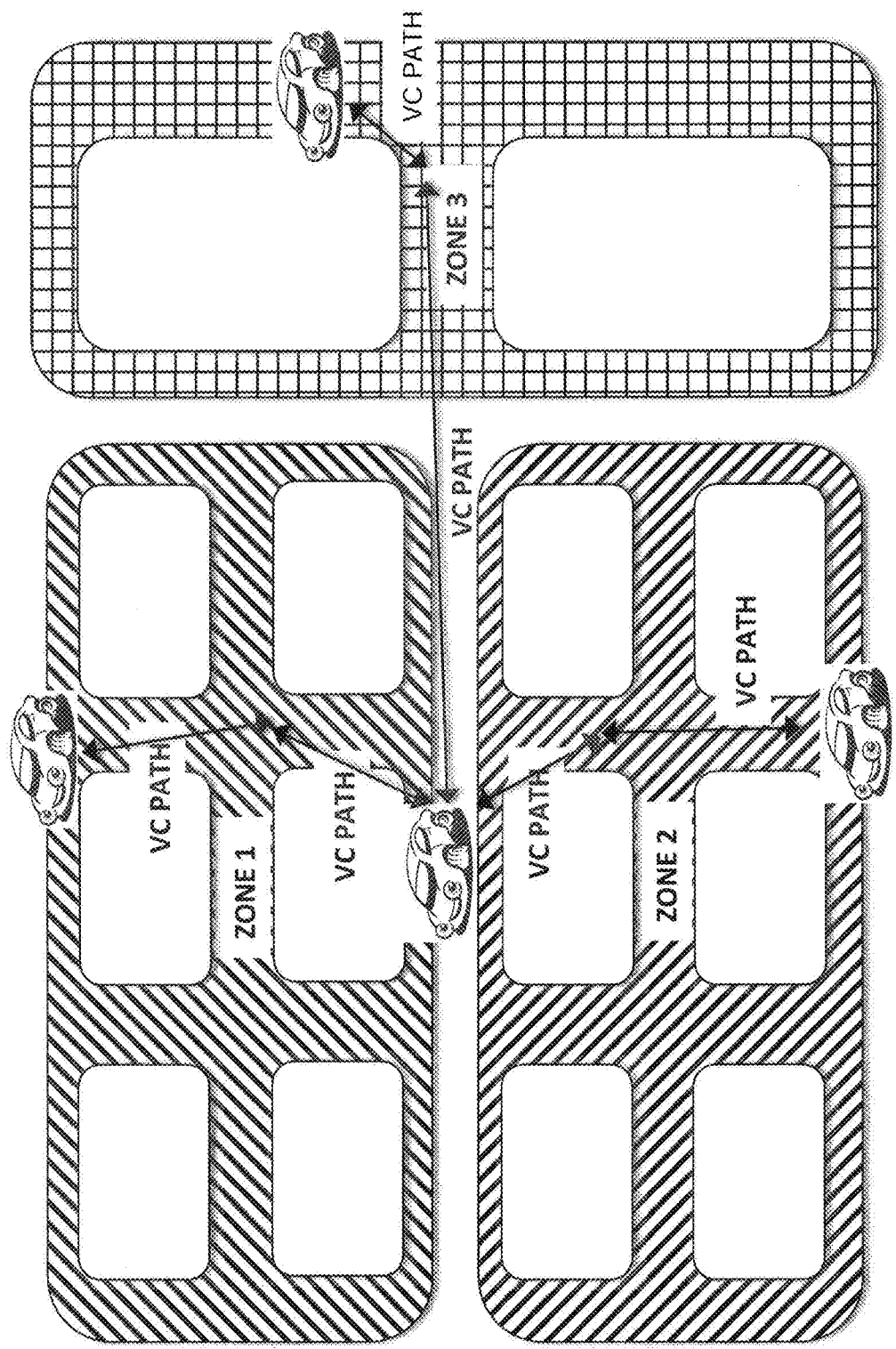
FIG. 18 shows virtual circuit in a zone setting.
Figure 19:
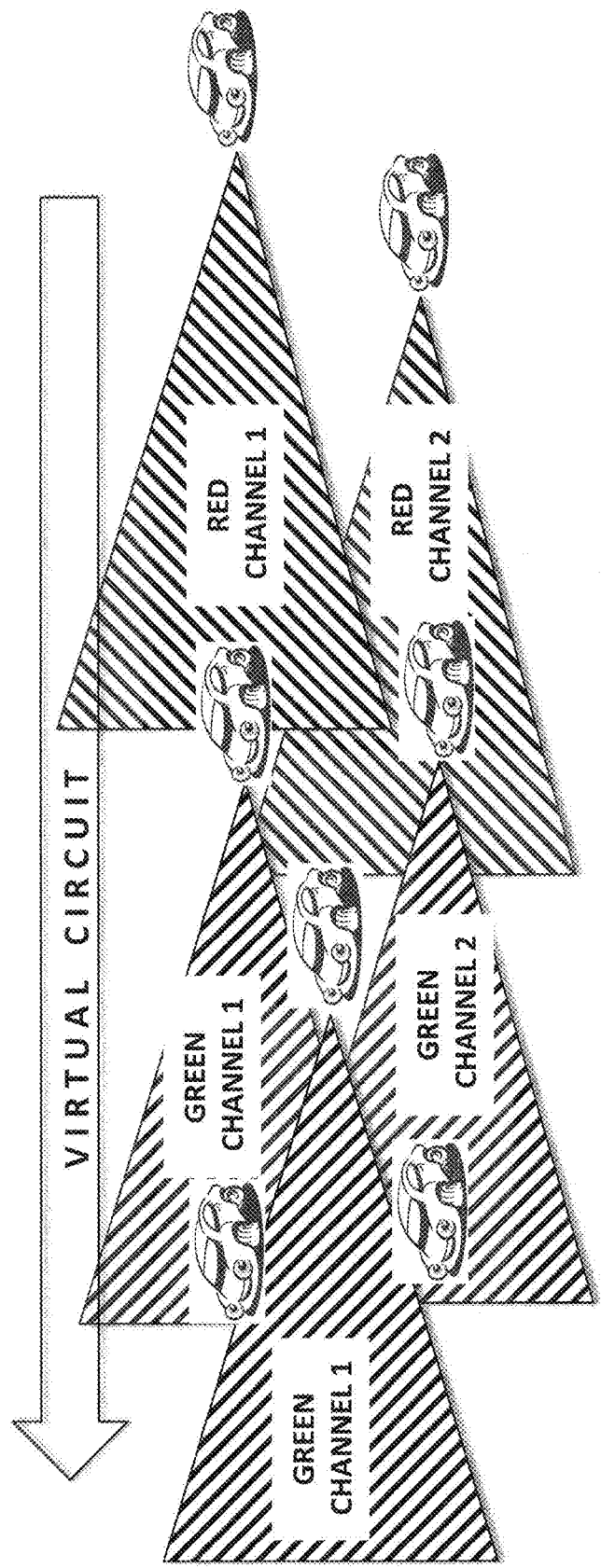
FIG. 19 shows a channel assignment in a virtual circuit in the direction of a highway.
Figure 20:
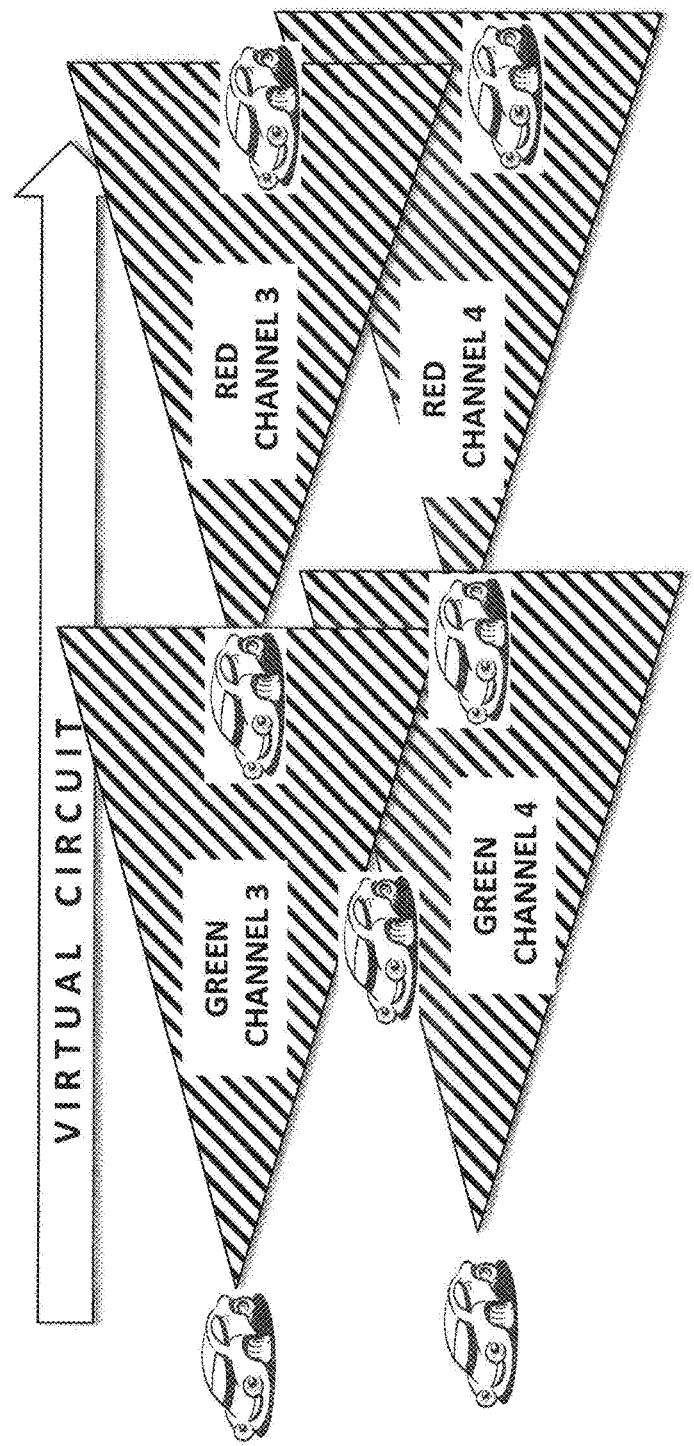
FIG. 20 shows a channel assignment in a virtual circuit in the opposite direction of a highway.

Virtual Circuit Routing: In accordance with one aspect of the present invention, a virtual circuit is tied to a zoning scheme of street or highway maps in which a pure VANET is operating. In this technology, a virtual circuit is set up between two zones. A zone is characterized by the set of its defining border points, which are often street junctions. A virtual circuit can be set up between two border points of two zones. This is illustrated in FIG. 18. Multiple VCs can be set up between two zones. A virtual circuit is properly defined as a sequence of nodes—besides the starting node and the ending node, the rest of the nodes are relay nodes. In FIG. 18, the relay nodes are not shown, but they are implied. Note that a starting node may not be the source of a connection and an ending node may not be the destination of the connection. The starting node and end point of a VC are simply defining the VC. A virtual circuit will operate at layer 2, as a service to layer 3—similar to ATM virtual circuits as a service at layer-2 to IP layer 3. At layer 2, all data frames will carry a virtual circuit ID. In accordance with one aspect of the present invention, there are two ways to implement a virtual circuit at layer 2. The first method is to deploy an ATM layer between the MAC layer and layer 3. This is accomplished by inserting an ATM adaptation layer at the starting and the ending nodes of a VC, and an ATM layer at all the nodes of a VC. As ATM is an existing technology, no further details will be given.

The second method is based on implicit ATM layering. In this method, no explicit ATM layers will be inserted. Each data frame at the MAC layer is treated as an equivalent "ATM frame." Each frame will be identified with a VC ID at layer 2, called VCID. In this method, an IP packet is broken into data frames, which resemble ATM frames or cells. In the second method, from one hop to the next, there is no need to modify data frames in transit. All data frames belonging to the same virtual circuit will carry the same VCID. Upon receiving a data frame in transit, a VANET node will look up the VCID from the frame and will use the VCID to retrieve the identifier of the outgoing (or next) channel to transmit the frame, from a VC routing table. After getting the next channel identity, the transiting data frame is sent to the appropriate transmitter, without being modified. This way, no layer-3 operations are performed on a transit frame. The only layer-2 operations are to read the VCID and to retrieve appropriate output channel identifier. Thus, the amount of processing is minimized. Note that in regular Wi-Fi layer 2, a data frame will carry the transmitting node MAC address, the receiving node MAC address, and SSID (service set ID). In accordance with one aspect of the present invention, there is no need to carry all these identifiers for the VANET data frames. The routing table will be able to tell the local node that receives a frame the following for each VCID: (a) if the current node is a relay node, or a starting node, or an ending node, (b) if the received data frame is to be transmitted at an outgoing channel, which channel the frame should go to. It should also be noted that in a regular VANET service, a telematics box is also a Wi-Fi access point (AP) to handheld devices inside or around the vehicle. For data frames between the handheld devices and the in-vehicle AP, the regular SSID, source MAC address, and destination MAC address will be needed.

Returning to the description of the VANET data frames, a non-transit data frame will require more processing. By definition, a non-transit data frame is either a data frame at the starting node of a VC, or a data frame at the ending node of a VC. At a starting node, per-hop delay is mainly comprised of the transmitting time; at an ending node, per-hop delay is mainly comprised of the receiving time. For transit data frames, per-hop delay is the sum of receiving time, layer-2 processing time, and the transmitting time. Note that, due to the VC design, there is no layer-3 processing delay. The layer-2 processing delay is comprised of the VCID lookup time, and the time to retrieve the next channel identifier. The layer-2 processing delay can be shortened by using hardware assist. The transmitting time and receiving time can be shortened by having smaller data frames (smaller payload in the data frames). In a pure VANET, bandwidth is relatively abundant—the raw bandwidth of a regular 802.11 ax channel is 600.4 mbps. Therefore, a good way to minimize per-hop delay is to reduce the payload size in a data frame. There is a tradeoff here: as payload size is reduced, the data frame header size as a percentage of the entire data frame is increased. Thus, as long as bandwidth is relatively abundant, and reducing per-hop delay is critical enough, one can choose a relatively small payload per data frame. In sum, the method to reduce per-hop delay is by reducing the payload size in data frames, by using hardware assist in layer-2 processing, or both.

Hop Minimization through Broadcast: One way to reduce the number of hops between two end points is to skip some nodes in routing packets. This is possible due to the broadcast nature of all wireless communication and Wi-Fi is no exception. Thus, a relay node (one hop in the path from a source to a destination) does not have to be an immediate neighboring node; some VANET nodes can be skipped. The hop minimization method is coupled with secondary packet/frame delivery technology. The basic idea here is the distance between a transmitting node and a receiving node (be it a relay node or an ending node of a VC) should be maximized, subject to a minimum bandwidth requirement. As the distance between a transmitting node and its receiving node is increased, the available bandwidth is also dropped. Beyond a certain distance threshold, the effective bandwidth will drop below a minimally required value. Thus, in selecting a relay node, the distance should be increased up to a threshold value. The detailed method of selecting a relay node will be covered in the description for VC establishment.

VC Establishment Method: The issue here is determination of the nodes (starting, relay, and ending) of a VC, by modifying the routing tables. A routing table is comprised of records, and each record is an order set: [VCID, node_status, next_channel_ID]. The node_status field will tell if the current node is a relay node, a starting node, or an ending node of the VC with the ID equal to VCID. The next_channel_ID field will indicate which channel to transmit a data frame. In addition, each node keeps track of two variables: its location given in terms of the subzone ID, and its traffic load (sum total of all the VCs that the current node is carrying traffic for.) The selection of the nodes in a VC is aided by the GPS locations of the nodes. In accordance with one aspect of the present invention, a VC is most conveniently defined by a linear zone (a strip) along a street or a highway. The entire strip is divided into subzone 1, subzone 2, . . . , subzone k, wherein subzone k is the ending subzone, and subzone 1 is the starting zone. All nodes within a subzone moving on the same side of the street or highway will be a candidate for nodes in the VC. The selection can be (a) randomly chosen, or (b) dependent on the packet traffic load, or (c) dependent on the GSP locations within a subzone. In a VANET, a node is mobile. Once a VC is established, it may need to be modified for two reasons. First, some nodes in the VC may simply leave the VANET. Second, as node moves, a node may have moved from one subzone to the next (the VC node membership of the node has to change then).

Routing Table Update: To determine and to update the routing tables in each node, all the nodes together run a distributed algorithm. This distributed algorithm accomplishes the following: (a) updating the current subzone position for each node, (b) detection of a node in a VC has left the VANET, (c) selection of a new node in the VC that has change in its nodes, (d) determination of the channel number for each node in each VC, (e) updating the routing tables according to the changes in the VC nodes, and (f) setting up or tearing down a VC. Further, it is possible to have 2 or more VCs having overlapping subzones. In this case, orthogonal channel assignments between overlapping transmission ranges between neighboring nodes have to be accomplished. In accordance with one aspect of the present invention, exactly 2 VCs can have overlapping subzones on the same side of a street or highway. FIG. 2 and FIG. 3 illustrate the assignment of orthogonal channels. In FIG. 2, green channel 1 and red channel 1 are the assigned channels for one VC; green channel 2 and red channel 2 are the assigned channels for another VC. In FIG. 3, green channel 3 and red channel 3 are the assigned channels for one VC; green channel 4 and red channel 4 are the assigned channels for another VC.

Pure P2P (peer to peer) assignment of IP addresses: In order to locate the subzone in which a node is located at layer 3, the present invention uses an IP address assignment scheme that creates a 1-1 (one-on-one) correspondence between the IP address of a node and the subzone in which it is located. This is possible because the entire pure VANET is an intranet. The IP address can be assigned using either IPv6 or IPv4 format. This way, the IP address of a VANET node will approximately reflect the GPS coordinates of the VANET node. The correspondence is created using a specialized (left unspecified in this application) mapping between a subzone with its GPS coordinate and the IP addresses in the subzone. To avoid IP address conflicts, the assignment has to be done in a distributed and consistent manner. Since the IP address has a 1-1 correspondence between the subzone in which a node is residing and the node's IP address, checking of conflicts is accomplished by the nodes within the same subzone communicating with one another. Each node will keep track of all the active IP addresses in the subzone in which it resides. Thus, each node will maintain a table of active IP addresses in the subzone it is located. These tables at the nodes are updated by using a distributed hash table (DHT) algorithm. In a sense, each node is a virtual DHCP (dynamic host configuration protocol) server. As a result of using the DHT algorithm, the assignment is done in a P2P manner.

Pure P2P storage and lookup for IP addresses: To enable routing, a remote node needs to find the IP address of the destination node it intends to communicate with. This can be done according to a P2P-based SIP (session initiation protocol) or a P2P-based IP address lookup scheme. In accordance with one aspect of the present invention, a DHT-based algorithm is used to store the mapping between the node identifiers and the node IP addresses in a pure VANET. In this technology, a remote node will use a node identifier as a key to retrieve the IP address stored in the global (in the sense of the entire pure VANET) distributed IP address database implemented via the DHT algorithm.

Secondary packet delivery in case a relay node disconnect from the VANET: In this technology, a block of data frames is also assigned with a block ID. Within the same subzone, a VC has one primary relay node and at least a secondary (backup) relay node. By utilizing the broadcast nature of wireless transmission, both the primary and secondary relay nodes will receive the same block of transmitted data frames. If the primary relay node fails to forward (send after receiving) the received block within a time limit, the secondary relay node will retransmit the same block.

II. Optimal Routing and Incentives in VANET

Antenna infrastructure: In accordance with one aspect of the present invention, each VINET node is equipped with a multi-ratio antenna system mounted on the rooftop of the vehicle. The antenna system is multi-radio and extended-ranged, while the antennas can be either directional or omni-directional. Each antenna could also be part of a multi-input multi-output (MIMO) antenna system. A typical setup may have 4 antennas, but this is not a restriction of the invention. A VINET node will be hereafter referred to simply as a V-node. On the other hand, a fixed base station at roadside in a VINET will be referred to as an R-node. Each radio can be configured to be either half-duplex (used for only transmitting or only receiving) or full-duplex (used for both transmitting and receiving, but not at the same time). According to one aspect of the present invention, in a typical setup, the radios are configured according to the changing environments using software. Three different configurations are described as follows. The first configuration is suitable for a vehicle on a single arterial road or highway. In this configuration, 2 antennas are used as transmitters, and 2 others are used as receivers. Thus, each V-node can receive and transmit at the same time. The first channel called FT (forward/front transmit) is to send to the front of the vehicle, and the second channel called BT (backward/back transmit) is to send to back of the vehicle. The third channel called FR (forward/front receive) is to receive from the front, and the 4th channel called BR (backward/back receive) is to receive from the back. With this design, there are no channels assigned to communicate with a vehicle on the side. Thus, this configuration is most suitable for a single arterial road or highway. In this configuration, FT and BT antennas are preferably directional, and FR and BR are preferably omni-directional.

The second configuration is suitable for grid roads. In this configuration, there are 4 radios, and each of 4 radios is configured to transmit and to receive (at different time, as being control by software). On a grid road, a vehicle can often come to a junction with 2 or more roads crossing each other. Thus, a vehicle may need to turn and still be connected continuously. In this case, the 4 radios are divided to communicate with other V-nodes or a roadside AP (R-node) on all 4 sides: front, back, right and left. A preferred antenna configuration is comprised of 2 half-duplex transmitting antennas and 2 full-duplex antennas. The 2 half-duplex transmitting antennas are used as FT and BT, and the other 2 full-duplex antennas are configured to send and receive from all around the vehicle. In this configuration, the half-duplex antennas are preferably directional, and the full-duplex antennas are preferably omni-directional. The 3rd configuration is completely symmetric. Each antenna is full-duplex. The horizontal space is divided into 4 quarters:

front, back, right and left. Each quarter occupies 90 degrees of the 360 degrees of a circle. The antenna responsible for front-quarter transmit and receive is called FTR; the antenna responsible for back-quarter transmit and receive is called BTR; the antenna responsible for right-quarter transmit and receive is called RTR; and the antenna responsible for left-quarter transmit and receive is called LTR. In this configuration, all antennas can be directional or omni-directional. Next, the antenna structure of roadside base stations (R-nodes), which are called APs (access points), is described. An AP is connected through a broadband channel to the Internet—often the broadband channel is a fixed wire (copper or fiber). Each AP is equipped with at least 2 antennas, and each functions as an omni-directional extended-range radio. The most suitable place for an AP is at a junction in a grid road system.

Moving base stations: By definition, a VANET is an ad hoc network, implying that the Wi-Fi devices form a single service set, and each node (V- or R-) uses the same channel to communicate with one another. However, this setup has numerous problems. First, as all nodes are on the same channel, there is a great potential of RF interference. Second, as all nodes are peers, network management is difficult. For example, security issues are hard to manage in a P2P (peer-to-peer) network. Third, it requires all nodes to be configured in the ad hoc mode. Forth, the P2P setup assumes a point-to-point topology of the network. However, this assumption fundamentally conflicts with the properties of radio communication. In all RF communication, all data are broadcast and every node can hear if it is in range of the transmitter. The infrastructure mode, on the other hand, exploits the broadcast nature of radio communication. Thus, in accordance with one aspect of the present invention, all (V- and R-) nodes operate in the infrastructure mode. Each V-node is configured as a Wi-Fi base station (BS) or a Wi-Fi client, or both at the same time. To avoid confusion, only a V-node is called a BS and only an R-node is called an AP. Therefore, each V-node is a moving base station in a VINET, while each AP is a fixed base station.

Relative topology: Using the infrastructure mode, a VINET behaves almost like a fixed network, except that the topology is comprised of two kinds of nodes. The V-nodes are moving BSs and the R-nodes are fixed APs. At any moment in time, the entire set of the V-nodes and R-nodes form the absolute topology of an interconnected network, which is no longer a single or interconnected ad doc networks. Under the condition that all V-nodes moving on the same road have zero relative velocity, the subset of all V-nodes on the same street form a relative topology that does not change in time. In a VINET, packets from and to nodes inside a subset of a "fixed" relative topology are restricted to routed thorough nodes in this subset of V nodes and bordering (V- or R-) nodes. Thus, for these packets, the only relevant topology is the fixed relative topology plus the bordering nodes. Thus, all V2V packet flows need only consider the relative topologies. In this way, the complex routing problem of an entire VINET is decomposed into "independent" routing problems associated with individual relative topologies. Note that a relative topology may have a lattice structure as it is the topology of V-nodes on the same street or highway.

Principle of parallel flows: There are yet other advantages of this concept of relative topology. There are two cases to consider: downstream packet flows and upstream packet flows. The direction of reference is relative to the Internet. Thus, a downstream flow refers to a packet flow from the Internet to a V-node, and an upstream flow refers to a packet flow from a V-node to the Internet. For upstream flows, it does not make sense to send packets in opposite direction of the vehicle movement. The reason is that the purpose of upstream flows is to send packets to a roadside AP. Therefore, the natural choice of an intended AP is one that a V-node is approaching. It does not make sense to send packets to an AP which is behind the forward moving vehicle. If packets are sent in opposite direction of the vehicle movement, then the intended AP is moving away from the sender. Thus, after some time, the intended AP becomes impossible to connect, and a forced handover must occur. Thus, for upstream flows, the packet flows must be in the parallel direction of the traffic flow. On the other hand, for downstream flows, the situation is similar. The best intended AP to receive packets is still one that a V-node is moving to. Thus, for downstream flows, the packet flows should be in the anti-parallel direction of the traffic flow. Another consideration is that RF signals are attenuated if there are obstructing objects between transmitters and receivers. Packets should travel in clear line-of-sight manner from hop to hop. This also implies that packet flows and traffic flow should be in parallel. Therefore, in accordance with one aspect of the present invention, routing is designed by following the guideline that downstream flows are in anti-parallel direction of the traffic flows and upstream flows are in the parallel direction of the traffic flows. This guideline is called the principle of parallel (packet-traffic) flows. To solve the complete routing problem, one has to find the routes for V2R (or R2V, which is subsumed in the case of V2R) flows. In this case, one has to consider a partial absolute topology comprising of a fixed relative topology with nearby roadside APs. These routes will remain valid as long as the principle of parallel flows is not violated. However, as the nodes in a relative topology will move over time, and the fixed APs never move, it is inevitable that packet flows must change their routes, as the originally intended AP may become impossible to connect. A handover must be conducted. Therefore, mobility (handovers from one intended receiver to a new intended receiver) is a fundamental issue in a VINET. In fact, mobility is a fundamental issue in all mobile communication networks, not just in a VINET or a VANET. The parallel flow principle helps greatly reduce the need for forced handovers.

Channel assignment: The next aspect of the present invention concerns channel assignment. One object of channel assignment is to minimize the number of hops a packet has to traverse in a VINET. Recall that each node is restricted to a limited number of antennas, and there are only a limited number of orthogonal channels at a frequency band. For example, 802.11a has 8 orthogonal channels. 802.11a has the advantage that it has more non-overlapping channels; but it has less range. However, due to fact that the 802.11a band is much less used than the band used by 802.11g/b, the actual range at high speed is actually bigger. In 802.11b/g, there are only 3 orthogonal (nonoverlapping) channels. It should be noted that a VINET is not restricted to using Wi-Fi technology for communication. Any short-range or medium-range small-cell wireless IP technology can be used. For example, WiMAX, LTE femtocell or picocell technology can also be used. In accordance with one aspect of the present invention, all roadside APs are equipped with extended range omni-directional antennas. The reason for such an arrangement is that this ensures that the packets flows to and from a roadside AP remain in the same channel, even as a vehicle drives past the AP. Note that as a vehicle drives past an AP, the direction of a packet flow may change from being parallel to anti-parallel (or vice versa). Such changes cause inefficiency in the V2R routing. Thus, after a certain distance threshold has been reached, a forced handover must be conducted. On a two-way street, the channels are assigned in such a way that the channels are orthogonal between the two opposing directions. For example, all V2V channels are divided into two orthogonal subsets: one subset for each direction. Thus, there will be no interference between packet flows in opposite directions of the traffic.

Subset relative topologies: In accordance with one aspect of the present invention, to minimize hop counts, all the V-nodes on the same street are organized into disjoint subsets. Further, each disjoint subset is assigned a discrete color. Packets are forwarded from one colored subset to the next (from an individual V-node to a set of V-nodes). If a packet traverses 2 colored subset before arriving at a roadside AP, the number of hops this packet traverses in the VINET is 3. Furthermore, each subset of V-node forms a relative topology. In general, each V-node within a colored subset will use identical channel assignments for packet transmissions and receptions. However, this is not a restriction. A criterion to include a V-node into a subset is based on SNR (signal-to-noise ratio, sometimes also known as Eb/No). The principle is that each V-node within the same subset (also called group) hears each other so well that if they send to one another in the same channel, severe interference will occur. Another criterion to organize the nodes is based on distance. This organization of nodes is a function of the control plane of a VINET. While there are multiple ways to organize subsets (groups) on the same street, the following method based on lattice topology is one possibility. In this method, all V-nodes on the same street in one direction are organized as having two colors: green or red. Green represents one layer, and red represents another layer. Thus, the entire topology of the V-nodes on the same street in one direction form a lattice of interleaving red and green layers.

Figure 21:
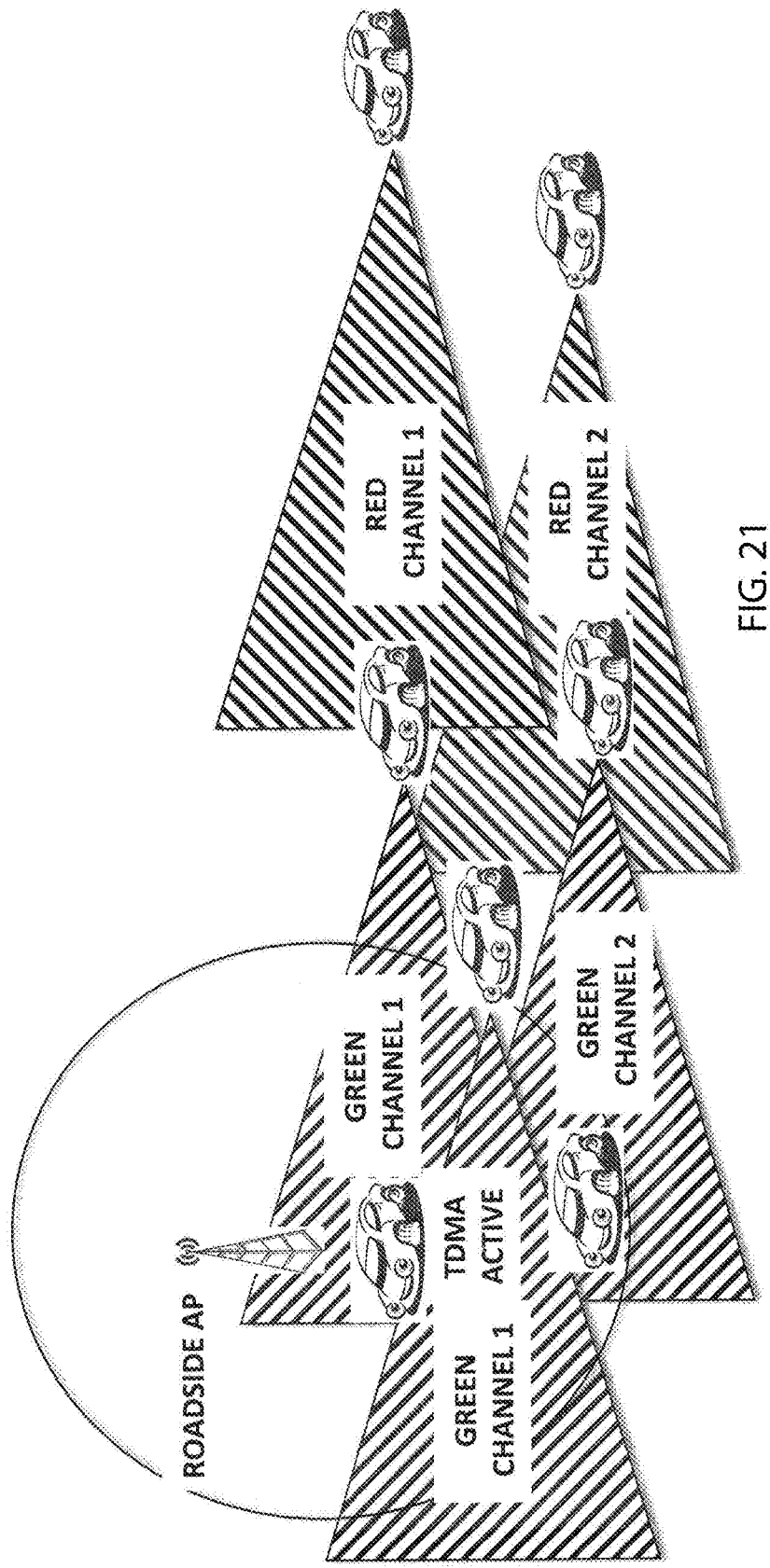
FIG. 21 shows a channel assignment in a red/green layer relative topology on a highway for uploading.
Figure 22:
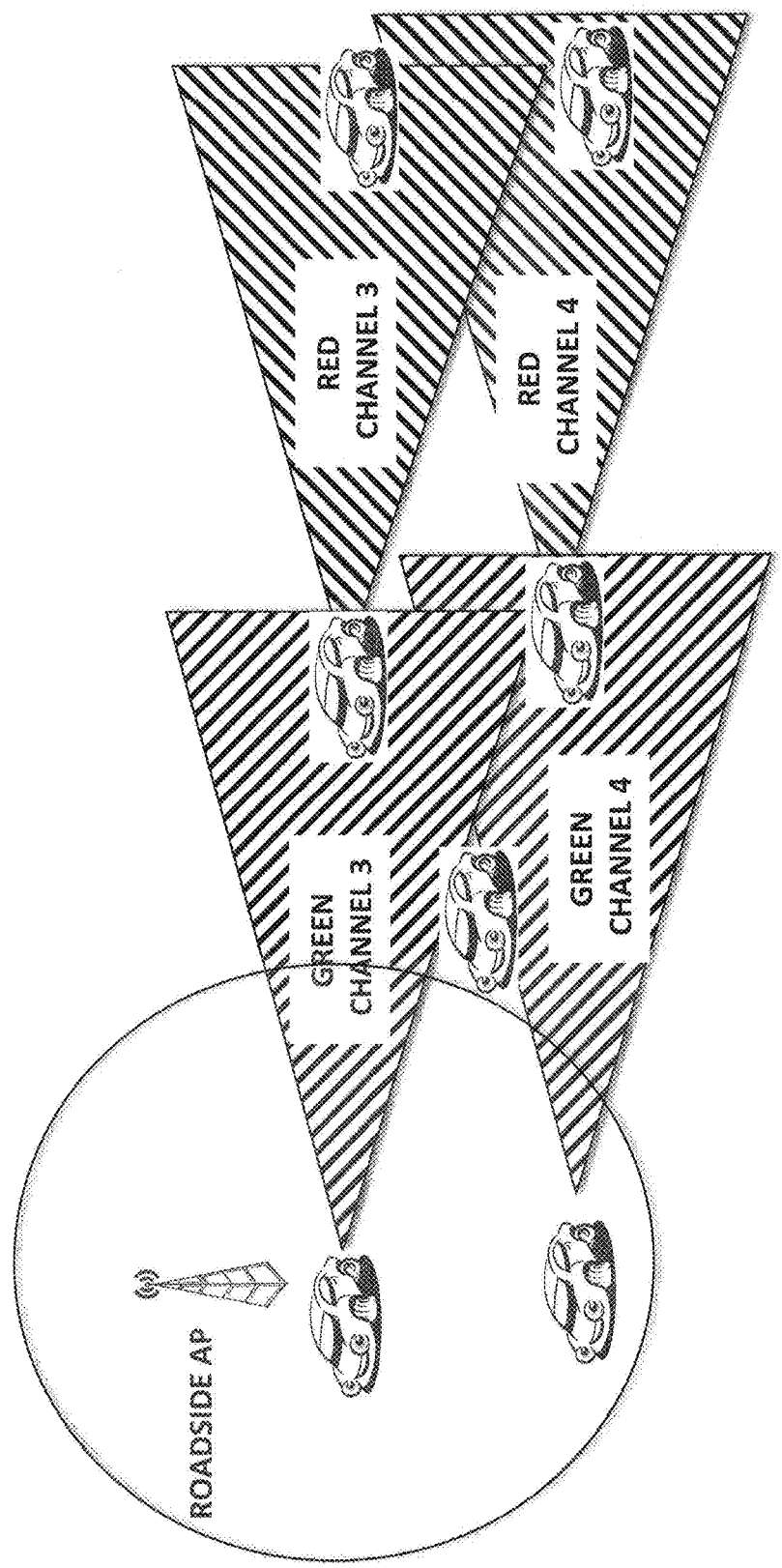
FIG. 22 shows a channel assignment in a red/green layer relative topology on a highway for downloading.

This arrangement is illustrated in FIG. 21 and FIG. 22. In FIG. 21, upstream packet flows are depicted along with the traffic flows. In FIG. 21, there are 2 cars in a green layer near the roadside AP, followed by a red layer of 3 cars. The red-layer cars use green channel 1 and green channel 2 to send packets to the front layer, which is green. Following the red layer is a second green layer of 2 cars. These 2 cars in the second green layers use red channel 1 and red channel 2 to send packets to the front layer, which is red. FIG. 22 is similar except that only the downstream packet flows are shown. Now, the first green-layer cars use green channel 3 and green channel 4 to send packets to the back layer, which is red. The red-layer cars use red channel 3 and red channel 4 to send packets to the back layer, which is green. Note that in this representative example (embodiment), red channel 1 and green channel 1 can be the same channel. The reason is that these two channels are all upstream channels and packets in the upstream channels are sent to an intended AP in a store-and-forward manner from layer to layer. Thus, since these packets are the same along the path, the sending and receiving can be (and should be) arranged to occur at different times. Similarly, red channel x can be the same as green channel x. Thus, if each layer has 2 forward channels and 2 backward channels and the street is 2-way, the total number of independent channels needed is only 4. Since there are at least 2 channels reserved for a roadside AP, there are still 2 more unused channels in the 802.11a band. Thus, in general, depending on the V-node density and the bandwidth requirements, the number of forward channels or backward channels per layer is limited to 3.

Thus, a packet will only travel from a red node to a green node or from a green node to a red node. A green node will send or receive packets in a green channel, and a red node will send or receive packets in a red channel. Thus, this relative topology has a lattice structure and routing is straightforward. Since all the paths are from red to green to red (and vice versa), no paths that will form a cycle. Thus, the classical looping problem of label correcting algorithms totally disappears. Note that this layered topology approach totally transforms the routing problem from a classical shortest path problem to a rate assignment problem. The issue now is how to assign the rate to each available forward or backward channel. This problem is a special max-flow problem with a lattice structure. In accordance with one aspect of the present invention, the control plane of the VINET solves this problem for each relative topology which is defined by two separating APs on the same street or highway. Yet another issue here is the problem of assigning layers (or subsets) in the decomposed topology approach. Obviously, if the sole object is to minimize hop counts in a VINET routing, then there should be only two layers, one green and one red. But this might not be feasible. If the distance between two separating APs on the same street is very far, then it is impossible for the V-nodes to communicate from one end of a street to the other end. Further, as many V-nodes may send to the same V-node, the chance of packet collisions will greatly increase. Therefore, the layer assignment problem is constrained by the antenna power and the distance between separating APs on the same street. This assignment should also depend on the V-node density on the same street. If the number of V-nodes is large, to reduce interference, it might be better to increase the number of layers. In this case, the VINET operator should install more APs on such a busy street. According to one aspect of the present invention, the number of layers is roughly equal to distance between two separating APs on the same street divided by a distance parameter. This distance parameter is inversely proportional to bandwidth requirements in the V-nodes. This distance parameter is set to be small if the bandwidth requirements in the V-nodes are large; otherwise, the parameter is set to be large, to minimize hop counts.

TDMA to avoid packet collisions: In the decomposed topology approach, it is possible that multiple senders could send to the same receiver; thus, packet collisions become highly possible. In the layered approach, green nodes never communicate directly with green nodes, and red nodes never directly communicate with red nodes. This method already reduces the chance of packet collisions. According to one aspect of the present invention, to further reduce packet collisions, a TDMA reservation scheme is used. Recall that in the layered topology approach, each layer has up to 3 orthogonal channels for transmissions. Thus, a V-node functioning as a BS could have multiple V-nodes attaching to it as clients. Further, according one aspect of the present invention, there could be multiple V-nodes in the same layer assigned to the same channel. Transmissions to these V-nodes with the same channel should be coordinated using a TDMA reservation scheme. Reasonable TDMA schemes can be used; one of which is an IP-TDMA scheme. However, due to the fact that vehicles are moving, the delay between a BS and its clients may change over time, exotic schemes that try to maximize throughput are not advisable. In a VINET, there is a separate control plane that performs reservation for packet/frame time slots. Since V2V delays change over time as vehicles move, the reservation scheme is based on chunks (or blocks) of packets (or frames), not a single packet (frame). Further, enough guard bands are to be used in between two neighboring blocks of transmission. This is done to avoid synchronization error. The control plane that does the block reservation can either be in-band or out-band. In an in-band scheme, control packets (or frames) are sent in the same channel as the data channel. In an out-band scheme, control packets (or frames) are sent in a channel different from the data channel. The reservation can be based on polling, round robin, or contention. The control plane also chooses which V-nodes are used as relay nodes. Since the number of independent channels is limited to 3, a simple policy is a random selection of up to 3 V-nodes in the same layer. In addition, for downstream packet flows, a V-node can choose which relay nodes from a previous layer to send the downstream packets. If the V-node has enough antennas, the V-node should choose 2 or more relay nodes with different channels (in general, different relay nodes in the same layer should have independent channels). In this case, there will be no need for TDMA media access control to avoid packet collisions. This is the case depicted in FIG. 22.

Methods to counter the loss of relay V-nodes: A VINET is different from an ordinary cellular infrastructure. It is possible that a V-node can stop at any moment, or a V-node can move to another street or enter into a garage structure, causing changes in a relative topology. Thus, a relay node on a path from a source to a destination may suddenly disappear. To solve this problem, multi-path routing for the same IP connection (unicast, multicast, or anycast) will be used in a VINET. The mobility technology invented by the authors (under application for a US patent) can be used to realize multi-path packet delivery over the same IP connection. In accordance with another aspect of the present invention, a reservation-n-rebroadcast scheme can also be used to recover lost packets. This scheme can be implemented either in conjunction with or without a TDMA link layer control. In such a scheme, transmissions are reserved via reservation mini-frames. Each reservation mini-frame is a very short control frame that occupies slightly more than a few DIFS (DCF inter-frame space) intervals, where DCF is the distributed coordination function as defined in the 802.11 standards. There exist numerous reservation schemes in the public domain, for example, PCF (point coordination function), HCF (hybrid coordination function), etc. The reservation mini-frames can be arbitrated using a priority queuing scheme such as DFC, or polling, or round robin, or a hybrid. Data frames are reserved in blocks: each transmitter can reserve a fixed block of data frames. However, the fixed size can vary: the actual size of a block may be indicated in the reservation mini-frames. Each block of data frames will be assigned a block ID, which is known to all the terminals and the base stations that can hear the reservation mini-frames and data frames. In a reservation mini-frame, a number of relay V-nodes are specified as backup rely node. These back-up relay node will use a timer to determine if a particular block of data frames is not transmitted within a timeout threshold. If a timeout event occurs, then the block of data frames is considered lost, then backup relay node making the detection will retransmit the block. The backup relay nodes are chosen so that it hears the original transmission of the data block; it stores the original transmitted data block and use it to retransmit when needed. Note that the block ID is designed to be unique in all the radio transmissions from a source V-node all the way to a destination roadside AP (or from a source roadside AP to a destination V-node). Since this scheme is used in conjunction with a reservation scheme, there will be no duplication of block transmissions. To send a lost data block, a backup relay V-node has to make a reservation specifying the data block ID. Since all relay nodes will hear the reservation mini-frames, only one relay node will retransmit the lost data block.

Control plane functionalities: In accordance with one aspect of the present invention, there is a separate control plane for VINET management. The objectives of the control plane include: (a) maintaining topology tables (both the relative and absolute topologies), (2) maintaining IP address tables to enable V-nodes and R-nodes to find each other in terms of IP addresses, (3) channel assignment, (4) calculating potential trajectory of each V-node to start an anticipative handover. The control plane takes into account of the street topology, known through GPS (global position satellite) mappings and VINET topologies. In accordance with one aspect of the present invention, a distributed hash table based store-and-retrieval algorithm is used to store the various tables: topology tables, IP address tables, tables of potential future V-nodes locations, etc. These tables can also be implemented in a centralized database system. In particular, the control plane will trigger an anticipatory handover if the any of the following conditions is met:

(a) a V-node is moving towards an AP and is about to pass the AP;
(b) a V-node is exiting the current road and turning to another road;
(c) a V-node suddenly stops and breaks the relative topology in which it is a member;
(d) a V-node suddenly stops functioning as a V-node;
(e) a V-node changes its speed/location so much the relative topology in which it is a member no longer makes sense, a new subset membership has to be assigned to the changed V-node. In addition, the IP address assignments for V-nodes are also performed by the control plane. As V-nodes may change their attachment points often, the classical DHCP (dynamic host configuration protocol) may not be used. One way is to assign IPv6 addresses to the V-nodes. However, this is not a restriction of the present invention.

Methods to incentivize sharing of bandwidths: The present invention also provides incentives to motivate merchants and resides on roadsides to set up APs to share their broadband bandwidths. For merchants, one incentive is to force all displays of Internet devices using a V-node via a roadside AP for Internet connection to see advertisements of the merchants. For residents, one incentive is to provide free or reduced-fee membership in an MVNO (mobile virtual network operator) service to the residents. For example, this MVNO service could have a large coverage in many cities. Free or reduced-fee mobile VoIP (voice over IP) services can also be used as incentives to both merchants and residents.

III. P2P Mobile Virtual Network Operator Model and Routing

Obtaining critical mass is a crucial first step in establishing a social-network based MVNO. As taxi drivers are individual small-businessmen and they spend most of their time on the street, they represent most suitable subscribers for the P2P MVNO model. In accordance with one aspect of the present invention, the P2P MVNO provides to taxi drivers four types of services: (a) call-center; (2) in-vehicle VoIP; (3) location-based assistance; (4) VMI. In the call-center service, the MVNO will automatically search and match a taxi-caller and a taxi driver. The calling for taxies can be accomplished in two ways: text-based or voice-based. In a text-based taxi calling, the text message is sent via the Internet, which is routed to the MVNO directly. In a voice-based calling, a voice recognition system will receive the phone call, and hook up a taxi driver on the street to directly to the caller. Location-based assistance to the taxi includes: (a) traffic congestion information, (b) estimated travel time; (c) routing assistance; (c) auxiliary information at locations: items on sale in a special promotions at a store, phone number look-up at the destination, etc. In accordance with one aspect of the present invention, free in-network IP-based services are used as incentives to recruit new subscriber to the P2P MVNO. Such in-network services may include VoIP, video conferencing over IP, select location-based services, etc.

In accordance with one aspect of the present invention, select CPE devices are also sold at cost or at low prices to subscribers. These consumer devices are preloaded with software that enables free in-network services. For example, a consumer CPE device with video conferencing over IP capability will enable free in-network video conferencing over IP for subscribers. Such incentives are effective tools for generating viral growth or snowballing effect of the social-networking business model for the P2P MVNO. Revenue model for the P2P MVNO include monthly or periodic subscription fees for: (a) VMI, (b) Value-added service (e.g. call-Taxi service), (c) telematics services (location-based, safety related, traffic related, etc.), or (d) fixed or mobile VoIP, fixed or mobile HDTV/IPTV, fixed or mobile Internet service. The P2P MVNO may also charge technology license fees for specialty software in mobile terminals such as smartphones, laptops, and MIDs, etc. In addition, technology license fees for specialty software in APs, gateway servers, VMI box installed in vehicles can also be charged. The specialty software may enable these devices to provide seamless handover, or bandwidth bonding, other functionalities. Further, excess mobile bandwidth can be re-sold to carriers. A P2P MVNO can also receive income through advertisement in the CPE devices connected through the MVNO. Such devices may include the VMI-telematics box installed inside a vehicle, or a home/office box that is capable of providing video or voice conferencing over IP. In accordance with one aspect of the present invention, a P2P MVNO is formed by piecing together 3 types of Wi-Fi mesh networks: (1) VANET, (2) fixed mesh networks on the street, and (3) ad hoc mesh network on the street. Such a network is called the composite mesh network. Possible types of individual networks that can be added include: (a) home/office Wi-Fi network, (b) home/office femtocell network, (c) home/office picocell networks, (d) VANETs, (d) home/office ad hoc Wi-Fi networks, (e) on-the-street ad hoc Wi-Fi networks. In accordance with one aspect of the present invention, types of individual PCE that can be added to the composite mesh networks include: laptops, smartphones, PDAs (personal digital assistants), desktop PCs, MIDs, game machines, MPMs (portable media players), servers, Wi-Fi APs, etc. The only and common requirement for all these devices is that they are IP devices: they can be connected to an IP network. The devices in a composite mesh network can either be operating in an infrastructure mode or had hoc mode, as specified in the Wi-Fi standards or femtocell standards. In accordance with one aspect of the present invention, a composite mesh network is also connected through vertical handover to carrier networks, including 3G, 4G (WiMAX/WiBro), LTE, HSPA plus, and any future carrier grade mobile data networks.

Figure 23:
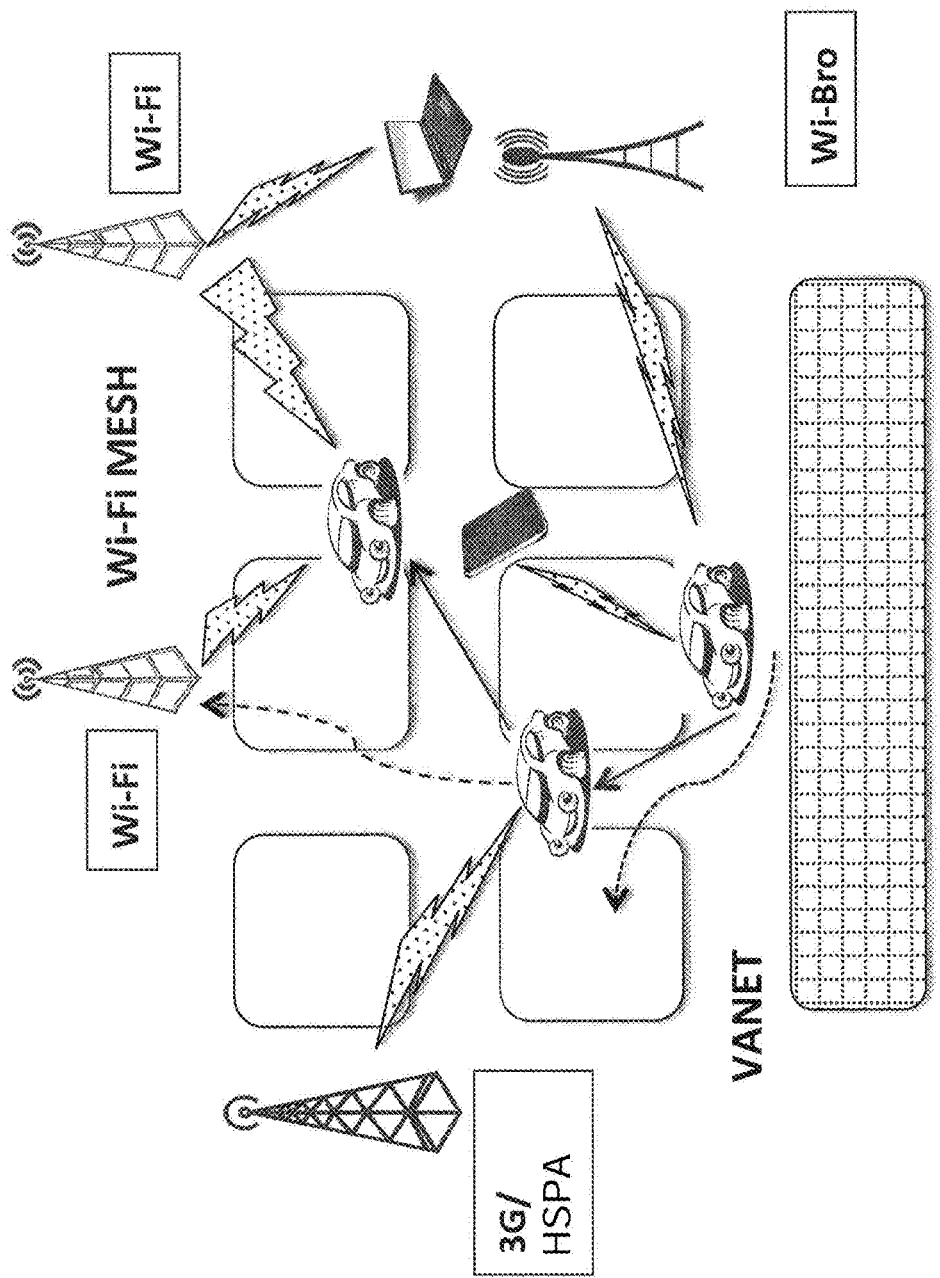
FIG. 23 shows a typical P2P composite mesh network with collaborating carrier Aps.
Figure 24:
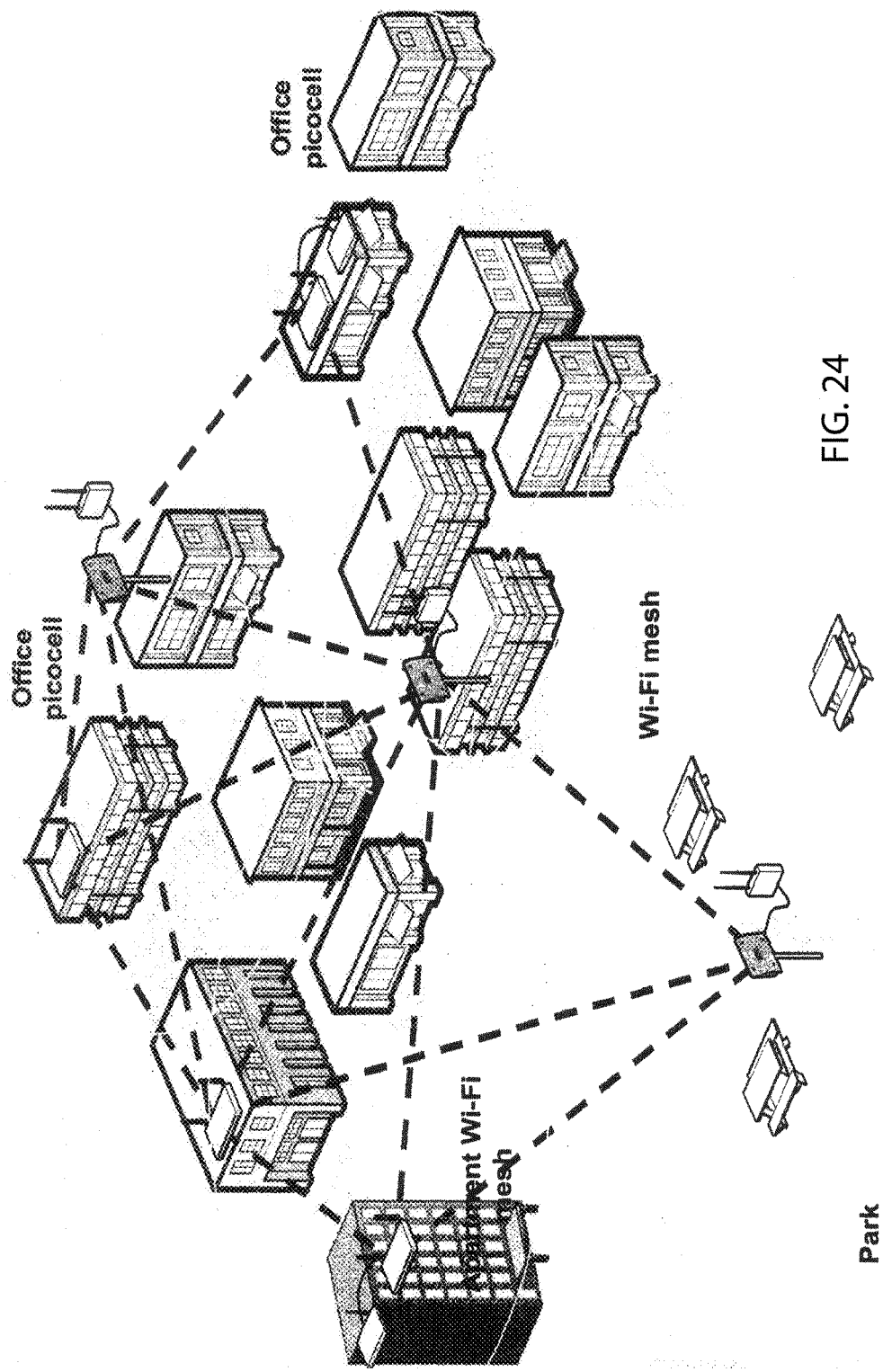
FIG. 24 shows a typical composite P2P mesh network in a metropolitan area.
Figure 25:
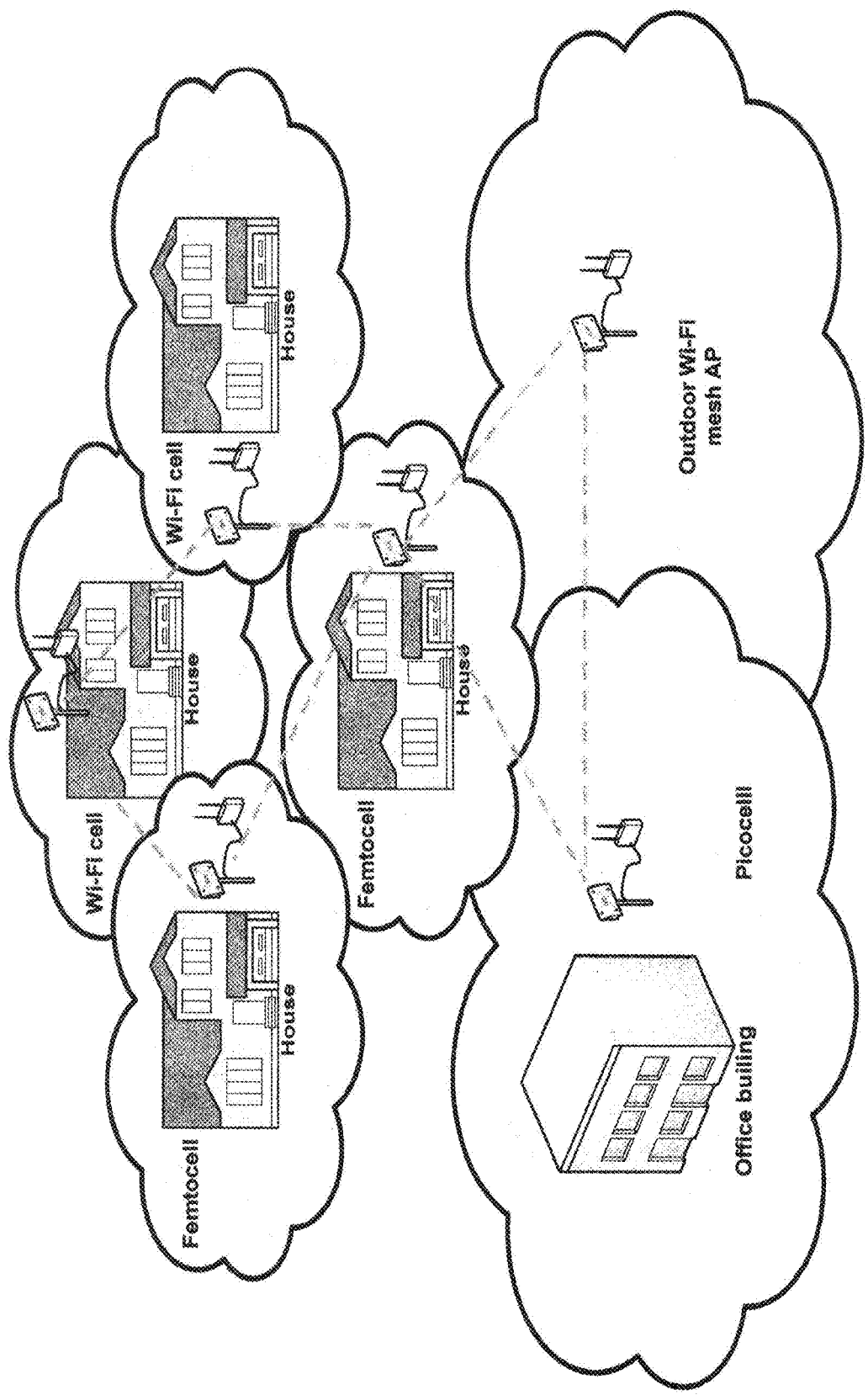
FIG. 25 shows a typical composite P2P mesh network in a rural area.
Figure 26:
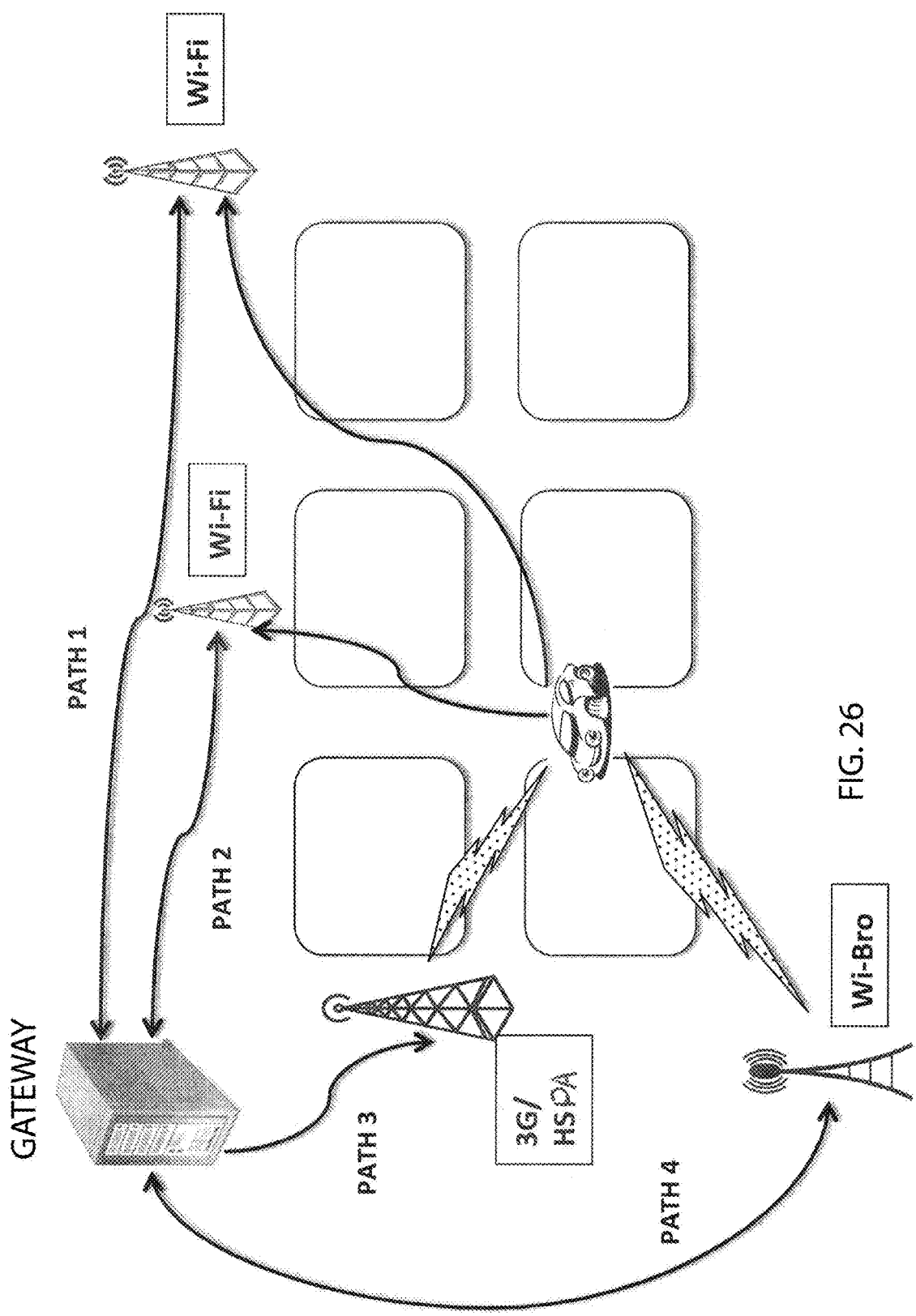
FIG. 26 shows bandwidth bonding in the composite mesh-carrier network.
Figure 27:
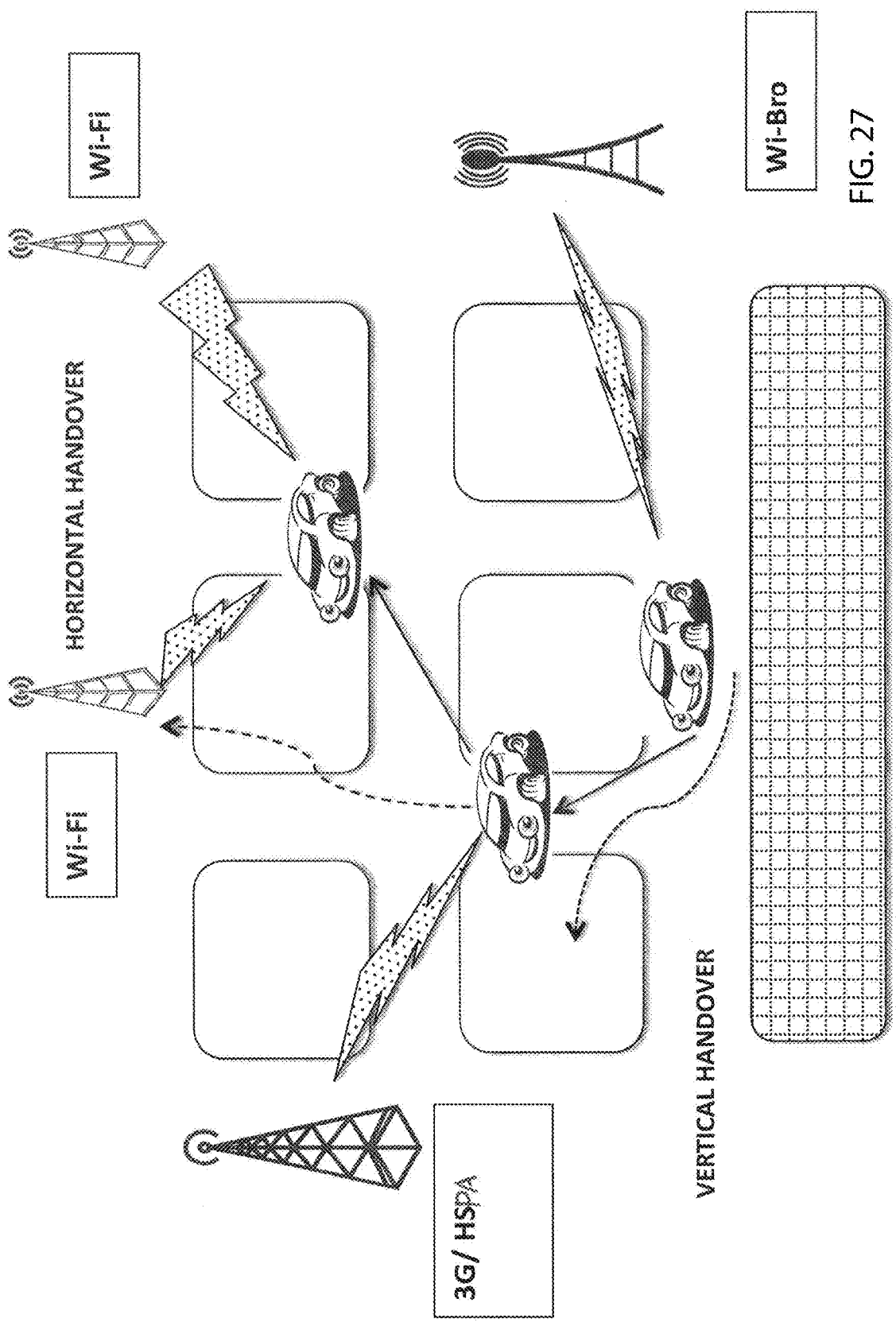
FIG. 27 shows vertical handover in a composite mesh-carrier network.
Figure 28:
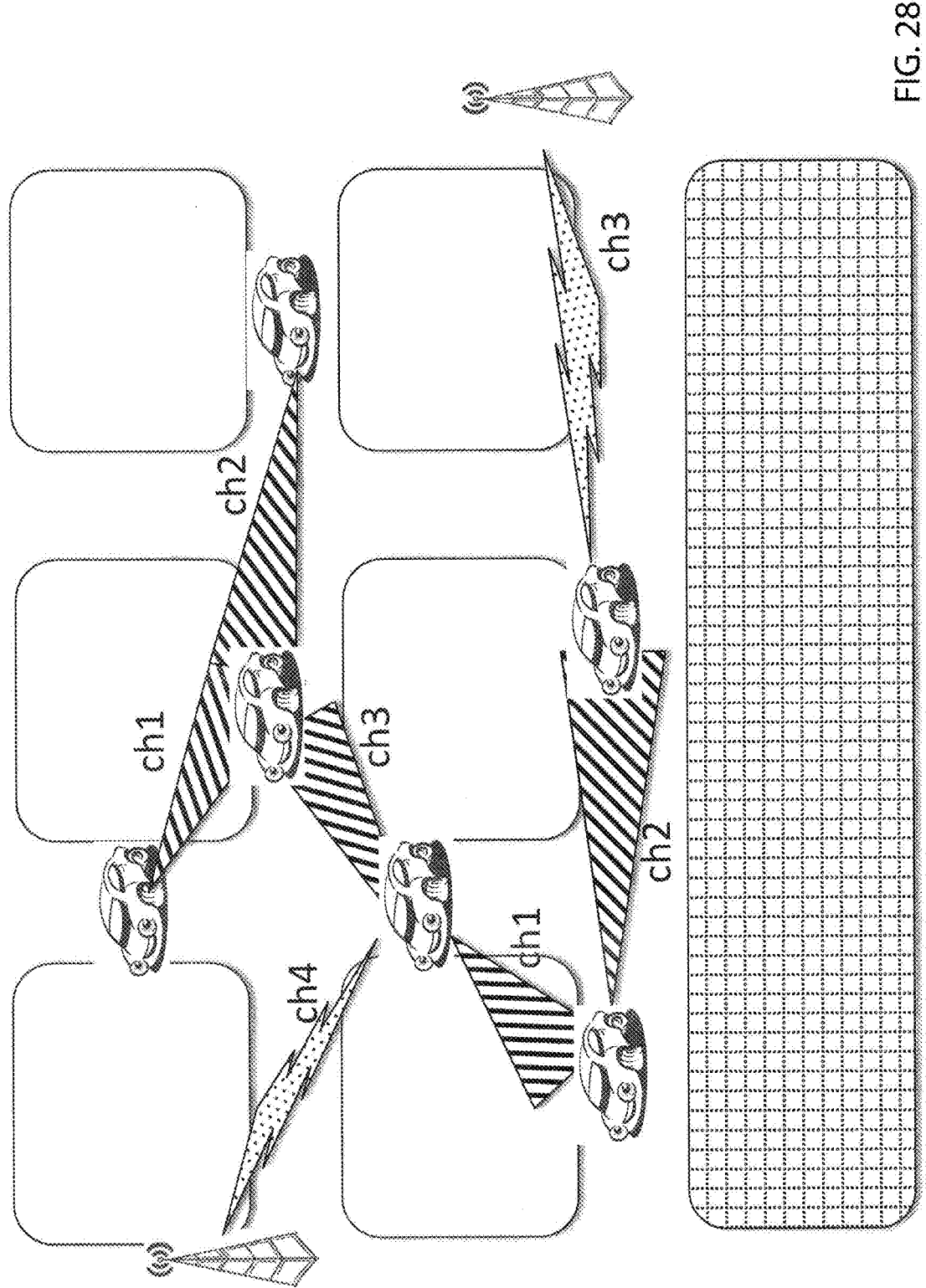
FIG. 28 shows orthogonal channel assignment in a composite mesh network.

The combined carrier networks and a composite mesh network are called a composite P2P network. A composite network is illustrated in FIG. 23. A composite mesh network for a metropolitan area is illustrated in FIG. 24; while a composite mesh network in a rural area is illustrated in FIG. 25. In a composite P2P networks, a mobile device may have to perform two kinds of handover: vertical (between different kinds of bandwidths) and horizontal (between the same kinds of bandwidth). These handovers are illustrated in FIG. 27. In a composite P2P network, a device can utilize multiple bandwidths provided by different sub-networks in the composite P2P network. This is illustrated in FIG. 21, in which a car is connected via 4 paths to a gateway: path 1 and path 2 are connected via Wi-Fi APs, path 3 is connected via a 3G/HSPA cell tower, and path 4 is connected through a WiBro cell tower. A gateway is needed to achieve bandwidth bonding as the other end point of a unicast will only send packets to a single destination. The gateway will function as a proxy: the other end point will pump as many packets as possible to the gateway, and the gateway will distribute the packets unto the 4 paths to the mobile device, a car in FIG. 26. In accordance with one aspect of the present invention, collision-free simultaneous transmissions at the same location is accomplished by assigning orthogonal channels to each pair of communications. It is important to first clearly define the terms for this multi-radio technology. First, it is assumed that all communications are direct and two ways. Therefore, a transmitter is also a receiver, and a receiver is also a transmitter. Each vehicle is assumed to be equipped with multi-radio directional antennas. A typical setup is that each vehicle has 4-radio directional antenna at the vehicle rooftop. Each transmitter-receiver pair is called a communication pair. On a two-way street, the admissible channels in one direction are orthogonal to the admissible channels on the other direction. For example, on an East-West bound highway, all East-bound vehicles are allowed to communicate using odd-numbered channels, while the West-bound vehicles are allowed only to communicate using even-number channels. An example of orthogonal channel assignment is illustrated in FIG. 28.

A simple heuristic which is adapted to the street traffic and topology is used to assign the channels. These channels are location constrained. For example, to communicate to a vehicle in front or back on a north-bound street, the channels allowed may be set to be in the set {2, 4}; but to communicate to a vehicle on the side, the channels allowed may be set to be in the set {6, 8}. These heuristics can be designed using machine learning, or fuzzy logic. In addition, if at a cross-section, if there is a fixed roadside AP available, then for all vehicles within a short pre-defined distance from the cross-section, communications between vehicles may be dropped in favor of direct communications with the roadside AP. In accordance with one aspect of the present invention, the channel assignment for communication pairs will be adapted as the topology on the street is changed. This process is called the channel adaptation algorithm. This algorithm takes into account of the street topology (known through the GPS mapping), and VANET topology. In accordance with one aspect of the present invention, an explicit reservation scheme is also used when the channel assignment algorithm has deemed that non-conflict channel assignments are impossible. Explicit reservation scheme may involve IP-TDMA reservation schemes or RTS-CTS schemes. In accordance with one aspect of the present invention, a topology scanning algorithm is enacted periodically to scan and store the neighboring mesh devices. These devices can be a VANET nodes or simply a CPE device. If any device in the composite mesh network is disconnected, the cached topology is used as the initialization for the restored network topology. In accordance with one aspect of the present invention, a DHT-based distributed store-and-retrieval algorithm is used to store the IP addresses of the nodes in the composite mesh network. The DHT-based store-and-retrieval system actually implement a distributed database wherein a device ID can be used to as the keys to store and retrieve IP addresses, and other associated information. In accordance with one aspect of the present invention, routing in a VANET is based on GPS coordinates or other geographical coordinates. The VANET map is divided into zones and routing is divided into zone-to-zone (Z2Z), vehicle-to-zone (V2Z), vehicle-to-vehicle (V2V), and vehicle-to roadside (V2R). In accordance with one aspect of the present invention, virtual circuits (VCs) are set up so that IP packets assigned to a particular VC must travel in a particular sequence of nodes in an overlay network, which constitutes the path of the VC in the overlay network.

Figure 29:
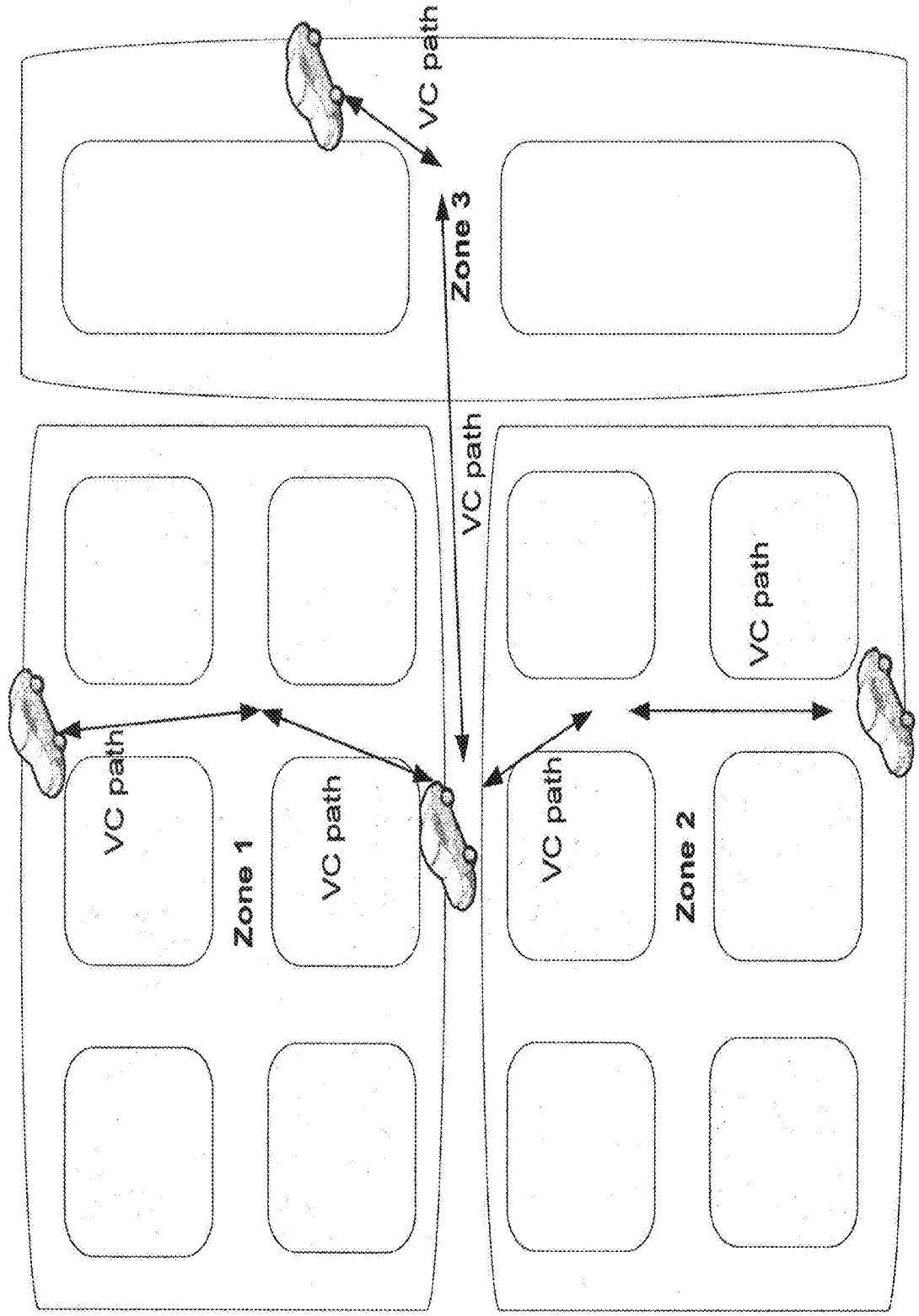
FIG. 29 illustrates the zone-based routing in a composite mesh network.

In accordance with one aspect of the present invention, packet delivery between a source and a destination is done through a sequence of VCs, going through V2Z, Z2Z and Z2V segments of the routes. This is illustrated in FIG. 29. In accordance with one aspect of the present invention, the number of VCs from any vehicle to any zone is restricted to 4. In accordance with one aspect of the present invention the VC to choose for routing strongly mostly depend on the street topology and the current VANET topology, and only weakly depend on the congestion on the VCs. In particular, packets flows in the VCs are chosen by the routing algorithm to make sure that packet flows parallel the traffic flows. For example, if a vehicle to is to determine a VC to reach a roadside AP which is situated in the north of the vehicle, then the VC should be chosen so that the current vehicle routing is in parallel to the packet flow. Ideally, the vehicle should be traveling toward the northern direction. If on the other hand, the vehicle is traveling in the Southern direction, then the routing algorithm will choose a roadside AP towards the South.

IV. Free Air

Strong Incentives to Acquire Handset Owners and Merchants as Customers: Ultimately, as a consumer approaches a location, either in a vehicle or by walking, ads from nearby merchants in the proximity of his final destination should be fed to his mobile device in an attractive manner. The key is to create incentives so that both consumers and merchants feel compelled to do it. In the Free-Air model, a consumer is attracted to the platform via two strong incentives: (1) free bandwidth and (2) bargains and savings from nearby merchants. Due to the recent changes in wireless data pricing, handset users' first and foremost concern is free bandwidth. Today, as the use of smartphones has exploded, while wireless data rates are reaching the theoretical limits, carriers are unable to meet bandwidth demand. Therefore, many carriers have switched to tiered pricing from all-you-can-eat fixed pricing. It is expected that all carriers will follow suit. Today, a handset user might be enticed to go to a Starbucks store simply to get free Wi-Fi. In a similar and a more attractive manner, a Free-Air user does not even have to go to a special store to get free Wi-Fi. Free-air member merchants on the roadside or the hallway of a shopping mall will provide free Wi-Fi, in exchange for the right to send ads to a user's handset. The second incentive for a handset owner also concerns monetary values. The primary concern for any consumer is price. As LBMA has a much higher click-through rate, merchants will be strongly motivated to offer special deals and attractive discounts. In Korea, some super sales are time sensitive. The timeliness of LBMA in this case is especially important for consumers: mobile ad receivers have an unfair advantage to these special deals over other consumers. From a merchant's point of view, the foremost concern is getting a handset owner's consent to send ads. This consent is easily established by the strong incentive for a handset owner to get free Wi-Fi. To a merchant, a free Wi-Fi incurs practically zero operating costs as the free Wi-Fi will share the merchant's existing broadband connection. In one version of the business model, the Free-Air operator will give merchants free Wi-Fi access points (APs) as an incentive to join the Free-Air membership. The cost of the Wi-Fi APs will be recouped from the percentage cut from every sale that is consummated through the mobile ads.

Ad-flows in anticipation of upcoming merchants on the road: In the Free-Air VANET, vehicles on a road are simply linked as a virtual circuit in parallel with the road. The Ad-Flow mechanism will forward ads to the in-vehicle handsets concerning the upcoming shops and service stations. This kind of ads is crucial for travelers in a highway away from cities. Consider a Free-Air user sitting inside a vehicle traveling on a highway in a rural area. It is highly desirable to obtain detailed information regarding available shops and service stations in an area where he is not familiar with. If the handset user selects that he desires food-services information through the Free-Air application, then food-service merchants will forward special e-coupons and other promotions, along with driving directions. Since these ads are sent and displayed electronically, they can contain a richer set of information than a roadside billboard. Roadside billboards have numerous disadvantages: they can be missed, they are difficult to change, and they do not offer coupons. Monetization Schemes: The main monetization schemes of Free-Air are two: (a) Fixed percentage cut from any transacted business resulting from the Ad-Flow (LBMA) mechanism (b) Monthly subscription fees for VMI service. Other schemes are possible and are described below: Equipment sales: Free-Air will also sell handsets specialized for Free-Air applications. These handsets may or may not be tied to other carriers. If they are not tied to other carriers, these handsets will be the only handsets that can communicate through the free bandwidths offered by Free-Air. Therefore, these handsets will be highly suitable for travelers and low-income users. If they are not tied to other carriers, then the only antenna needed for the handsets will be Wi-Fi. In addition, specialized handsets equipping with two Wi-Fi antennas can also be sold. These handsets will be suitable for getting higher bandwidths by bonding bandwidths from two nearby Wi-Fi APs. Such handsets will be very attractive for users that desire high-bandwidth applications. For example, people desiring HD video streaming will find these handsets very attractive.

License Fees to 3rd Party Vendors: Free-Air will also charge license fees for using proprietary technology embedded in Free-Air. For example, Skype and other VoIP providers may desire seamless mobility provided by Free-Air. Mobile IPTV providers may also desire seamless mobility inside a vehicle. HD video streaming applications may desire bandwidth bonding provided by Free-Air. New Breed of MVNO: Virtual Infrastructure Provider with VANET: In the second phase of the Free-Air business model, more incentives will be added: (1) data mobility, (2) in-vehicle Ad-Flow, (3) VoIP with voice mobility, and (4) vehicle mobile Internet (VMI) service. Out of these four services, the first two, data mobility and in-vehicle Ad-Flow are free to Free-Air handset users.

VANET: While there are numerous proposals for VANET, but most of them are defective as they use the pure form of ad hoc networking: all communications share one common channel. This setup induces large amounts of radio interference and limits the available bandwidths. For this reason, most VANETs are designed for telematics applications only.

For VMI applications which require large amounts of bandwidth, the space is dominated by 4G (LTE). By applying proprietary VANET technology to a public transportation service like city buses and taxis, a brand new broadband infrastructure almost freely comparing other MVNO can be constructed. Moreover, because of P2P architecture, it is robust, scalable, cost-effective, and has even snowball effect; the more nodes are attached, the better it can serve. The VANET infrastructure step by step in a long term. Our first target is a public transportation. City buses are perfect target for building a VANET at the starting stage followed by equipping all the taxis and then selling aftermarket VANET box. At the final stage, the Free-Air VANET would be a de facto standard and car makers OEM our VANET box to be built in. Social Networking for Free-Air: In the second phase, Free-Air application software will also have social networking service (SNS) functionality. Using this SNS functionality, a Free-Air member can recommend products or services to his friends and family. Viral marketing schemes can be implemented by building on the SNS functionality of Free-Air service. P2P Social Networking without 3rd party: The key difference between Free-Air SNS from traditional SNS from well-known providers such as Facebook and Twitter is that Free-Air enables SNS without a 3rd party. The rich media communications between social contacts are conducted directly without going through a 3rd party Web site. The P2P setup comes with multiple advantages over the 3rd party Web service. First, a P2P location-based SNS does not require GPS information. Thus, even if a contact is sitting in front of his desktop computer without a GPS modem, he can still participate in a location-based SNS. Second, in a P2P SNS, there is no private information stored in a centralized data center somewhere in the cloud. People participating in P2P SNS will have a far better protection of private information. Third, it is very easy to set up and tear down a P2P social network. A private club can be easily set up and tear down without running a specialized application written specifically for Facebook, for example. For these three reasons alone, P2P SNS will eventually become a significant competitor to a 3rd-party Web-based SNS.

Strong Technology Barriers: Still, technology barriers have prevented the ultimate form of LBMA from realization. The major technological barrier for LBMA is the required database operations to match merchants with handsets according to a prescribed set of conditions. Each individual handset must be matched to a group of merchants based on the locations of handsets and merchants, the direction of movement of a handset, etc. Because these searches involve handsets and merchants only around a certain locality, it is highly unproductive to conduct these search-n-match operations using a centralized infrastructure. A distributed infrastructure is not only natural but also much more cost effective than a centralized counterpart. Using the P2P technology, the Free-Air infrastructure is extremely simple and lean. There are no middleman entities between a merchant and a consumer. No dedicated servers are required: only lightweight software is inserted into merchants' existing Wi-Fi APs and servers. There will be no need for a dedicated data center infrastructure serving as the backend. Thus, operating costs of the Free-Air infrastructure are extremely low. A Free-Air operator will enjoy a margin that is unmatched by an operator that requires a centralized infrastructure. Location-based service without using GPS: In the initial deployment of Ad-Flow, there is no need to get handset's GPS coordinates. This is possible because Ad-Flow is implemented in a P2P manner. Each Free-Air APs are automatically linked to other local Free-Air APs within a distance range. The P2P links between Free-Air APs form a natural map of APs in relation to a handset attached to a Free-Air AP. Once a handset is attached to a particular Free-Air AP, all the nearby APs, which represent all the local merchants, will be notified and will forward ads to the handset. The Free-Air application on the handset will filter out unwanted ads according to preferences set by the handset users. The Free-Air (hence Ad-Flow) APs, also in a P2P manner, will conduct a matching process to forward ads according to a prescribed condition based on geotargeting. Mobile ads are relayed between Free-Air APs using a P2P process. Using this technology, there is no need of a database storing the location information of merchants or handsets. This dramatically reduces the overhead in the search-n-match process in LBMA. Moreover, there is no need to constantly update the handset's moving locations. In contrast, for centralized LBMA service providers such as Google or Navteq, they have to constantly update the handset's location based on GPS information. These frequent updates consume bandwidth and in the new era of tiered pricing for bandwidth, the centralized solution is highly unattractive to users.

Other Benefits of P2P Technologies: Free-Air virtual infrastructure inherits all the benefits of P2P technologies. These include perfect scalability as the infrastructure is flat. The infrastructure also grows organically, without the need for demand forecasting. The infrastructure is also robust as any break down of equipment will only affect locally, and the infrastructure is self-healing. Moreover, as P2P communications are very difficult to track, all communications within the Free-Air infrastructure is very securable. All the data are stored; it will be a nightmare for any attacker or hacker to obtain sensitive information. Free-Air Application Features: Non-intrusive advertising: Once a Free-Air handset is connected in a Free-Air zone, nearby Free-Air APs will push ads the newly attached handset. The Free-Air application will run as a background process consuming minimal resource of the handset when the handset is powered on. Free-Air Ad Filtering: The Free-Air application will allow a user to filter available ads from nearby merchants. The filtering function will allow ads to be categorized in a structural way. A user can set on and off special features and sub-categories for the ads. Spot and Time-dependent Sales: As the Ad-flow feature is P2P and localized, a merchant can make a last minute decision to conduct a spontaneous spot or time-dependent sale. For example, a bakery may decide that near the closing time to sell the remaining bakery stock for a discount as these foods command a much lower price overnight. The available goods depend on the sales near the end of the day. Thus, this kind of last-minute localized spot sales can only be setup using a P2P Ad-Flow mechanism. This kind of spot sales can be determined and advertised and be over in 30 minutes. The content of the ads may be simple but will be professionally displayed and relayed to Free-Air members within a short distance Advanced Free-Air Application Features: Shopper Guide: In this application, an electronic Shopper Guide will provide the following help to shoppers:

Price comparison for merchandize available within a local region

Consumer guide for durable goods

Products review

Guides to sophisticated equipment (home theater, high-tech gadgets, etc.)

Categorized guide to sales and special discount deals

Maps, directory assistance, and route assistance within a shopping district

Electronic coupons or rebates linked directly to merchants' POS (point of sale) terminals Recommendation from friends and family (social networking)

Reward point system for purchasing all kinds of goods and services

Personalized setting for all of the above

Some of the services may be fee-based. For example, many consumer guides and products review are not free even on the Internet. The reward point system may also be fee-based. Spot (Instant) Sales Determination for Merchants: The unique advantage of Free-Air is that member purchasing profiles are locally available. This information is very valuable for local merchants. For example, in the Free-Air application, the handset owners are asked to enter their purchasing preferences. These preferences for all the handset owners within a local region can be used by merchants to determine if a spot sale will be profitable or not. For example, based on long-term average of Free-Air member purchasing preferences observed in and around a shopping mall, a merchant discover that there are sufficient potential demand for a printer is high enough. Then the merchant can buy a stock of the printer through volume discount, and offer a promotional sale to the handset owners around the shopping mall. This information can also help a merchant to plan his floor space to stock the most demands goods. These preferences can be easily collected by the Free-Air virtual infrastructure and sell local merchants for a fee. A Free-Air member may want to go to a nice coffee shop. However, the shopping complex is too large to search out on foot to find the best one. But the Shopper Guide service can come to help the member. Using a selected filtering function on the Free-Air application, a member can obtain all the available information on coffee shops in this mall at the gate. Once this feature has been used once, members will use them repeatedly to save them in shopping in a huge facility. The Shopper Guide service will become a necessary electronic guide in not just a huge shopping mall, but also any commercial premise where the member is not familiar with the location. For example, looking for rest rooms, getting to the car garage, and finding a particular store or department will be an easy job with the Shopper Guide. In a department store, husband may stay at the lobby chair and wait for his wife to complete her shopping. If they all connected to a Free-Air APs, the wife can get all the useful information for shopping and husband can surf the Internet while waiting. Moreover, they two can chat with each other all the time during the shopping, using the fee Wi-Fi bandwidth from Free-Air zones. When a member goes to an Electronics Market Complex, numerous shops sell the same or similar products at different prices. At such a place, a comprehensive local price comparison will be extremely helpful to a shopper! It is simply impossible to check out all the prices on foot; it will be too tiring. But, with the Shopper Guide service, a member can quickly compare all the prices, and zero in on the shops that he is most interested in making a purchase. During a drive on a highway away from city, a member may need to find out a place to rest and get some food. Again, it will take time and driving to look around in a local town or service area. However, Ad-Flow will feed directly to the member in a structural way, the available food services facilities, with price and location information. For example, if a member is only interested in particular kind of food or particular chain restaurant, Ad-Flow will provide an invaluable guide electronically. With Free-Air VANET, a member can access the Internet with a wireless broadband connection on a VANET quipped bus. A member can determine ahead of the final destination, a plan for shopping or other activities while on bus. This is possible, because Ad-Flow will forward local merchants' information and other relevant information to a member on Free-Air equipped bus.

Basic technology for the present invention is summarized below. Mobility technology of the present invention is named as P2P Mobility or PPM. The reason for such name is to emphasize that a main feature of PPM is enabling a pure form of mobility: peer-to-peer. In the classical sense, this is also called end-to-end mobility. Another reason for the name is that PPM enables the workload of both control- and data-plane operations to be distributed to the end (peer) nodes in a very flexible way. The PPM technology is in essence a flexible overlay solution. Due to its flexibility, the PPM technology does not necessarily imply a pure-form of P2P control. PPM can also be implemented also in a hierarchical (centralized-distributed) architecture. Technically, the PPM technology possesses the following capabilities:

1. Multi-path packet delivery in a single IP connection
2. Seamless mobility between all combinations of all IP bandwidths
3. NAT (network address translation) traversal By multi-path packet delivery it is meant that packets can travel on different paths in different or the same networks. Therefore, with PPM technology, an IP application can utilize multiple network bandwidths at the same time. Of course, a special case is that packets travel on different paths within the same IP network. By seamless mobility it is meant that a session is uninterrupted as the devices move from one attachment point to another (changing IP address and port number). This includes the case when one or both end devices physically move, or they simply change the network attachment points without moving. Obviously, this definition covers all possible IP mobility cases: one-sided movement and two-sided movement, horizontal and vertical handover. By NAT traversal it is meant that packets will reach the correct destination end points even as they traverse a NAT or firewall (or more generally, a middle box) in their paths. It should be noted PPM is especially suited for the most difficult case of dynamic NAT traversal: packets traversing NAT or middle boxes even as one or both end devices change their IP attachment points.

Figure 33:
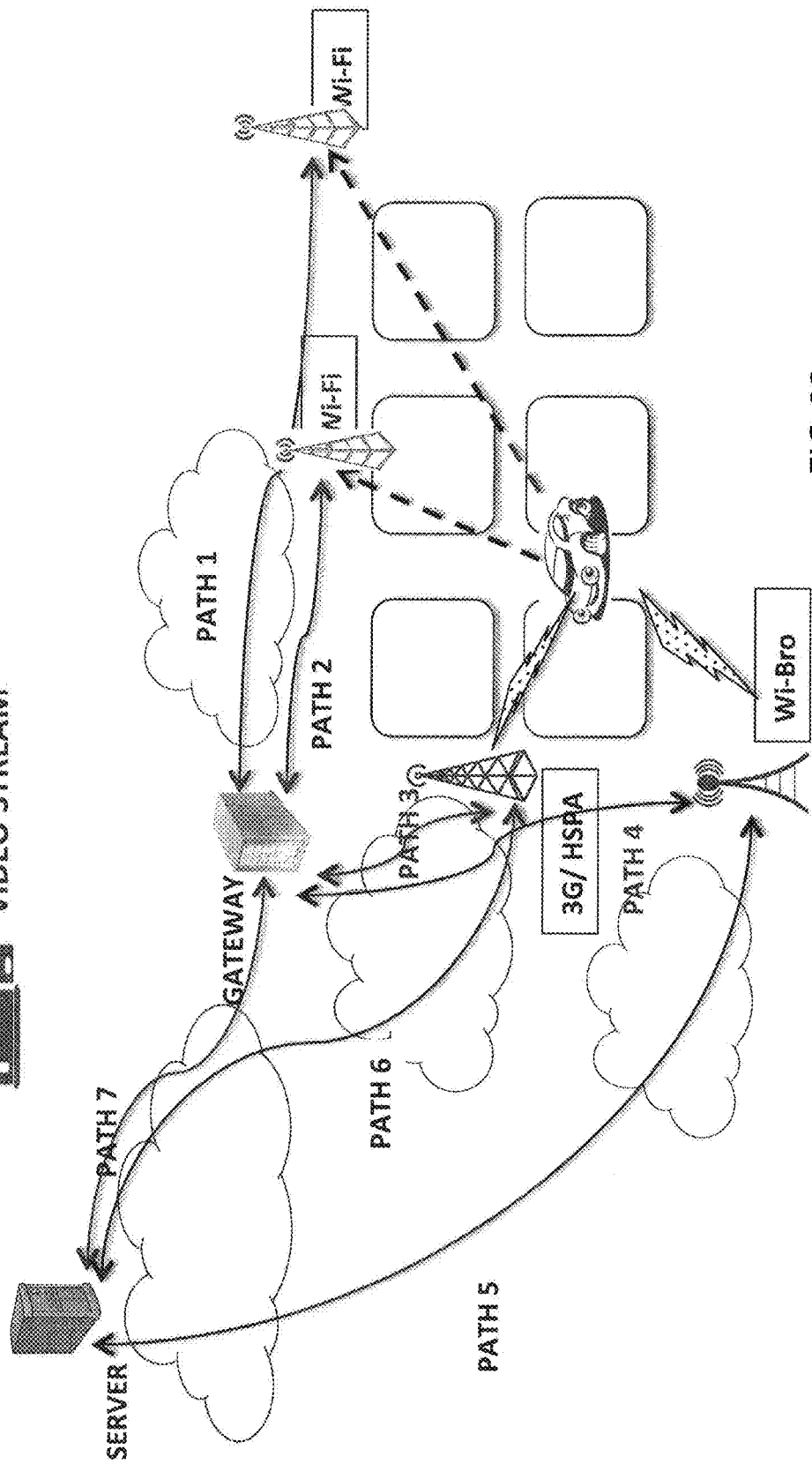
FIG. 33 shows examples of bandwidth bonding.

The PPM technology was developed by attacking the fundamental problem of IP rigidity. IP rigidity is a problem with three sub-problems. The first sub-problem is that IP cannot distinguish between location identity and host identity. In IP, a single IP address is used to identify both a host and its point of attachment. This design assumes a host never moves. However, once a host is to change its attachment point, connections to the host will break. Today, IP addresses do change all the time due to either mobility or NAT traversal. The second IP rigidity sub-problem is that IP does not explicitly specify a path. In IP, paths are implicitly identified and packets in the same connection travel in a single path. This forces all packets in the same application to use only one network and only one path. In contrast, under multi-path packet delivery, a host can use multiple wireless bandwidths simultaneously. Example of bandwidth bonding is shown in FIG. 33.

Figure 30:
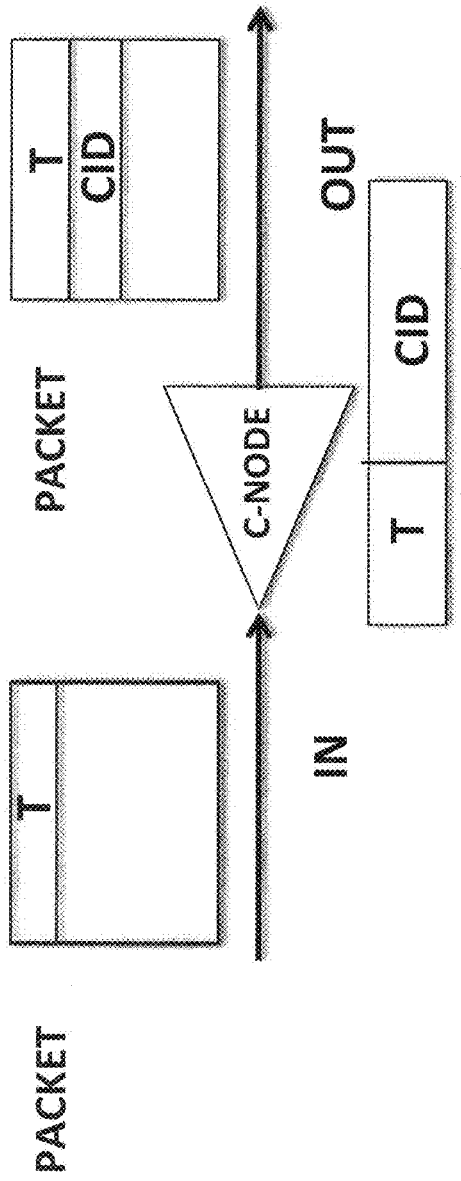
FIG. 30 shows ingress and egress operation on C-nodes.
Figure 30:
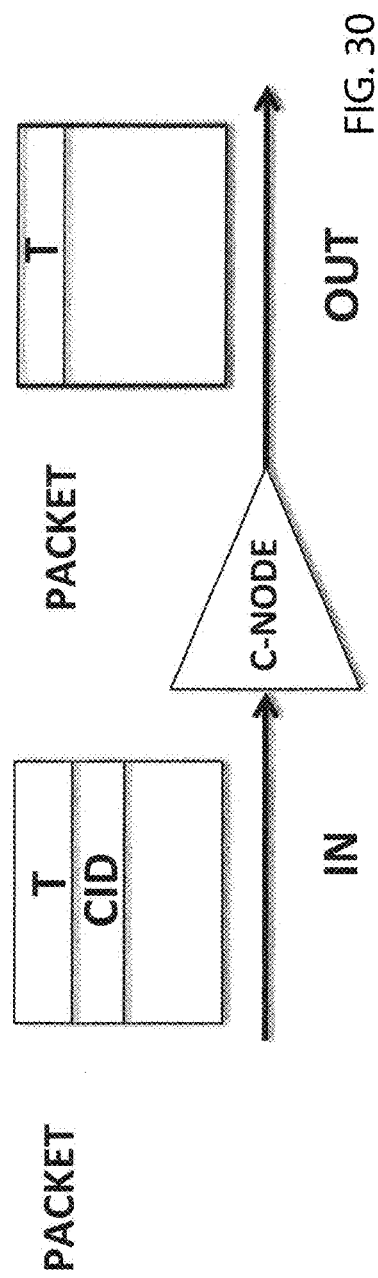
Figure 31:
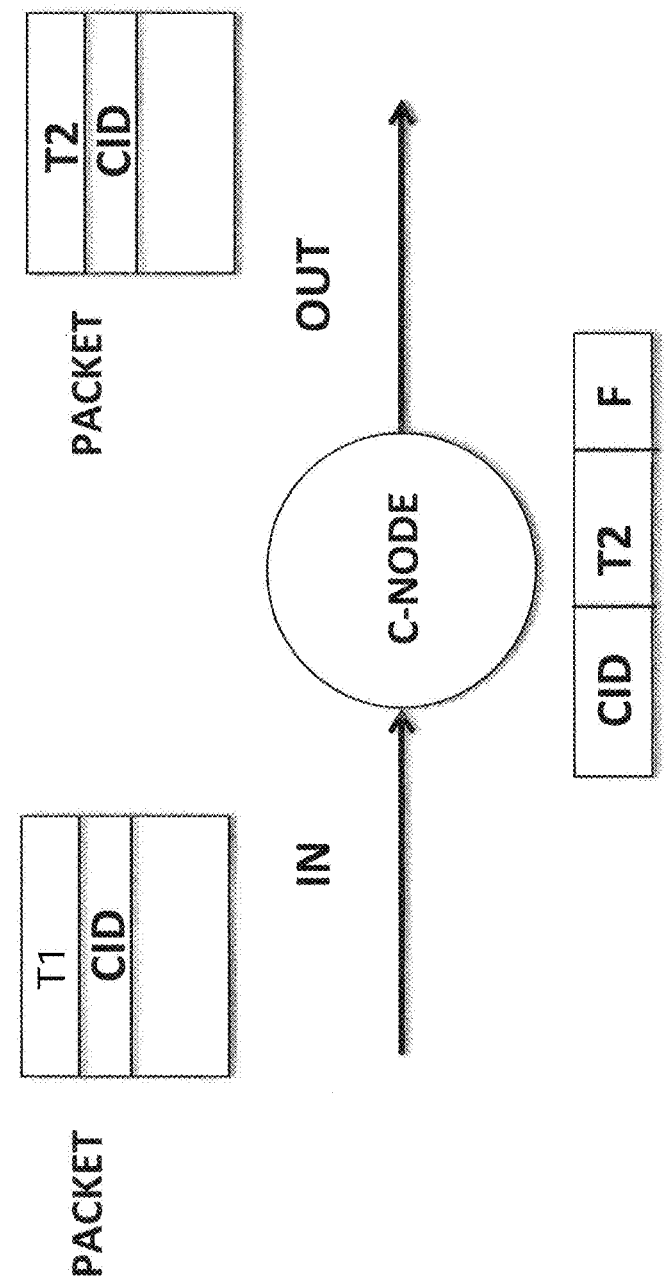
FIG. 31 shows forwarding operation on C-nodes.
Figure 32:
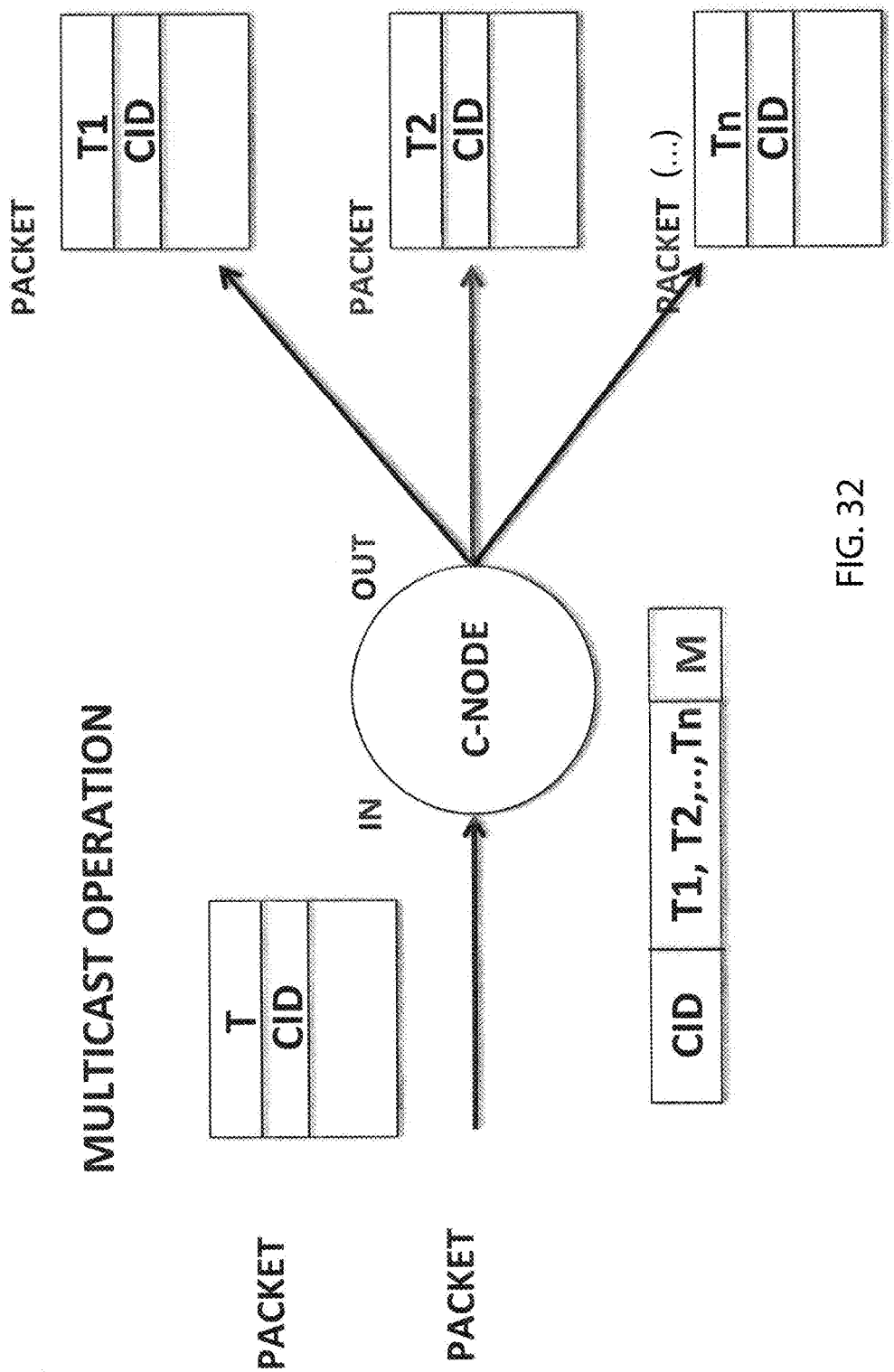
FIG. 32 shows multicast operation on C-nodes.

The third IP rigidity sub-problem is NAT traversal which can be understood as packets not reaching the destinations due to changes in the IP addresses and port numbers in traversing a NAT or middle box. The IP rigidity problem is a routing problem. The simplest and direct way to attack this problem is to enable IP to differentiate a flow. In PPM, flow differentiation is accompanied through atomic operations: adding and removing a flow identity, forwarding packets in a flow, duplicating packets from a single flow to multiple flows, and splitting packets from a flow to multiple flows. This is illustrated in FIGS. 30-32. The symbol T represents a tetrad, which is defined to be the pair <source AP, destination AP>, where an AP (address-port number) is defined to be the pair <IP address, port number>. In IP, a tetrad uniquely identifies a session and its path (through the source and destination IP addresses). In PPM, a MTEG (mobility tetrad enhancing group) layer is inserted to identify a flow, which is called a CID (connection ID). At each C-node, which is a software module that does the signal processing, a table of CIDs and tetrads are kept. A mapping is also facilitated to map a CID into a tetrad, and a tetrad into a CID. The entire set of operation is called C-forwarding (connection-forwarding). In PPM, the C-forwarding concept is only the core concept, which is further developed into specific algorithms and protocols to accomplish NAT traversal, mobility, and multi-path packet delivery. Since PPM is a layer-3 technology, these works have to be done in the kernel space. In the user space, handover and mobility management has to be accomplished. These management functions are similar to those implemented by the well-known MIH (media independent handover) protocol suite. It should be noted that PPM also includes user-space mobility management technologies. In mobility management, PPM also includes a fast handover technology. Fast handover is a technique that utilizes an access point (AP) or gateway to facilitate fast association of usable IP addresses to mobile devices that need to access an IP the network through the access point or gateway.

Figure 34:
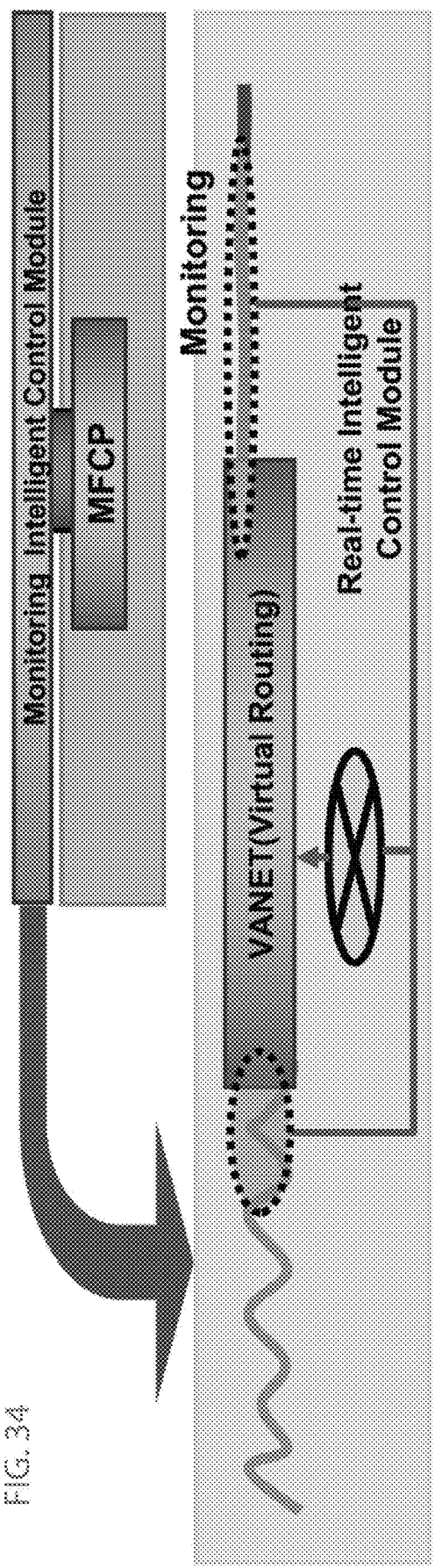
FIG. 34 shows merging of the virtual routing of the present invention and flow control protocol.
Figure 35:
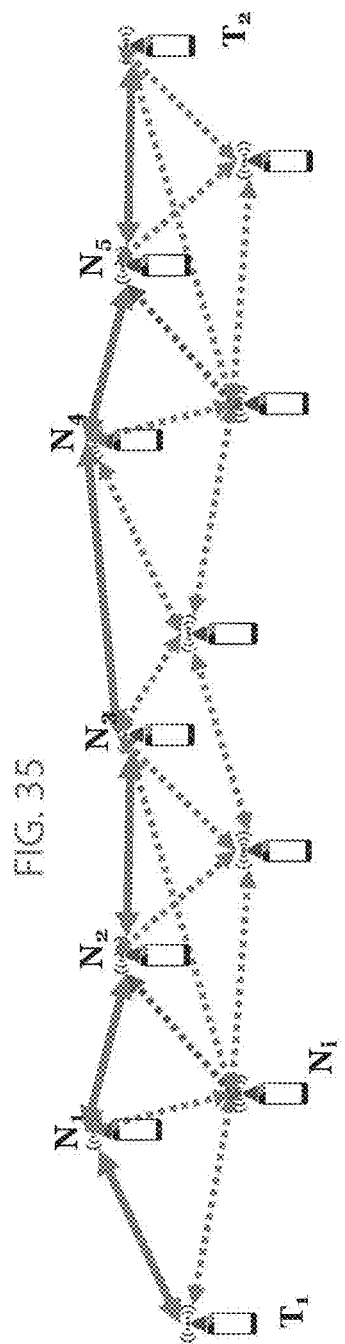
FIG. 35 shows an example of a phone ad-hoc network.

Flow Control: VANET technology is adopted to perform flow base routing by setting up a virtual circuit based on an ad-hoc network with smartphones or laptops utilized as programmable routers, which enables optimized congestion control by explicit measuring available bandwidth (or bottleneck bandwidth) of each node of the network (smartphones and laptops in this example). That is, accurate and explicit measurement of the available bandwidth of the nodes forming a virtual circuit (smartphones and laptops) enables maximum throughput without packet loss by applying the flow control of their minimum value (setting confession window size). TCP encounters bigger problem in high speed transfer such as 5G because TCP performs implicit congestion control by indirectly measuring bottleneck bandwidth or available bandwidth with RTT measurement. For example, Google's BBR performance measurement result shows stabilized convergence time of 35 seconds. Virtual Routing Technology specified in P2P VANET with Flow-based Routing is merged with Max-Min Flow Control Protocol (MFCP) to create a next generation of Internet Protocol. An example of MFCP is explained in a conference paper, "A distributed multicast multi-rate maxmin flow control protocol" December 2002 [DOI: 10.1109/GLOCOM.2002.1188443•Source: IEEE Xplore], the disclosure of which is incorporated by reference. FIG. 34 shows merging of the virtual routing of the present invention and flow control protocol. FIG. 35 shows an example of a phone ad-hoc network.

In FIG. 35:
Ti: Terminal device i
Ni: Node i in the network such as smartphone or laptop
AVi: Available Bandwidth at node i in the network
VCij: Virtual Circuit setup between Ti and Tj in the network
BBij: Bottleneck Bandwidth along VCij in network i-Stack Virtual Routing Technology (VANET) determines optimal routing between terminal Ti and Tj in the network and setup VCij along the path going through the nodes, Ni, Ni+1, - - - , Nj. Max-Min Flow Control Protocol (MFCP) find the fair allocations of the bottleneck bandwidth (BBij) among competing resources, given the minimum of available bandwidths (AVi) for all the nodes i along the Virtual Circuit (VCij) and setting it as optimal flow rate for each traffic with the explicit knowledge of the link capacities provided by smartphones and laptops. By merging Virtual Routing Technology (VANET) with Max-Min Flow Control Protocol (MFCP), the present invention provides a next generation of Internet Protocol which can take into account both optimal flow control and optimal routing at the same time by collapsing two orthogonal Internet protocol functions into one while TCP can only implicitly estimate the bottleneck bandwidths by measuring RTT at the terminals with the best available convergence time of 35 seconds to reach the steady state provided by BBR.

[Virtual Circuit (VC) is setup according to the P2P routing solution which is inherently optimal.—shortest path algorithm.

Max-Min Flow Control Protocol (MFCP) uses PERC (Proactive Explicit Rate Control Algorithm) with the objective of max-min fair-rate allocation with two criteria: transmission rates to be maximized and fairness among all the users. PERC algorithms proactively schedule flows to be sent at certain explicit rates to control congestion. They take as input the set of flows and the network link speeds and topology when the network speed or round-trip delay is high where flow is defined as a set of packets that departure from the same source and arrive at the same and propagation element in the network as a link.

Given a network with links of different capacities and a set of flows, where each flow crosses a subset of the links PERC find a rate allocation for each flow that is fair, for some notion of fairness, and use link capacity efficiently to calculate the explicit rates and communicate these rates back to the servers that send the flows before the flows even start to avoid congestion in the first place (by scheduling rates for flows or departure times for packets within the known constraints of the network link speeds and topology).

PERC algorithms distribute the rate calculation amongst the different links and end hosts. Whenever a flow arrives or departs, the nodes and end hosts exchange short messages, running a distributed algorithm to explicitly allocate a rate to each flow, including ongoing flows, to fit within the capacity constraint of the links. The end host then sends flows at the allocated rate. A PERC algorithm was for calculating a max-min fair-rate allocation.

In the design of a protocol that optimally utilizes the constraints, an optimal protocol should try to minimize the overheads of the forwarding operations. one should try to minimize the overheads of the propagation operations. Circuit switching and packet switching are two types of protocols that are designed according to this relation. In circuit switching, a set up phase starts a transaction by configuring all the forwarding elements to establish a fixed path between a source and a destination. the path becomes fully dedicated to this source-destination pair and the actual information can now be transmitted. Upon termination, a tear down phase is performed that releases the path so that its forwarding elements can be used by other source-destination pairs.

A packet switching protocol transmits information as soon as it is available. Upon reception of data, a forwarding element has to decide what the next forwarding element is and transmit such data towards that element. Because there is no path reservation, forwarding elements can virtually operate several source-destination pairs at the same time. Therefore, in packet switching Today the telecom industry, which originally based their networks on circuit switching technology, is converging to a world where switches forward packets. Today the telecom industry, which originally based their networks on circuit switching technology, is converging to a world where switches forward packets. Whether a new transition from packet switching to circuit switching will happen is uncertain. While this transition can be justified from a mathematical standpoint, legacy or regulation issues will play a decisive role to the design of the future Internet. Switches can have some degree of intelligence. While this design goes against the scalability principle—the more intelligence at the switch the more cost to process a packet and, therefore, the more difficult it is to grow the network—, we will guarantee that only very fast algorithms (with a logarithmic cost) are implemented at the switch node. A network defines a set of bounded resources that are used by flows. The objective is to identify the transmission rate for each flow that optimally utilizes the network resources. Optimality is defined in two senses:

Network usage: rate allocations that are higher are preferable.

Flow fairness: rate allocations that are fairer to each individual flow are preferable.

Figure 36:
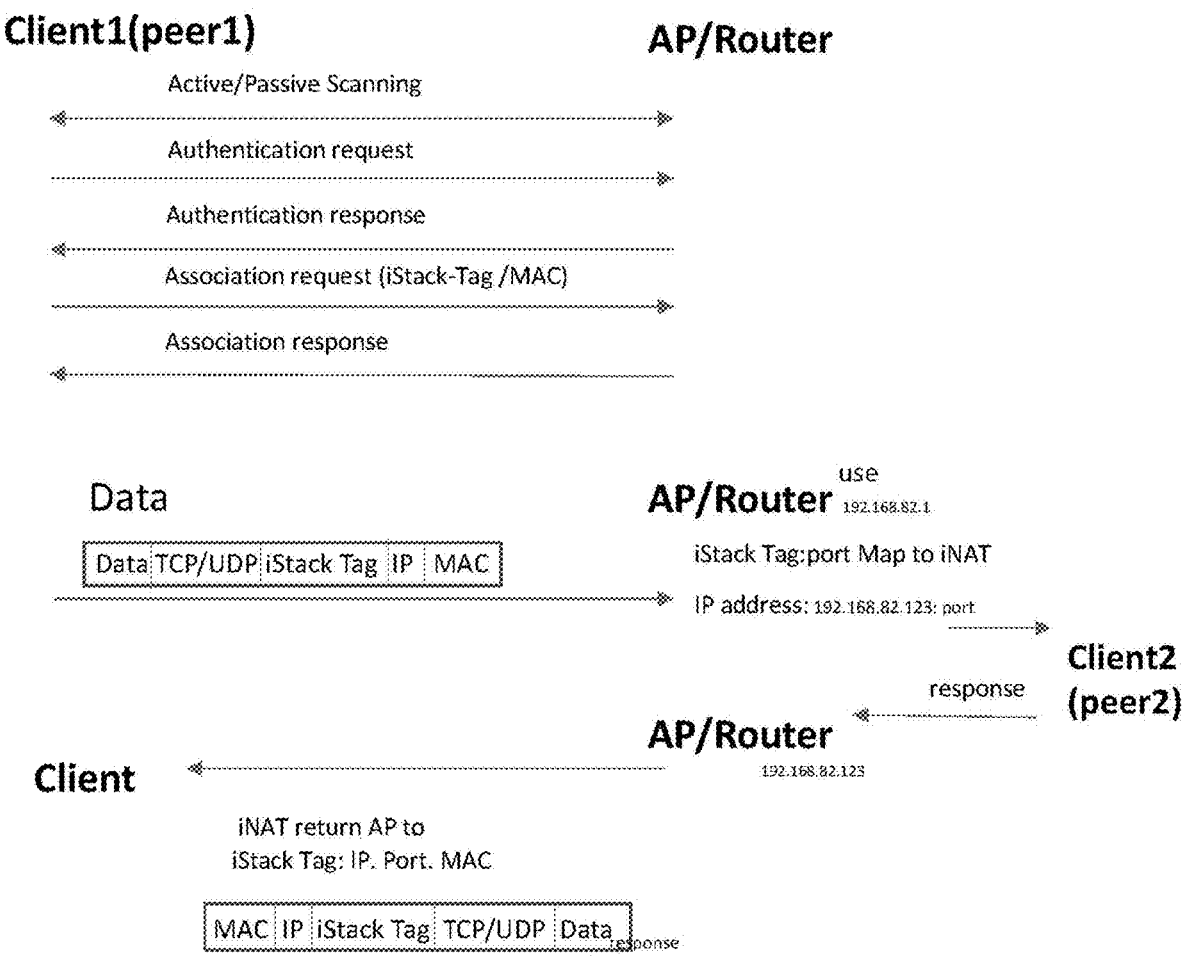
FIG. 36 shows an example of i-Stack applied on HIP and IP tunneling.

[iStack applied on HIP and IP tunneling] In the process of a client (ex. a smartphone) establishing a connection to AP/Router to communicate with another client in a different subnet (different WLAN), iStack virtualization technology can be modified as follows to make it compatible with existing routers: iStack tag (CID) can be represent as a permanent Host ID in the format of HIP or IP tunneling for the connection of Mapping to NAT (Network Address Translation), not only as temporary connection ID which only exist only when connection is alive. FIG. 36 shows an example.

Generalization of an instance of a peer moving from one subnet to another or to a overlapping of two networks.
1. In the case of multiple WiFi subnets, wlan1, wlan2
2. A client connects with $AP_i$, status is active.
3. In the IP layer, if packet with syn flag set. iStag Tag w/hashing object is created. iStag-Tag w/hashing object is sent to its peer.
4. Its peers sends response with its own hashing object information.
5. In this way, the hashing map is created in both side.
6. The data attached its hashing key is exchanged between the peers with IPIP tunneling or in HIP format.
7. When a client is moving to different network, wlanj with a new AP/Router.
8. The new IP address is assigned to this client.
9. Join message with syn flag set is sent from the client to its peer using IPIP tunneling.
10. Peer received the join message, simple dropped.
11. Both $wlan_i$ and $wlan_j$ are active, packet is sent from wlani and wlanj in a round robin way or using other QoS scheme using IPIP tunneling in HIP format
12. If the signal strength of wlani is below to a threshold, wlani becomes standby.

In the case of ad-hoc network, clients with AP/Router capability can establish a direct communication between peer to peer with the same procedure as above.

Simplifying Networks by Separating the Identity—Location Roles of the Internet Protocol (IP) The Host Identity Protocol (HIP) is a host identification technology for use on Internet Protocol (IP) networks, such as the Internet. The Internet has two main name spaces, IP addresses and the Domain Name System. HIP separates the end-point identifier and locator roles of IP addresses. It introduces a Host Identity (HI) name space, based on a public key security infrastructure. The Host Identity Protocol provides secure methods for IP multihoming and mobile computing. In networks that implement the Host Identity Protocol, all occurrences of IP addresses in applications are eliminated and replaced with cryptographic host identifiers. The cryptographic keys are typically, but not necessarily, self-generated. The effect of eliminating IP addresses in application and transport layers is a decoupling of the transport layer from the internetworking layer (Internet Layer) in TCP/IP. HIP was specified in the IETF HIP working group. An Internet Research Task Force (IRTF) HIP research group looks at the broader impacts of HIP. [https://en.wikipedia.org/wiki/Host_Identity_Protocol]

HIP delivers a secure tunneling architecture that enables host mobility and multihoming in a simple yet elegant way. It provides an alternative key exchange capability for the IPsec protocol and was designed to be part of the TCP/IP stack (native to the OS), but can also function as a gateway for devices that cannot have software installed. HIP separates the role of IP addresses as both host identity and topological location for networks by introducing the concept of an identifier-locator split. By adding a host identity layer between the network and transport layers, permanent and location—independent cryptographic identities are bound to devices and systems in the form of 2048-bit RSA public keys, instead of spoofable IP addresses. Policies for connectivity and segmentation are now based on trusted identities, restoring addresses to their original role: location.

An IP tunnel is an Internet Protocol (IP) network communications channel between two networks. It is used to transport another network protocol by encapsulation of its packets. IP tunnels are often used for connecting two disjoint IP networks that don't have a native routing path to each other, via an underlying routable protocol across an intermediate transport network. In conjunction with the IPsec protocol they may be used to create a virtual private network between two or more private networks across a public network such as the Internet. Another prominent use is to connect islands of IPv6 installations across the IPv4 Internet. In IP tunneling, every IP packet, including addressing information of its source and destination IP networks, is encapsulated within another packet format native to the transit network. At the borders between the source network and the transit network, as well as the transit network and the destination network, gateways are used that establish the end-points of the IP tunnel across the transit network. Thus, the IP tunnel endpoints become native IP routers that establish a standard IP route between the source and destination networks. Packets traversing these end-points from the transit network are stripped from their transit frame format headers and trailers used in the tunneling protocol and thus converted into native IP format and injected into the IP stack of the tunnel endpoints. In addition, any other protocol encapsulations used during transit, such as IPsec or Transport Layer Security, are removed. [https://en.wikipedia.org/wiki/IP_tunnel]

iStack Mobility
Specifications
Physical layer
agnostic: Support for all physical layers, including WIFI, LTE, Application layer Support for all applications and transports, including TCP, UDP, agnostic: VoIP, HTTP, streaming, RTP
  NAT traversal: Can handle NAT and firewall traversal with zero configuration
  Morphism: Can be used as P2P/end-to-end or via gateways
  Fast handoff: handoff times at less than 10 milliseconds
Platform agnostic: Support for Windows, Linux and MACOS, embedded devices
  Multipath Single TCP and UDP connections can be delivered via multiple Bandwidth physical connections creating a superchannel pooling:
  Simultaneous Supports simultaneous movement mobility for mobile-to-mobile movement: applications such as telephony
Optimal routing: Overcomes the triangular routing problem
  IStack includes iLook, an intelligent controller that monitors iLook: network conditions and controls iStack to carry out optimal mobility actions
  Plug and play: Easy non-disruptive insertion, does not need to recompile nor reboot the system
Study Case: Peer to Peer Mobility
iStack provides world's first IP layer end-to-end mobility without the need for gateways. iStack mobility operates just like any other peer to peer application: the software is installed in the participating terminals automatically creating a mobile overlay network. With iStack, IP-based Applications like Skype or Google Phone can enjoy the same levels of mobility offered by traditional circuit switching mobile telephony.
iStack's P2P Configuration Offers the Following Features:
  Enables handoffs without gateway infrastructure.
  Software downloadable and installable without kernel recompilations.
  Portable solution (demonstrated to run on OpenWrt, ucLinux, Maemo, Windows XP/Vista).
  Can run on Android phones.
  Vertical/horizontal handoff and across NAT/firewall boxes.
  The P2P routing solution is inherently optimal.
Optimal routing: iStack P2P solution ensures that routes between two terminals always follow the shortest path, avoiding any form of triangular routing.
Study Case: Mesh/Gateway-based Mobility: iStack can also be configured to operate in gateway mode. This allows operator to deploy their own mobility network and maximize the returns of network investment. A key advantage of gateway-based mobility comes with the ability to support handoffs even when the correspondent node is not mobile-aware. By deploying iStack cores at strategic gateway locations, operators can provide mobile services between iStack-enabled terminals and regular fix devices. The gateway configuration is compatible with ad hoc wireless technologies such as WI-FI Mesh. This makes iStack a suitable mobility technology for city-wide grassroots network deployments.
  iStack offers the following gateway-based features:
  Enables mobility across existing city-wide Mesh Networks deployments.
  Portable solution (demonstrated to run on OpenWrt, ucLinux, Maemo, Windows XP/Vista)
  Gateway configuration enables mobility even if peer node is not mobile-aware.
  Can be managed by network operators to offer value added mobile services to customer based.
  Provides patent-pending fast-handoff solution (less than 10 milliseconds handoff)
  Light-weight protocol solution, requires no expensive centralized infrastructure.
  Optimized routing based on shortest path heuristics.
  Vertical/horizontal handoff and across NAT/firewall boxes.

While the present invention and its various functional components have been described in particular embodiments, it should be appreciated that the present invention can be implemented in hardware, software, firmware, middleware or a combination thereof and utilized in systems, subsystems, components or sub-components thereof. When implemented in software, the important elements of the present invention consist of the instructions/code segments used to perform the necessary tasks. The program or code segments can be stored in a machine-readable medium, such as a processor-readable medium or a computer program product, or transmitted by a computer data signal embodied in a carrier wave or a signal modulated by a carrier through a transmission medium or communication link. The machine-readable medium or processor-readable medium may include any medium that can store or transfer information in a form readable and executable by a machine (e.g., a processor, computer, etc.).

Furthermore, while the present invention has been illustrated and described with respect to a preferred embodiment, those skilled in the art will recognize that various changes and modifications may be made without departing from the scope of the invention as defined in the appended claims.

The invention claimed is:
1. An electronic data communication network comprising:
  one or more source terminal nodes connected to the network;
  a plurality of moving c-nodes; and
  one or more destination terminal nodes connected to the network;
  wherein said source terminal nodes send IP packets over the plurality of c-nodes to said destination terminal nodes to accomplish arbitrary communications between arbitrary groups of said source terminal nodes to arbitrary groups of said destination terminal nodes;
  wherein the moving node comprises a mobile communication device;
  wherein the moving node comprises a starting node that sends the data, a relay node that relays the data, and an ending node that receives data;
  wherein a virtual circuit is formed along a path comprising the relay nodes for data communication; wherein the virtual circuit is identified by the path; wherein routing of data from the starting node to the ending node is performed with P2P routing algorithm;
  wherein the virtual circuit operates at layer 2 as a service to layer 3, wherein data frame is identified a virtual circuit ID at layer 2, wherein the moving node looks up the virtual circuit ID, retrieves a identifier of a next channel to transmit the frame from a virtual circuit routing table using the virtual circuit ID, whereby a processing delay is comprised of the virtual circuit ID lookup time and the time to retrieve the next channel identifier;
  wherein each of the IP packets is an ordinary IP packet or a c-packet, wherein the c-packet is an IP packet including an MTEG header, wherein the MTEG header contains a tetrad field and a CID field, wherein the tetrad field contains at least a source IP address, a source transport layer port number, a destination IP address and a destination transport layer port number, in an ordered format.

2. The system of claim 1, wherein the MTEG header of the c-packet resides anywhere in the packet.

3. The system of claim 2, wherein each of the c-nodes performs the operations of:
  receiving an input packet, wherein the input packet is an ordinary IP packet or a c-packet;
  producing a plurality of output packets, wherein each of the output packets is an ordinary IP packet or a c-packet; and
  forwarding the output packets to their respective destinations as ordinary IP packets.

4. The system of claim 3, wherein each of the c-nodes is coupled with a status table, wherein each entry of the status table includes a tetrad list and a CID, wherein the tetrad list is a list of tetrads in an ordered format.

5. The system of claim 4, wherein each of the c-nodes is coupled with a routing function unit, wherein in the operation of producing the output packets from the input packet, the routing function unit uses contents of the status table coupled with the c-node and the MTEG header of the input packet to produce the output packets.

6. The system of claim 5, wherein at least one of the c-nodes performs the operation of: when the input packet is an ordinary input IP packet, inserting an MTEG header into the input packet to thereby produce a c-packet as the output packet.

7. The system of claim 6, wherein at least one of the c-nodes performs the operation of: when the input packet is a c-packet, removing an MTEG header from the input c-packet to produce an ordinary IP packet as the output packet.

8. The system of claim 7, wherein at least one of the c-nodes performs the operations of:
  when the input packet is a c-packet, determining a new MTEG header by the routing function unit; and
  swapping the MTEG header of the input c-packet with the new MTEG header;
to thereby produce a modified c-packet as the output packet.

9. The system of claim 8, wherein at least one of the c-nodes performs the operations of:
  when the input packet is a c-packet, duplicating a plurality of copies of the input c-packet, wherein the number of the copies is determined by the routing function unit; and
  determining a new tetrad for each copy of the input c-packet by the routing function unit; and
  modifying each copy of the input c-packet with the respectively determined new tetrad in the MTEG header, to thereby produce a plurality of modified c-packets as the output packets.

10. The system of claim 9, wherein at least one of the c-nodes performs the operation of:
  when the input packet is a c-packet, receiving a sequence of input c-packets, wherein the number of the input c-packets is determined by the routing function unit;
  determining a new tetrad for each of the input c-packets by the routing function unit; and
  modifying each of the input c-packets with the respectively determined new tetrad in the MTEG header, to thereby produce modified c-packets as output packets.

11. The system of claim 10, wherein the routing function unit guarantees that the c-packets related with a first source-destination terminal pair include a CID associated with the source-destination terminal pair, wherein the CID is different from CIDs of c-packets related with other active and distinct source-destination pairs at each of the c-nodes during an active communication life of the first source-destination terminal pair.

12. The system of claim 11, wherein the CID associated with the first source-destination terminal pair remains unchanged during the active communication life of the first sources-destination terminal pair.

13. The system of claim 11, wherein the status table is updated in response to an update signal from at least one of the source terminal, the destination terminal and another c-node.

14. The system of claim 11, wherein the CID and the tetrad are recursively defined and stored in a vectored format.

15. The system of claim 1, wherein the virtual circuit routing determines optimal routing between two given terminals in the network and sets virtual circuit along the path going through the nodes, Ni, Ni+1, - - - , Nj between the two given terminals.

16. The system of claim 15, wherein Max-Min Flow Control Protocol(MFCP) finds the fair allocations of the bottleneck bandwidth (BBij) among competing sources, given the minimum of available bandwidths(AVi) for all the nodes i along the Virtual Circuit (VCij) and setting it as optimal flow rate for each traffic with the explicit knowledge of the link capacities.

17. The system of claim 16, wherein MFCP uses PERC (Proactive Explicit Rate Control Algorithm) with the objective of max-min fair-rate allocation with two criteria:
  transmission rates to be maximized and fairness among all the users, wherein PERC algorithms proactively schedule flows to be sent at certain explicit rates to control congestion, wherein PERC algorithms take as input the set of flows and the network link speeds and topology when the network speed or round-trip delay is higher than a predetermined value, wherein the flow is defined as a set of packets that departure from the same source and arrive at the same and propagation element in the network as a link.

18. The system of claim 17, wherein when each of the flows crosses a subset of the links, PERC algorithms find a rate allocation for each flow that is fair, for some notion of fairness, and use link capacity efficiently to calculate the explicit rates and communicate these rates back to the nodes that send the flows before the flows even start to avoid congestion, wherein PERC algorithms schedule rates for flows or departure times for packets within the known constraints of the network link speeds and topology.

19. The system of claim 18, wherein PERC algorithms distribute the rate calculation amongst the different links and source terminal or destination terminals, wherein whenever a flow arrives or departs, the nodes and source terminal or destination terminals exchange short messages, running a distributed algorithm to explicitly allocate a rate to each flow, including ongoing flows, to fit within the capacity constraint of the links, wherein the source terminal then sends flows at the allocated rate.

20. The system of claim 1, wherein in the process of a node as a client establishing a connection to AP/Router to communicate with another node as a client in a different subnet, iStack tag (CID) is represented as a permanent Host ID in the format of HIP or IP tunneling for the connection of Mapping to NAT(Network Address Translation), not only as temporary connection ID which only exist only when connection is alive.

21. The system of claim 20, wherein HIP adds a host identity layer between the network and transport layers, whereby permanent and location identities are bound to nodes.

22. The electronic data communication network of claim 1, further comprising a plurality of stationary nodes; wherein the stationary node further comprises a plurality of commercial units, wherein merchant of the commercial unit is notified with information for moving nodes approaching to the commercial unit, wherein the merchant provides time and location dependent advertisements to users of the moving nodes, wherein the advertisements are filtered by the users of the moving nodes.

23. The electronic data communication network of claim 22, wherein the positions of moving nodes relative to the stationary nodes form a map for the moving nodes, wherein the merchants are provided user's preference together with the position of the user within the map.

24. The electronic data communication network of claim 1, wherein the relay node is chosen utilizing broadcast so that the distance between a transmitting node and a receiving node is increased up to a threshold value that provides minimum effective bandwidth, whereby the number of hops between two end points is minimized.

25. The electronic data communication network of claim 1, wherein a routing table comprises records, wherein the record comprises VCID, node_status field, and next_channel ID, wherein the node keeps track of the location by the subzone ID and the number of virtual circuits for which the node carries traffic.

26. The electronic data communication network of claim 25, wherein the P2P routing algorithm performs updating the current subzone position for each node, detection of a node in a virtual circuit has left the network, selection of a new node in the virtual circuit that has change in its nodes, determination of the channel number for each node in each virtual circuit, updating the routing table according to the changes in the nodes, and setting up and tearing down virtual circuit, whereby moving of the vehicles relative to the roads is reflected.

27. The electronic data communication network of claim 26, wherein the GPS coordinate of a subzone is mapped to the IP address of a node in the subzone, whereby the IP address of the node approximately reflects the GPS coordinates of the node, wherein each node maintains a table of active IP addresses in the subzone in which it is located, wherein the table is updated using a distributed hash table algorithm, whereby IP address conflicts are avoided.

28. The electronic data communication network of claim 1, wherein the predetermined path for the vehicles comprise a relative topology in which all moving nodes moving on the same road have approximately zero relative velocity, wherein the subset of all moving nodes on the same road form a relative topology that does not change in time, wherein packets from and to the nodes inside a subset of the relative topology are restricted to restricted to be routed through the nodes in the subset of moving nodes and bordering nodes, whereby the routing in the network is decomposed into routings associated with individual relative topologies.

29. The electronic data communication network of claim 28, wherein routing is performed so that the packet flows from the Internet to moving nodes are in the anti-parallel direction of the traffic flow, and the packet flows from the moving nodes to the Internet are in the parallel direction of the traffic flow, whereby need for forced handovers is reduced.

30. The electronic data communication network of claim 1, wherein all moving nodes on the same road are organized into disjoint subsets, wherein each disjoint subset is assigned a discrete color, wherein packets are forwarded from one colored subset to the next colored subset.

31. The electronic data communication network of claim 1, wherein data frames are reserved in blocks, wherein each block is assigned a block ID, wherein a number of relay moving nodes are specified as backup relay node, wherein if timeout occurs, then backup relay node making the detection retransmits the block, wherein the block ID is unique in all the transmissions from a source moving node to a destination stationary node.

32. The electronic data communication network of claim 1, wherein a control plane maintains topology tables and IP address tables to enable moving nodes and stationary nodes to find each other in terms of IP addresses; assigns channels; and calculates potential trajectory of each moving node to start an anticipative handover.

33. The electronic data communication network of claim 1, wherein packets are transmitted within the same TCP connection using multiple bandwidths whereby bandwidth bonding increases throughput.

34. The electronic data communication network of claim 1, wherein the user of the vehicle communication device is provided with a stationary communication device that is adapted to be used at a fixed location, is included as part of the network, and is authenticated for the same user.

35. The electronic data communication network of claim 1, wherein the routing algorithm updates the current subzone position for each node, detects a node in the virtual circuit, which has left the electronic data communication network, selects a new node in the virtual circuit that has change in its nodes, determines the channel number for each node in each virtual circuit, updates the routing table according to the changes in the virtual circuit nodes, and sets up or tears down the virtual circuit.

* * * * *